US008963995B2

(12) United States Patent
Tsukagoshi

(10) Patent No.: US 8,963,995 B2
(45) Date of Patent: Feb. 24, 2015

(54) STEREO IMAGE DATA TRANSMITTING APPARATUS, STEREO IMAGE DATA TRANSMITTING METHOD, STEREO IMAGE DATA RECEIVING APPARATUS, AND STEREO IMAGE DATA RECEIVING METHOD

(75) Inventor: Ikuo Tsukagoshi, Tokyo (JP)

(73) Assignee: Sony Corporation (JP)

( * ) Notice: Subject to any disclaimer, the term of this patent is extended or adjusted under 35 U.S.C. 154(b) by 637 days.

(21) Appl. No.: 13/058,919

(22) PCT Filed: Jun. 22, 2010

(86) PCT No.: PCT/JP2010/060585
§ 371 (c)(1),
(2), (4) Date: Feb. 14, 2011

(87) PCT Pub. No.: WO2011/001857
PCT Pub. Date: Jan. 6, 2011

(65) Prior Publication Data
US 2011/0149035 A1    Jun. 23, 2011

(30) Foreign Application Priority Data

Jun. 29, 2009  (JP) ................................. 2009-153686
May 11, 2010  (JP) ................................. 2010-108988

(51) Int. Cl.
*H04N 13/00* (2006.01)
*H04N 7/26* (2006.01)
(Continued)

(52) U.S. Cl.
CPC ........... *H04N 13/007* (2013.01); *H04N 13/004* (2013.01); *H04N 13/0048* (2013.01); *H04N 2213/005* (2013.01)
USPC .................. 348/43; 348/42; 348/44; 348/47; 348/51; 348/490; 382/232

(58) Field of Classification Search
CPC ........... H04N 13/00; H04N 7/26; G06K 9/36; G06K 9/46
See application file for complete search history.

(56) References Cited

U.S. PATENT DOCUMENTS

2001/0028782 A1 * 10/2001 Ohno et al. .................... 386/46
2006/0023950 A1 *  2/2006 Auberger et al. ............. 382/232
(Continued)

FOREIGN PATENT DOCUMENTS

JP         11289555 A      10/1999
JP        2004-274125 A     9/2004
(Continued)

OTHER PUBLICATIONS

Supplementary European Search Report from EP Application No. 10794030, dated Dec. 4, 2012.
(Continued)

*Primary Examiner* — Joseph Ustaris
*Assistant Examiner* — Maryam Nasri
(74) *Attorney, Agent, or Firm* — Lerner, David, Littenberg, Krumholz & Mentlik, LLP

(57) ABSTRACT

[Object] To maintain perspective consistency among individual objects in an image in superimposition display of a caption (caption unit) in an ARIB method.
[Solution] A multiplexed data stream including a video data stream and a caption data stream is transmitted from a broadcast station to a set top box. A video data stream supplied from a video encoder 113 includes stereo image data. A caption data stream supplied from a caption encoder 133 includes data of captions (caption units) in the ARIB method serving as superimposition information and disparity information (disparity information set). In the caption data stream, the pieces of data of a certain number of captions that are to be displayed on the same screen are sequentially arranged via a separator. Also, the disparity information (disparity information set) inserted into the caption data stream includes a certain number of pieces of disparity information added with respective pieces of identification information indicating the arrangement order of the pieces of data of the certain number of captions.

8 Claims, 48 Drawing Sheets

(51) Int. Cl.
*G06K 9/36* (2006.01)
*G06K 9/46* (2006.01)

(56) References Cited

U.S. PATENT DOCUMENTS

| | | | |
|---|---|---|---|
| 2008/0192067 A1 | 8/2008 | Barenbrug et al. | |
| 2009/0142041 A1* | 6/2009 | Nagasawa et al. | 386/124 |
| 2009/0284584 A1* | 11/2009 | Wakabayashi et al. | 348/44 |
| 2010/0157025 A1* | 6/2010 | Suh et al. | 348/51 |

FOREIGN PATENT DOCUMENTS

| | | |
|---|---|---|
| JP | 2005-006114 A | 1/2005 |
| JP | 2006-325165 A | 11/2006 |
| JP | 2006325173 A | 11/2006 |
| JP | 2008164367 A | 7/2008 |
| JP | 2009010557 A | 1/2009 |
| JP | 2009017198 A | 1/2009 |
| JP | 2009101822 A | 5/2009 |
| JP | 2009-135686 A | 6/2009 |
| JP | 2010510558 A | 4/2010 |
| WO | 2004021285 A1 | 3/2004 |
| WO | 2007116549 A1 | 10/2007 |
| WO | 2008044191 A2 | 4/2008 |
| WO | 2009008808 A1 | 1/2009 |
| WO | 2010064118 A1 | 6/2010 |
| WO | 2010095074 A1 | 8/2010 |

OTHER PUBLICATIONS

Office Action from Japanese Application No. 2009-248357, dated Feb. 26, 2013.
Office Action from China Application No. 201080009821.1, dated Aug. 29, 2013.
Office Action from Japanese Application No. 2009-246179, dated Sep. 10, 2013.
Office Action from China Application No. 201080002832.7, dated Jul. 24, 2013.
Office Action from China Application No. 201080009863.5, dated Jul. 17, 2013.
Office Action from Japanese Application No. 2009-288433, dated Sep. 10, 2013.
Office Action from Japanese Application No. 2010-010536, dated Sep. 10, 2013.
Office Action from Japanese Application No. 2009-248357, dated Jul. 30, 2013.

* cited by examiner

FIG. 3
EXAMPLE OF STEREO IMAGE DATA
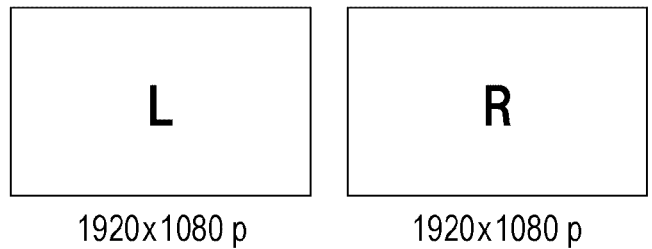
FIG. 4
(a) "Top & Bottom" METHOD
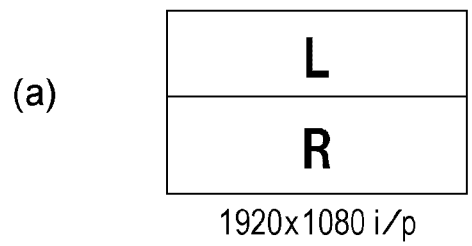
(b) "Side By Side" METHOD
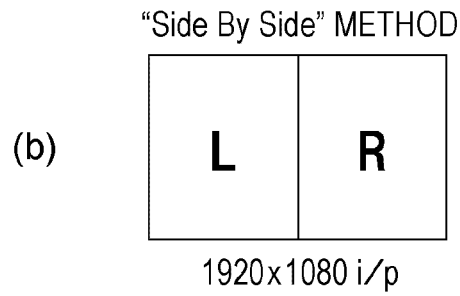
(c) "Frame Sequential" METHOD
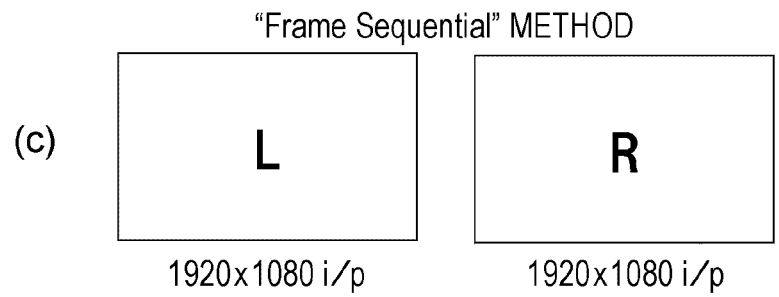

FIG. 7
EXAMPLE OF DISPARITY VECTOR
(a)
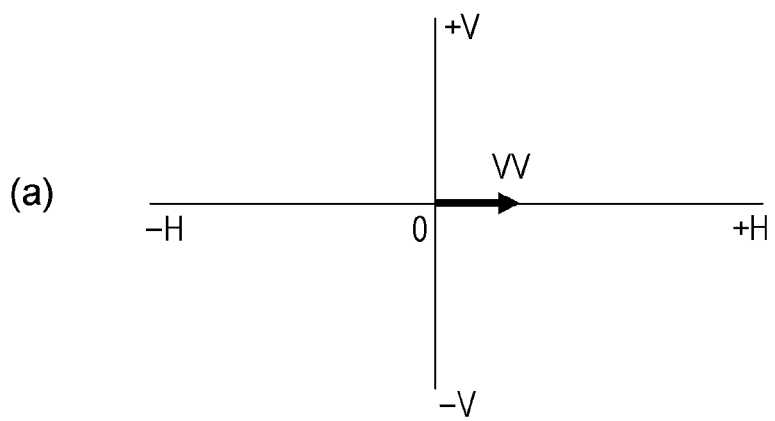
(b)
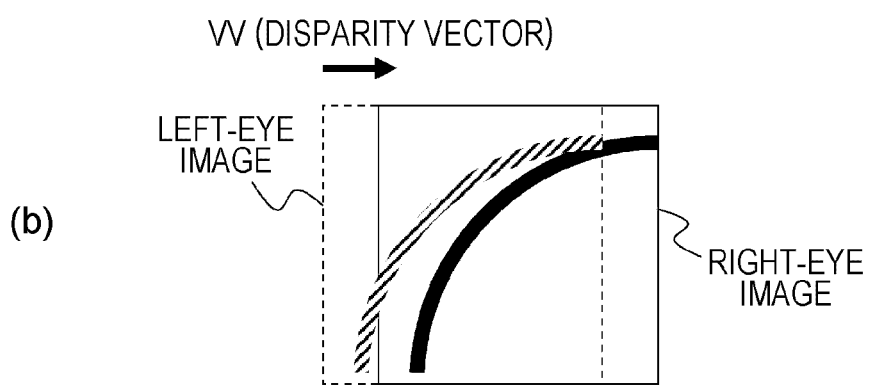

FIG. 8

TRANSMISSION CONTENT OF DISPARITY VECTORS

| | |
|---|---|
| Number_of_ViewBlocks N | 16 bits |
| For (i=0; i<N; i++) { | |
|     ID_Block(i) | 16 bits |
|     Vertical_Position | 16 bits |
|     Horizontal_Position | 16 bits |
|     View_Vector_Vertical | 16 bits |
|     View_Vector_Horizontal | 16 bits |
| } | |

FIG. 9

POSITION COORDINATE OF DISPARITY DETECTION BLOCKS

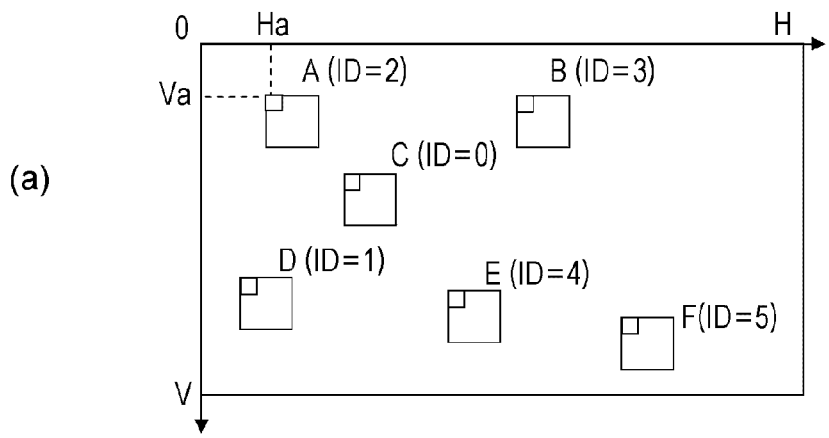

(a)

(b)

```
ID2: Block_A:   (Ha, Va),   DISPARITY VECTOR a
ID3: Block_B:   (Hb, Vb),   DISPARITY VECTOR b
ID0: Block_C:   (Hc, Vc),   DISPARITY VECTOR c
ID1: Block_D:   (Hd, Vd),   DISPARITY VECTOR d
ID4: Block_E:   (He, Ve),   DISPARITY VECTOR e
ID5: Block_F:   (Hf, Vf),   DISPARITY VECTOR f
```

FIG. 10
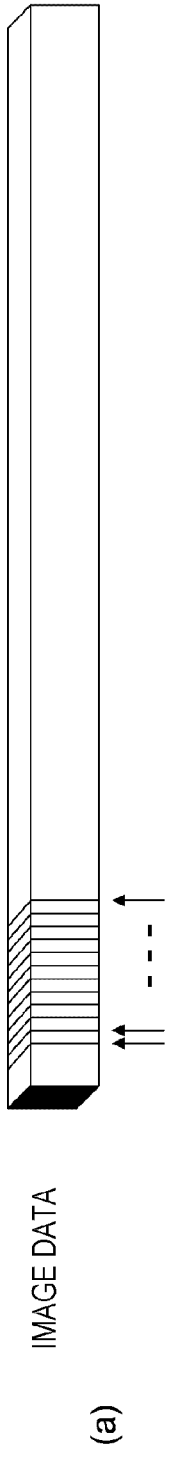
(a) (1) SYNCHRONIZATION WITH ENCODING OF PICTURES
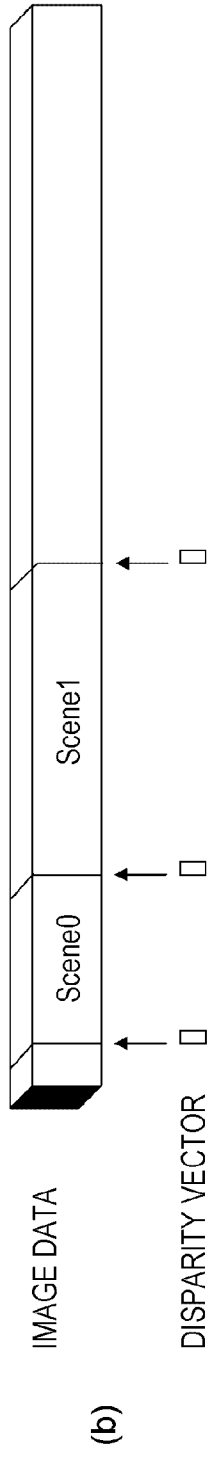
(b) (2) SYNCHRONIZATION WITH SCENES OF VIDEO
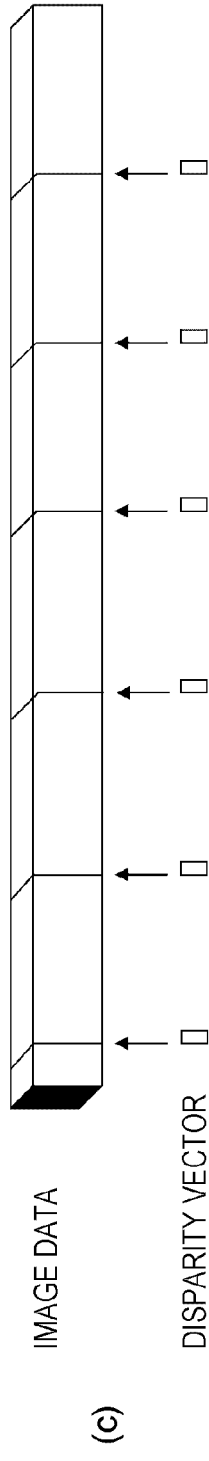
(c) (3) SYNCHRONIZATION WITH I PICTURES OR GOPs OF ENCODED VIDEO

DISPARITY VECTORS (OF RESPECTIVE PIXELS)

PICTURE

DOWNSIZING PROCESS

FIG. 28

STRUCTURE OF DATA UNIT INCLUDED IN CAPTION DATA STREAM

| DATA STRUCTURE | NUMBER OF BITS | NOTATION OF BIT STRING |
|---|---|---|
| data_unit(){ | | |
|   unit_separator | 8 | unimsbf |
|   data_unit_parameter | 8 | unimsbf |
|   data_unit_size | 24 | unimsbf |
|   for(i=0;i<data_unit_size;i++){ | | |
|     data_unit_data_byte | 8 | bslbf |
|   } | | |
| } | | |

FIG. 29

| Data unit | Data unit parameter | Function |
|---|---|---|
| Text | 0x20 | Output text data forming caption. Output setting data such as display area in caption management. |
| Geometric | 0x28 | Output geometric graphic data. |
| ... | ... | ... |
| Bitmap | 0x35 | Output bitmap data. |
| ... | ... | ... |
| Disparity information | 0x48 | Output disparity information for 3D disparity. |

FIG. 30

Disparity_data syntax

| Syntax | No. of Bits | Format |
|---|---|---|
| disparity_data(){ | | |
|     select_view_shift | 2 | bslbf |
|     reserved | 4 | '1111' |
|     direct_mode | 1 | bslbf |
|     shared_disparity | 1 | bslbf |
|     number_of_regions_minus1 | 8 | uimsbf |
|     for (i=0; i< number_of_regions_minus1+1; i++){ | | uimsbf |
|         region_block_id[I] | 8 | uimsbf |
|         temporal_extension_flag | 1 | bslbf |
|         reserved | 7 | '1111111' |
|         disparity[I] | 8 | bslbf |
|         if (temporal_extension_flag){ | | |
|             number_of_frame_set | 8 | bslbf |
|             for (k=0; k< number_of_frame_set;k++){ | | bslbf |
|                 offset_precision | 1 | uimsbf |
|                 reserved | 1 | '1' |
|                 for(j=0; j<11; j++){ | | |
|                     offset_sequence[i,k,j] | 2 | |
|                 } | | |
|             } | | |
|         } | | |
|     } | | |
| } | | |

FIG. 31

Semantics of disparity_data select_view_shift (2 bits)
    Specifying the target view to execute shifting
    "00" = Reserved
    "01" = Shift right view: Right view is shifted by the amount given in disparity[i]
            (left for negative values, right for positive values). Left view is not shifted.
    "10" = Shift left view: Left view is shifted by the amount given in disparity[i]
            (left for negative values, right for positive values). Right view is not shifted.
    "11" = Shift both views (in opposite directions):
            For even values of disparity[i]:
                Left view is shifted by (disparity[i]/2)
                    (left for negative values, right for positive values)
                Right view is shifted in the opposite direction by (disparity[i]/2)
            For odd values of disparity[i]:
                Left view is shifted by ((disparity[i]+1)/2)
                    (left for negative values, right for positive values)
                Right view is shifted in the opposite direction by ((disparity[i]-1)/2)

direct_mode (1 bit) Specifying if disparity_data is configured with the direct partitioned blocks.
    '1' = specifies direct mode indicating that the corresponding disparity data is for generic use
            of application, and associated with specific service component.
    '0' = specifies no direct mode indicating the existence of associated service component
            which is linked with the disparity data..

shared_disparity (1 bit)
    "1" = specifying the single disparity is shared with whole regions or blocks on the service page.
            And the value of number_of_regions_minus1 shall be 0.
    "0" = specifying the disparity is individually sent to each region.

temporal_extension_flag (1 bit)
    '1' = Specify the existence of extended data to update the current disparity data.
            The update of the disparity can be in frame by frame by the setting.
    '0' = No extension is followed, and no disparity updates applied
            the current service display unit segment.

FIG. 32

Semantics of disparity_data  (continued)

number_of_regions_minus1 (8 bits)
Specifying number of regions or blocks with the value [0..255] meaning the actual number is translated into [1..256]
In case direct_mode ='0', number_of_regions specifies the numbers of on screen region.
In case direct_mode = '1', number of regions specifies the numbers of partitioned blocks.
The translated value '1' means whole screen area with no partition.
The translated value '16' means whole screen area is divided by 4 x 4 partitions.
The translated value '256' means the screen area is divided by 16 x 16 partitions.

region_block_id (8 bits)
Identifying the region or block on a screen page or display unit.

disparity (8 bits)
Specifying a signed integer pixel precision value [-128..127].
Positive value describes the 3D depth farther than screen position, while negative value does closer than screen position.

offset_precision (1 bit)
Specifying the precision of the value in offset_sequence
'0' means that the offset_sequence shows in single pixel
'1' means that the offset_sequence is in two-pixel-pair number_of_frame_set (8 bits)
Specifying the period of time that the disparity value is updated in frames by indicating the number of set of eleven-frames in the period.

offset_sequence (2 bits)
Specifying the frame to frame offset updates to the previous stage of disparity data.
'00' No change in disparity from the prior frame.
'01' Positive change in disparity from the prior frame by the amount given in offset_precision.
'10' Negative change in disparity from the prior frame by the amount given in offset_precision.
'11' No frame is assigned for the offset sequence.

STEREO IMAGE DATA TRANSMITTING APPARATUS, STEREO IMAGE DATA TRANSMITTING METHOD, STEREO IMAGE DATA RECEIVING APPARATUS, AND STEREO IMAGE DATA RECEIVING METHOD

CROSS-REFERENCE TO RELATED APPLICATION

The present application is a national phase entry under 35 U.S.C. §371 of International Application No. PCT/JP2010/060585 filed Jun. 22, 2010, published on Jan. 6, 2011 as WO 2011/001857 A1, which claims priority from Japanese Patent Application No. JP 2009-153686 filed in the Japanese Patent Office on Jun. 29, 2009, and Japanese Patent Application No. JP 2010-108988 filed in the Japanese Patent Office on May 11, 2010.

TECHNICAL FIELD

The present invention relates to a stereo image data transmitting apparatus, a stereo image data transmitting method, a stereo image data receiving apparatus, and a stereo image data receiving method, and particularly relates to a stereo image data transmitting apparatus and the like capable of favorably performing display of superimposition information, such as graphics information and text information.

BACKGROUND ART

For example, a method for transmitting stereo image data using television airwaves is suggested in PTL 1. In this case, stereo image data including left-eye image data and right-eye image data is transmitted, and stereo image display using binocular disparity is performed in a television receiver.

FIG. 52 illustrates a relationship between the display positions of left and right images of an object on a screen and the reproduction position of the stereo image formed therefrom in stereo image display using binocular disparity. For example, regarding an object A, a left image La of which is displayed so as to be shifted to the right side and a right image Ra of which is displayed so as to be shifted to the left side on the screen, as illustrated in the figure, left and right lines of sight cross in front of a screen surface, and thus the reproduction position of the stereo image thereof is in front of the screen surface. DPa represents a disparity vector in the horizontal direction regarding the object A.

Also, for example, regarding an object B, a left image Lb and a right image Rb of which are displayed at the same position on the screen, as illustrated in the figure, left and right lines of sight cross on the screen surface, and thus the reproduction position of the stereo image thereof is on the screen surface. Furthermore, for example, regarding an object C, a left image Lc of which is displayed so as to be shifted to the left side and a right image Rc of which is displayed so as to be shifted to the right side on the screen, as illustrated in the figure, left and right lines of sight cross behind the screen surface, and thus the reproduction position of the stereo image thereof is behind the screen surface. DPc represents a disparity vector in the horizontal direction regarding the object C.

CITATION LIST

Patent Literature

PTL 1: Japanese Unexamined Patent Application Publication No. 2005-6114

SUMMARY OF INVENTION

Technical Problem

As described above, in stereo image display, a viewer normally recognizes perspective in a stereo image using binocular disparity. Regarding superimposition information that is to be superimposed on an image, such as graphics information and text information, for example, it is expected to be rendered in conjunction with stereo image display not only in a two-dimensional space but also in three-dimensional perspective.

For example, in the case of performing superimposition display (overlay display) of a caption on an image, a viewer may feel perspective inconsistency unless the caption is displayed in front of the nearest object in the image in terms of perspective. Also, in the case of performing superimposition display of other graphics information or text information on an image, it is expected that disparity adjustment is to be performed in accordance with the perspective of individual objects in the image and perspective consistency is to be maintained.

An object of the present invention is to maintain perspective consistency among individual objects in an image in display of superimposition information, such as graphics information and text information.

Solution to Problem

A concept of the present invention is in a stereo image data transmitting apparatus including an image data output unit that outputs stereo image data including left-eye image data and right-eye image data, a superimposition information data output unit that outputs data of superimposition information that is to be superimposed on images based on the left-eye image data and the right-eye image data, a disparity information output unit that outputs disparity information for giving disparity by shifting the superimposition information that is to be superimposed on the images based on the left-eye image data and the right-eye image data, and a data transmitting unit that transmits a multiplexed data stream including a first data stream and a second data stream, the first data stream including the stereo image data output from the image data output unit, the second data stream including the data of the superimposition information output from the superimposition information data output unit and the disparity information output from the disparity information output unit, wherein the data of the superimposition information and the disparity information are inserted into the second data stream while being distinguished from each other with data type information, wherein pieces of data of a certain number of pieces of the superimposition information that are to be displayed on the same screen are sequentially arranged via a separator in the second data stream, and wherein the disparity information inserted into the second data stream includes a certain number of pieces of disparity information added with respective pieces of identification information indicating arrangement order of the pieces of data of the certain number of pieces of the superimposition information.

In the present invention, stereo image data including left-eye image data and right-eye image data is output from the image data output unit. Also, data of superimposition information that is to be superimposed on images based on the left-eye image data and the right-eye image data is output from the superimposition information data output unit. Here, the superimposition information means information that is to be superimposed on an image, such as graphics information and text information. For example, the data of the superimposition information is caption data in an ARIB method. Also, the disparity information output unit outputs disparity information for giving disparity by shifting the superimposition information that is to be superimposed on images based on the left-eye image data and the right-eye image data.

Also, the multiplexed data stream including the first data stream and the second data stream is transmitted by the data transmitting unit. The first data stream includes the stereo image data output from the image data output unit. Also, the second data stream includes the data of the superimposition information output from the superimposition information data output unit and the disparity information output from the disparity information output unit. In this case, the data of the superimposition information and the disparity information are inserted into the second data stream while being distinguished from each other with data type information.

In the second data stream, pieces of data of a certain number of pieces of the superimposition information that are to be displayed on the same screen are sequentially arranged via a separator. Also, the disparity information inserted into the second data stream includes a certain number of pieces of disparity information added with respective pieces of identification information indicating arrangement order of the pieces of data of the certain number of pieces of the superimposition information.

As described above, in the present invention, the certain number of pieces of disparity information are added with respective pieces of identification information indicating the arrangement order of the pieces of data of the certain number of pieces of the superimposition information that are to be displayed on the same screen, whereby the pieces of data of the certain number of pieces of the superimposition information are associated with the certain number of pieces of disparity information. On the receiver side, appropriate disparity can be given using the pieces of disparity information corresponding to the certain number of pieces of superimposition information that are to be superimposed on a left-eye image and a right-eye image. Accordingly, the perspective consistency among individual objects in an image can be maintained in the optimum state in display of superimposition information.

In the present invention, for example, the disparity information is disparity information that is used in common in a period of a certain number of frames in which superimposition information is displayed or disparity information that is sequentially updated in the period of the certain number of frames. The disparity information may be added with flag information indicating whether the disparity information is disparity information that is used in common in individual frames or disparity information that is sequentially updated in individual frames. In this case, the disparity information that is used in common in individual frames or the disparity information that is sequentially updated in individual frames can be selectively transmitted in accordance with image content, for example. That is, in a case where the motion in an image is large, disparity information that is sequentially updated in individual frames is transmitted, so that the disparity given to superimposition information can be dynamically changed in conjunction with the change in image content on the receiver side. Also, in a case where the motion in an image is small, disparity information that is used in common in individual frames is transmitted, so that the amount of data of disparity information can be suppressed.

Also, in the present invention, for example, the disparity information that is sequentially updated in individual frames may be made up of the disparity information of the first frame in the period of a certain number of frames and the offset information with respect to the disparity information of the preceding frames of the second and subsequent frames. In this case, the amount of data of the disparity information can be suppressed.

Also, in the present invention, for example, the disparity information may be added with shift target information specifying superimposition information that is to be shifted on the basis of the disparity information among the superimposition information that is to be superimposed on the image based on the left-eye image data and the superimposition information that is to be superimposed on the image based on the right-eye image data. With the shift target information, only the superimposition information to be superimposed on a left-eye image can be shifted, only the superimposition information to be superimposed on a right-eye image can be shifted, or the superimposition information to be superimposed on both the left-eye image and right-eye image can be shifted.

Also, another concept of the present invention is in a stereo image data receiving apparatus including a data receiving unit that receives a multiplexed data stream including a first data stream and a second data stream, wherein the first data stream includes stereo image data including left-eye image data and right-eye image data for displaying a stereo image, wherein the second data stream includes data of superimposition information that is to be superimposed on images based on the left-eye image data and the right-eye image data and disparity information for giving disparity by shifting the superimposition information that is to be superimposed on the images based on the left-eye image data and the right-eye image data, wherein the data of the superimposition information and the disparity information are inserted into the second data stream while being distinguished from each other with data type information, wherein pieces of data of a certain number of pieces of the superimposition information that are to be displayed on the same screen are sequentially arranged via a separator in the second data stream, and wherein the disparity information inserted into the second data stream includes a certain number of pieces of disparity information added with respective pieces of identification information indicating arrangement order of the pieces of data of the certain number of pieces of the superimposition information, the stereo image data receiving apparatus further including an image data obtaining unit that obtains the stereo image data from the first data stream included in the multiplexed data stream received by the data receiving unit, a superimposition information data obtaining unit that obtains the data of the superimposition information from the second data stream included in the multiplexed data stream received by the data receiving unit, a disparity information obtaining unit that obtains the disparity information from the second data stream included in the multiplexed data stream received by the data receiving unit, and an image data processing unit that gives disparity to the same superimposition information that is to be superimposed on a left-eye image and a right-eye image using the left-eye image data and the right-eye image data included in the stereo image data obtained by the image data obtaining unit, the disparity information obtained by the disparity information obtaining unit, and the data of the superimposition information obtained by the superimposition information data obtaining unit, thereby obtaining data of the left-eye image on which the superimposition information is superimposed and data of the right-eye image on which the superimposition information is superimposed.

In the present invention, a multiplexed data stream including a first data stream and a second data stream is received by the data receiving unit. The first data stream includes stereo image data including left-eye image data and right-eye image data for displaying a stereo image. Also, in the second data stream, data of superimposition information that is to be superimposed on images based on the left-eye image data and the right-eye image data and disparity information for giving disparity by shifting the superimposition information that is to be superimposed on the images based on the left-eye image data and the right-eye image data are inserted while being distinguished from each other with data type information.

In the second data stream, pieces of data of a certain number of pieces of the superimposition information that are to be displayed on the same screen are sequentially arranged via a separator. Also, the disparity information inserted into the second data stream includes a certain number of pieces of disparity information added with respective pieces of identification information indicating arrangement order of the pieces of data of the certain number of pieces of the superimposition information.

The image data obtaining unit obtains the stereo image data from the first data stream included in the multiplexed data stream received by the data receiving unit. Also, the superimposition information data obtaining unit obtains the data of the superimposition information from the second data stream included in the multiplexed data stream received by the data receiving unit. Also, the disparity information obtaining unit obtains the disparity information from the second data stream included in the multiplexed data stream received by the data receiving unit.

Also, the image data processing unit gives disparity to the same superimposition information that is to be superimposed on a left-eye image and a right-eye image using the left-eye image data and the right-eye image data, the data of superimposition information, and the disparity information, so that data of the left-eye image on which the superimposition information is superimposed and data of the right-eye image on which the superimposition information is superimposed are obtained.

As described above, in the present invention, the certain number of pieces of disparity information are added with respective pieces of identification information indicating the arrangement order of the pieces of data of the certain number of pieces of the superimposition information that are to be displayed on the same screen, whereby the pieces of data of the certain number of pieces of the superimposition information are associated with the certain number of pieces of disparity information. Thus, in the image data processing unit, appropriate disparity can be given using the pieces of disparity information corresponding to the certain number of pieces of superimposition information that are to be superimposed on a left-eye image and a right-eye image. Accordingly, the perspective consistency among individual objects in an image can be maintained in the optimum state in display of superimposition information.

Advantageous Effects of Invention

According to the present invention, a multiplexed data stream including a first data stream including stereo image data and a second data stream including the data of superimposition information and disparity information is transmitted from a transmitter side to a receiver side. Also, in the second data stream, pieces of data of a certain number of pieces of superimposition information that are to be displayed on the same screen are sequentially arranged via a separator. Also, the disparity information inserted into the second data stream includes a certain number of pieces of disparity information added with respective pieces of identification information indicating arrangement order of the pieces of data of the certain number of pieces of superimposition information.

In this way, the certain number of pieces of disparity information are added with the respective pieces of identification information indicating the arrangement order of the pieces of data of the certain number of pieces of superimposition information that are to be displayed on the same screen, so that the pieces of data of the certain number of pieces of superimposition information are associated with the certain number of pieces of disparity information. Therefore, on the receiver side, appropriate disparity can be given using the pieces of disparity information corresponding to the certain number of pieces of superimposition information that are to be superimposed on a left-eye image and a right-eye image. Accordingly, the perspective consistency among individual objects in an image can be maintained in the optimum state in display of superimposition information.

BRIEF DESCRIPTION OF DRAWINGS

FIG. 3 is a diagram illustrating image data of a pixel format of 1920×1080 pixels.

FIG. 4 includes diagrams for explaining a "Top & Bottom" method, a "Side By Side" method, and a "Frame Sequential" method, which are methods for transmitting stereo image data (3D image data).

FIG. 7 includes diagrams illustrating an example of a disparity vector VV at a certain position in an image, detected by a disparity vector detecting unit.

FIG. 8 is a diagram illustrating transmission content of disparity vectors.

FIG. 9 includes diagrams illustrating an example of disparity detection blocks and transmission content of disparity vectors in that case.

FIG. 10 includes diagrams for explaining examples of timings to detect and transmit disparity vectors.

FIG. 28 is a diagram illustrating a structure (Syntax) of a data unit included in a caption data stream.

FIG. 29 is a diagram illustrating an example of 8-bit parameters for identifying the types of data unit.

FIG. 30 is a diagram illustrating an example of a structure (Syntax) of disparity information (Disparity data) stored in a certain number of data unit data bytes in a data unit of disparity information.

FIG. 31 is a diagram illustrating data specification content (Semantics) of disparity information (Disparity data).

FIG. 32 is a diagram illustrating data specification content (Semantics) of disparity information (Disparity data).

DESCRIPTION OF EMBODIMENTS

Hereinafter, an embodiment for carrying out the invention (hereinafter referred to as "embodiment") will be described. Note that the description will be given in the following order.
1. Embodiment
2. Modification

1. Embodiment

Example Configuration of Stereo Image Display System

Figure 1:
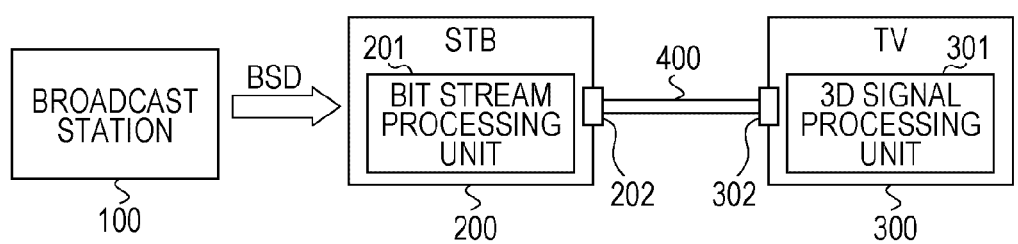
FIG. 1 is a block diagram illustrating an example configuration of a stereo image display system as an embodiment of the present invention.

FIG. 1 illustrates an example configuration of a stereo image display system 10 as an embodiment. The stereo image display system 10 includes a broadcast station 100, a set top box (STB) 200, and a television receiver 300.

The set top box 200 and the television receiver 300 are connected to each other via an HDMI (High Definition Multimedia Interface) cable 400. The set top box 200 is provided with an HDMI terminal 202. The television receiver 300 is provided with an HDMI terminal 302. One end of the HDMI cable 400 is connected to the HDMI terminal 202 of the set top box 200, and the other end of the HDMI cable 400 is connected to the HDMI terminal 302 of the television receiver 300.

[Description of Broadcast Station]

The broadcast station 100 transmits bit stream data BSD using airwaves. The bit stream data BSD includes stereo image data including left-eye image data and right-eye image data, audio data, data of superimposition information, and furthermore disparity information (disparity vectors), etc. Here, the superimposition information may be graphics information, text information, or the like.

[Example Configuration of Transmission Data Generating Unit]

Figure 2:
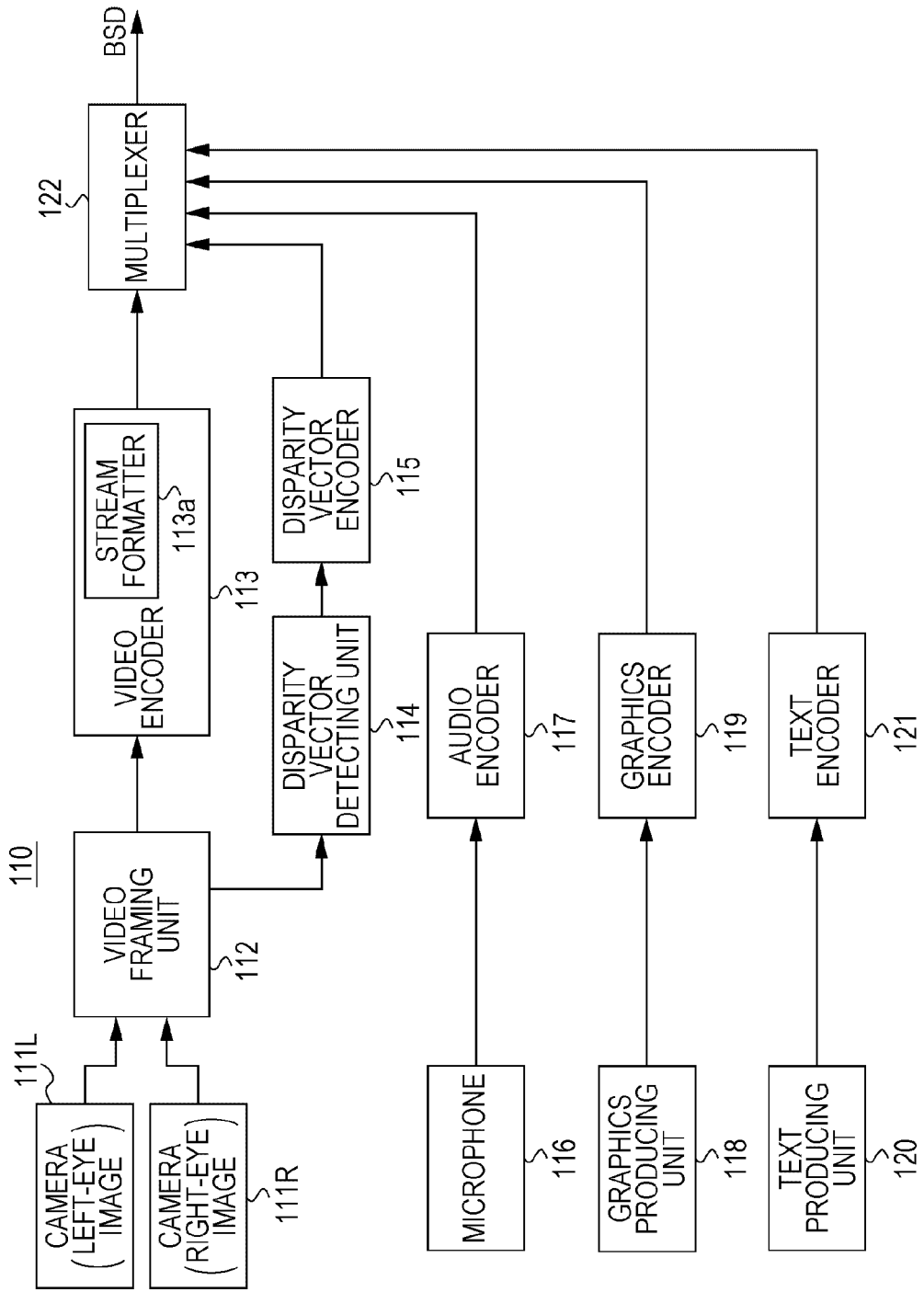
FIG. 2 is a block diagram illustrating an example configuration of a transmission data generating unit in a broadcast station.

FIG. 2 illustrates an example configuration of a transmission data generating unit 110 that generates the above-described bit stream data BSD in the broadcast station 100. This example configuration is an example of transmitting disparity vectors as numerical information. The transmission data generating unit 110 includes cameras 111L and 111R, a video framing unit 112, a video encoder 113, a disparity vector detecting unit 114, and a disparity vector encoder 115.

Also, the transmission data generating unit 110 includes a microphone 116, an audio encoder 117, a graphics producing unit 118, a graphics encoder 119, a text producing unit 120, a text encoder 121, and a multiplexer 122.

The camera 111L captures a left-eye image and obtains left-eye image data for displaying a stereo image. The camera 111R captures a right-eye image and obtains right-eye image data for displaying a stereo image. The video framing unit 112 processes the left-eye image data obtained by the camera 111L and the right-eye image data obtained by the camera 111R into stereo image data in accordance with a transmission method.

[Examples of Method for Transmitting Stereo Image Data]

Here, the following first to third methods are used as methods for transmitting stereo image data (3D image data), but another transmission method may be used instead. Here, a description will be given of a case where each of image data of a left eye (L) and image data of a right eye (R) is image data of a determined resolution, for example, of a pixel format of 1920×1080 pixels, as illustrated in FIG. 3.

The first transmission method is a "Top & Bottom" method, that is, a method for transmitting data of each line of left-eye image data from a first half in the vertical direction, and transmitting data of each line of left-eye image data from a latter half in the vertical direction, as illustrated in FIG. 4(a). In this case, the lines of the left-eye image data and right-eye image data are thinned to one half, so that the vertical resolution is reduced to half that of the original signal.

The second transmission method is a "Side By Side" method, that is, a method for transmitting pixel data of left-eye image data from a first half in the horizontal direction, and transmitting pixel data of right-eye image data from a latter half in the horizontal direction, as illustrated in FIG. 4(b). In this case, in each of the left-eye image data and right-eye image data, the pixel data in the horizontal direction is thinned to one half. The horizontal resolution is reduced to half that of the current signal.

The third transmission method is a "Frame Sequential" method, that is, a method for transmitting left-eye image data and right-eye image data by sequentially switching therebetween for each field, as illustrated in FIG. 4(c).

Referring back to FIG. 2, the video encoder 113 performs encoding on the stereo image data that has been processed by the video framing unit 112 in accordance with MPEG4-AVC, MPEG2, VC-1, or the like, thereby obtaining encoded video data. Also, the video encoder 113 includes a stream formatter 113a in a latter stage. With the stream formatter 113a, the video encoder 113 generates a video elementary stream that includes encoded video data in a payload portion.

The disparity vector detecting unit 114 detects disparity vectors, which are disparity information of one of a left-eye image and a right-eye image with respect to the other, at certain positions in an image on the basis of left-eye image data and right-eye image data. Here, the certain positions in an image may be all pixel positions, representative positions of respective areas made up of a plurality of pixels, or a representative position of an area on which superimposition information, such as graphics information or text information here, is to be superimposed.

[Detection of Disparity Vectors]

Figure 5:
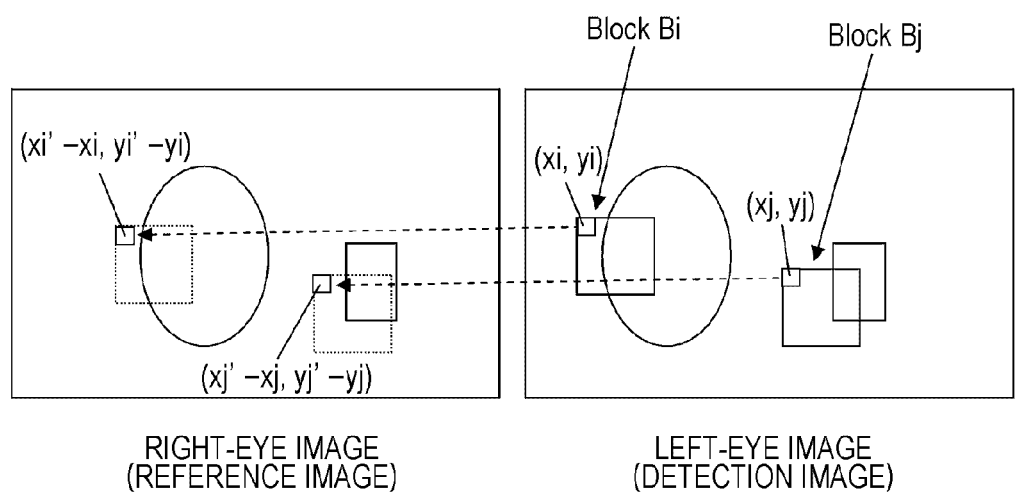
FIG. 5 is a diagram for explaining an example of detecting a disparity vector of a right-eye image with respect to a left-eye image.

An example of detecting disparity vectors will be described. Here, an example of detecting disparity vectors of a right-eye image with respect to a left-eye image will be described. As illustrated in FIG. 5, the left-eye image is regarded as a detection image, and the right-eye image is regarded as a reference image. In this example, the disparity vectors at the positions (xi, yi) and (xj, yj) are detected.

The case of detecting a disparity vector at the position (xi, yi) will be described as an example. In this case, a pixel block (disparity detection block) Bi of 8×8 or 16×16, for example, with the pixel at the position (xi, yi) being at the top-left, is set in the left-eye image. Then, a pixel block that matches the pixel block Bi is searched for in the right-eye image.

In this case, a search range having the position (xi, yi) at the center is set in the right-eye image, and comparison blocks of 8×8 or 16×16, for example, similar to the above-described pixel block Bi, are sequentially set by sequentially regarding the individual pixels in the search range as a target pixel.

Figure 6:
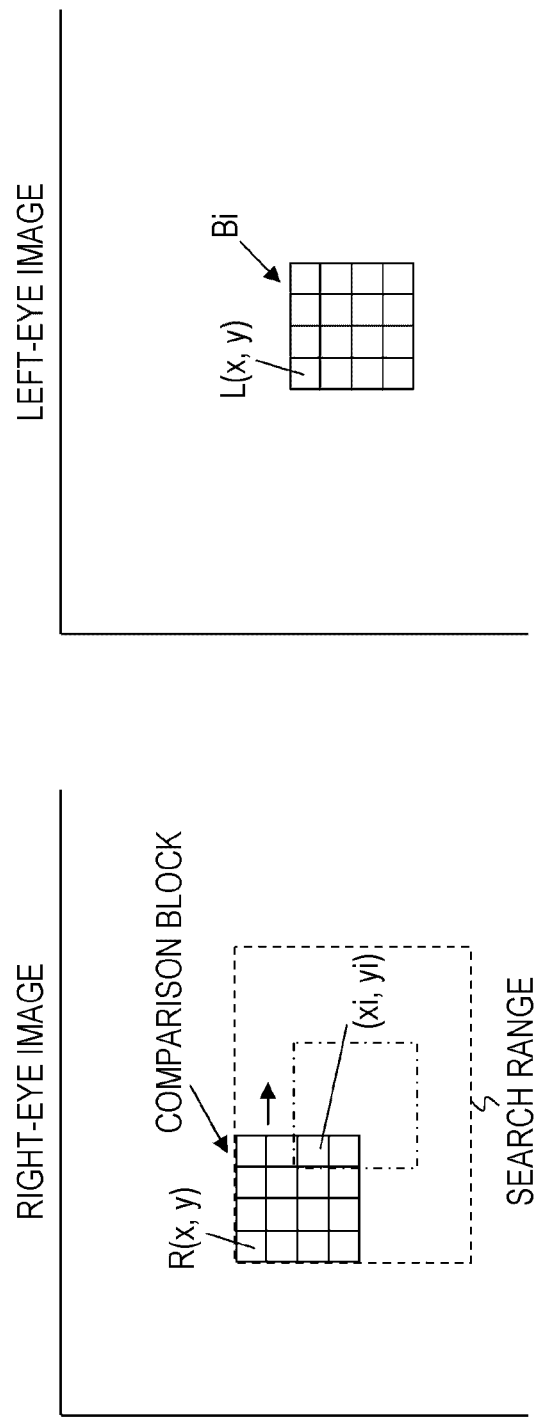
FIG. 6 is a diagram for explaining obtaining a disparity vector using a block matching method.

The sums of absolute values of differences between pixels corresponding to each other are obtained between the pixel block Bi and the comparison blocks that are sequentially set. Here, as illustrated in FIG. 6, when the pixel value of the pixel block Bi is L(x, y) and the pixel value of the comparison block is R(x, y), the sum of absolute values of differences between the pixel block Bi and a certain comparison block is expressed by $\Sigma |L(x, y)-R(x, y)|$.

When n pixels are included in the search range that is set in the right-eye image, n sums S1 to Sn are eventually obtained, and a minimum sum 5 min is selected from among them. Then, the position (xi', yi') of the pixel at the top-left is obtained from the comparison block from which the sum Smin is obtained. Accordingly, the disparity vector at the position (xi, yi) is detected as (xi'-xi, yi'-yi). Although a detailed description is omitted, the disparity vector at the position (xj, yj) is also detected in a similar process procedure, with a pixel block Bj of 8×8 or 16×16, for example, being set with the pixel at the position (xj, yj) being at the top-left in the left-eye image.

FIG. 7(a) illustrates an example of a disparity vector VV at a certain position in an image, detected by the disparity vector detecting unit 114. In this case, as illustrated in FIG. 7(b), the left-eye image (detection image) overlaps the right-eye image (reference image) when being shifted by the disparity vector VV at the certain position in this image.

Referring back to FIG. 2, the disparity vector encoder 115 generates an elementary stream of disparity vectors including the disparity vectors detected by the disparity vector detecting unit 114. Here, the elementary stream of disparity vectors includes the following content. That is, an ID (ID_Block), vertical position information (Vertical_Position), horizontal position information (Horizontal Position), and a disparity vector (View_Vector) form one set. Then, this one set is repeated the number of disparity detection blocks, which is N.

FIG. 8 illustrates transmission content of disparity vectors. A disparity vector includes a vertical direction component (View_Vector_Vertical) and a horizontal direction component (View_Vector_Horizontal). Note that the vertical and horizontal positions of a disparity detection block serve as offset values in the vertical direction and the horizontal direction from the origin at the top-left of the image to the pixel at the top-left of the block. The ID of a disparity detection block is attached when transmitting each disparity vector in order to establish a link to superimposition information, such as graphics information and text information, displayed while being superimposed on an image.

Note that, in the example in FIG. 8, a horizontal and vertical disparity vector (disparity information) is 16-bit information. However, the number of bits of this disparity vector (disparity information) is not limited to sixteen bits. An appropriate number of bits may be employed depending on a display size or the level of disparity that should be given, for example, eight bits described below.

For example, when disparity detection blocks A to F exist, as illustrated in FIG. 9(a), transmission content includes the IDs of the disparity detection blocks A to F, vertical and horizontal position information, and disparity vectors, as illustrated in FIG. 9(b). For example, in FIG. 9(b), regarding the disparity detection block A, ID2 represents the ID of the disparity detection block A, (Ha, Va) represents the vertical and horizontal position information of the disparity detection block A, and disparity vector a represents the disparity vector of the disparity detection block A.

Now, the timing to detect and transmit disparity vectors will be described. The following first to fourth examples are available for this timing.

In the first example, the timing is synchronized with encoding of pictures, as illustrated in FIG. 10(a). In this case, disparity vectors are transmitted in units of pictures. The picture is the smallest unit for transmitting disparity vectors. In the second example, the timing is synchronized with scenes of video, as illustrated in FIG. 10(b). In this case, disparity vectors are transmitted in units of scenes.

Figure 11:
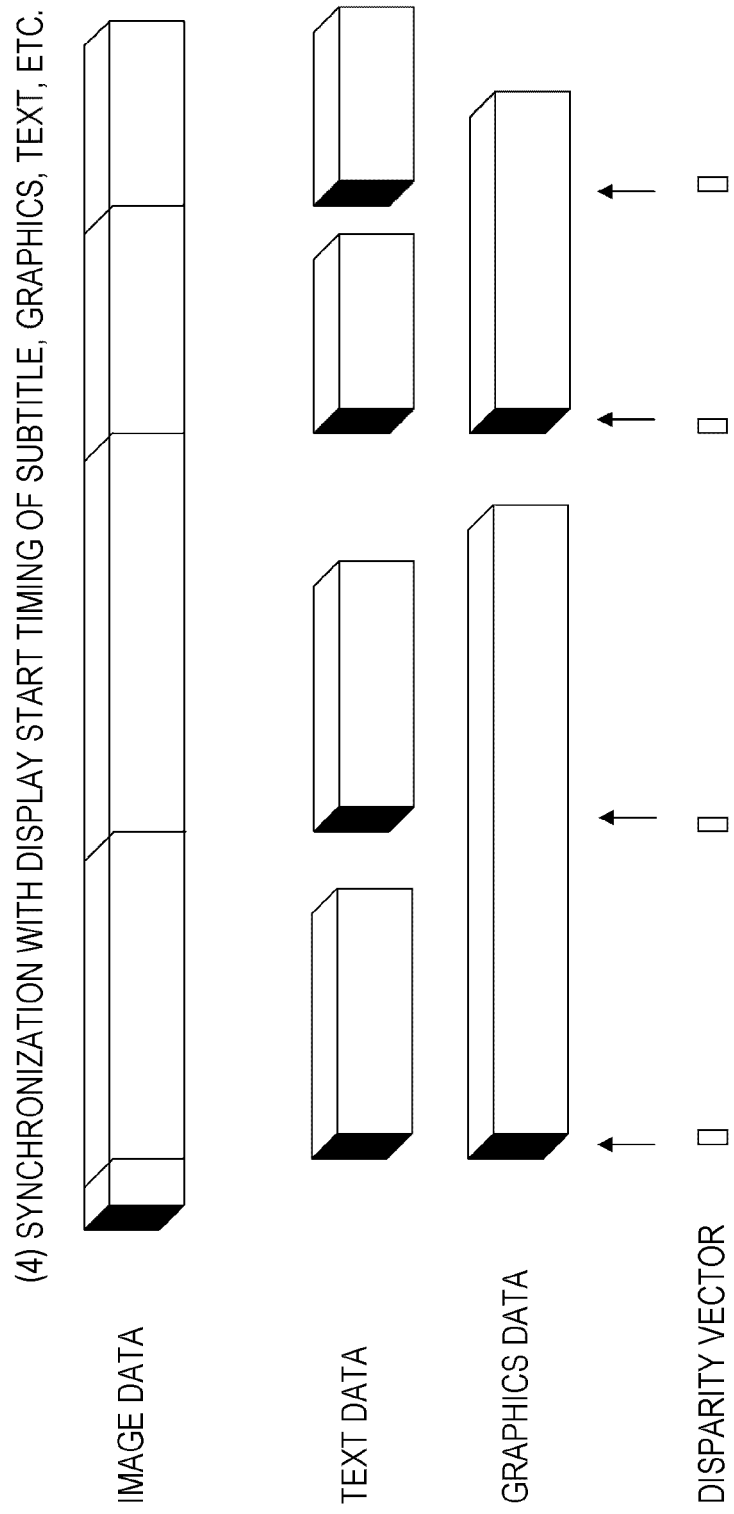
FIG. 11 is a diagram for explaining examples of timings to detect and transmit disparity vectors.

In the third example, the timing is synchronized with I pictures (Intra pictures) or GOPs (Groups Of Pictures) of encoded video, as illustrated in FIG. 10(c). In the fourth example, the timing is synchronized with the display start timing of superimposition information, such as graphics information and text information, displayed while being superimposed on an image, as illustrated in FIG. 11.

Referring back to FIG. 2, the microphone 116 detects the audio corresponding to the images captured by the cameras 111L and 111R, thereby obtaining audio data. The audio encoder 117 performs encoding on the audio data obtained by the microphone 116 in accordance with MPEG-2 Audio AAC or the like, thereby generating an audio elementary stream.

The graphics producing unit 118 produces the data (graphics data) of graphics information (including subtitle information) that is to be superimposed on an image. The graphics encoder 119 generates a graphic elementary stream including the graphics data produced by the graphics producing unit 118. Here, the graphics information forms superimposition information.

The graphics information may be a logo, for example. The subtitle information may be a caption, for example. The graphics data is bitmap data. The graphics data is added with idling offset information indicating a superimposed position on an image. The idling offset information indicates offset values in the vertical direction and the horizontal direction from the origin at the top-left of an image to the pixel at the top-left at the superimposed position of graphics information, for example. Note that a standard for transmitting caption data as bitmap data is standardized as DVB_Subtitling by DVB, which is a digital broadcasting standard in Europe, and is operated.

The text producing unit 120 produces the data (text data) of text information (including closed-caption information) that is to be superimposed on an image. The text encoder 121 generates a text elementary stream including the text data produced by the text producing unit 120. Here, the text information forms superimposition information.

The text information may be an electronic program table or the content of text broadcasting, for example. Like the above-described graphics data, the text data is added with idling offset information indicating a superimposed position on an image. The idling offset information indicates offset values in the vertical direction and the horizontal direction from the origin at the top-left of an image to the pixel at the top-left at the superimposed position of the text information, for example. Note that examples of transmitting text data include EPG that is operated for reserving a program and CC_data (Closed Caption) of an American digital terrestrial standard ATSC.

The multiplexer 122 multiplexes the individual elementary streams output from the video encoder 113, the disparity vector encoder 115, the audio encoder 117, the graphics encoder 119, and the text encoder 121. Then, the multiplexer 122 outputs bit stream data (transport stream) BSD serving as transmission data (multiplexed data stream).

The operation of the transmission data generating unit 110 illustrated in FIG. 2 will be briefly described. A left-eye image is captured by the camera 111L. The left-eye image data that is obtained by the camera 111L and that is for displaying a stereo image is supplied to the video framing unit 112. Also, a right-eye image is captured by the camera 111R. The right-eye image data that is obtained by the camera 111R and that is for displaying a stereo image is supplied to the video framing unit 112. In the video framing unit 112, the left-eye image data and the right-eye image data are processed into stereo image data in accordance with a transmission method, so that stereo image data is obtained (see FIGS. 4(a) to 4(c)).

The stereo image data obtained by the video framing unit 112 is supplied to the video encoder 113. In the video encoder 113, encoding is performed on the stereo image data in accordance with MPEG4-AVC, MPEG2, VC-1, or the like, so that a video elementary stream including the encoded video data is generated. This video elementary stream is supplied to the multiplexer 122.

Also, the left-eye image data and the right-eye image data obtained by the cameras 111L and 111R are supplied to the disparity vector detecting unit 114 via the video framing unit 112. In the disparity vector detecting unit 114, disparity detection blocks are set at certain positions in an image on the basis of the left-eye image data and the right-eye image data, and disparity vectors, which serve as disparity information of one of the left-eye image and the right-eye image with respect to the other, are detected.

The disparity vectors at the certain positions in the image detected by the disparity vector detecting unit 114 are supplied to the disparity vector encoder 115. In this case, the ID of a disparity detection block, the vertical position information of the disparity detection block, the horizontal position information of the disparity detection block, and a disparity vector are supplied as one set. In the disparity vector encoder 115, a disparity vector elementary stream including the transmission content of disparity vectors (see FIG. 8) is generated. This disparity vector elementary stream is supplied to the multiplexer 122.

Also, in the microphone 116, the audio corresponding to the images captured by the cameras 111L and 111R is detected. The audio data obtained by the microphone 116 is supplied to the audio encoder 117. In the audio encoder 117, encoding is performed on the audio data in accordance with MPEG-2 Audio AAC or the like, so that an audio elementary stream including the encoded audio data is generated. This audio elementary stream is supplied to the multiplexer 122.

Also, in the graphics producing unit 118, the data of graphics information (graphics data) that is to be superimposed on an image is produced. The graphics data is supplied to the graphics encoder 119. The graphics data is added with idling offset information indicating a superimposed position on an image. In the graphics encoder 119, certain encoding is performed on the graphics data, so that a graphics elementary stream including the encoded data is generated. This graphics elementary stream is supplied to the multiplexer 122.

Also, in the text producing unit 120, the data of text information (text data) that is to be superimposed on an image is produced. The text data is supplied to the text encoder 121. Like the above-described graphics data, the text data is added with idling offset information indicating a superimposed position on an image. In the text encoder 121, certain encoding is performed on the text data, so that a text elementary stream including the encoded data is generated. This text elementary stream is supplied to the multiplexer 122.

In the multiplexer 122, the elementary streams supplied from the respective encoders are packetized and multiplexed, so that bit stream data (transport stream) BSD as transmission data is obtained.

Figure 12:
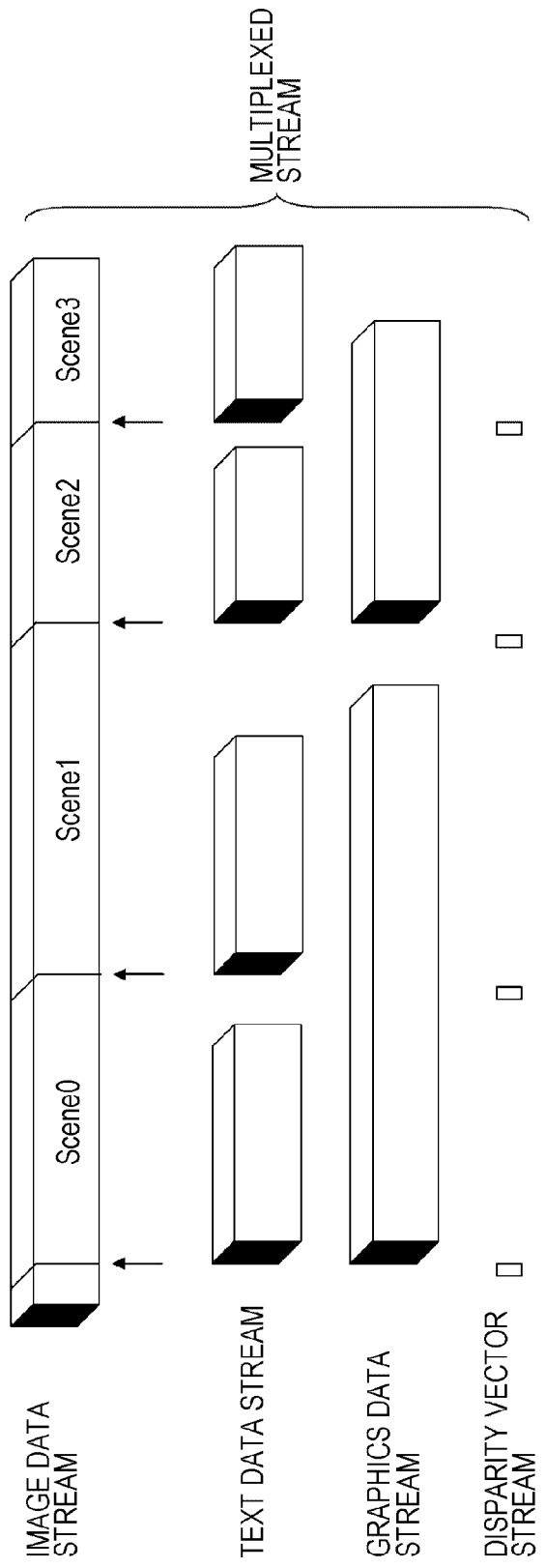
FIG. 12 is a diagram illustrating an example of individual data streams multiplexed in the transmission data generating unit.

FIG. 12 illustrates an example of individual data streams multiplexed in the transmission data generating unit 110 illustrated in FIG. 2. Note that this example shows a case where disparity vectors are detected and transmitted in units of scenes of video (see FIG. 10(*b*)). Note that the packets of the individual streams are added with a time stamp for synchronized display, so that the timing to superimpose subtitle information, graphics information, text information, or the like on an image can be controlled on a receiver side.

Note that, in the transmission data generating unit 110 illustrated in FIG. 2, stereo image data is generated by the video framing unit 112, disparity information (disparity vectors) is detected by the disparity vector detecting unit 114, and audio data is obtained by the microphone 116. However, a configuration of reading and obtaining the stereo image data, disparity information (disparity vectors), and audio data from a data recording medium by a data retrieving unit (archive unit) may be accepted.

[Another Example Configuration of Transmission Data Generating Unit]

Note that the above-described transmission data generating unit 110 illustrated in FIG. 2 has a configuration for transmitting the transmission content of disparity vectors (see FIG. 8) as an independent elementary stream to a receiver side. However, the transmission content of disparity vectors may be transmitted while being embedded in another stream. For example, the transmission content of disparity vectors may be transmitted while being embedded as user data in a video stream. Also, for example, the transmission content of disparity vectors may be transmitted while being embedded in a stream of graphics or text.

Figure 13:
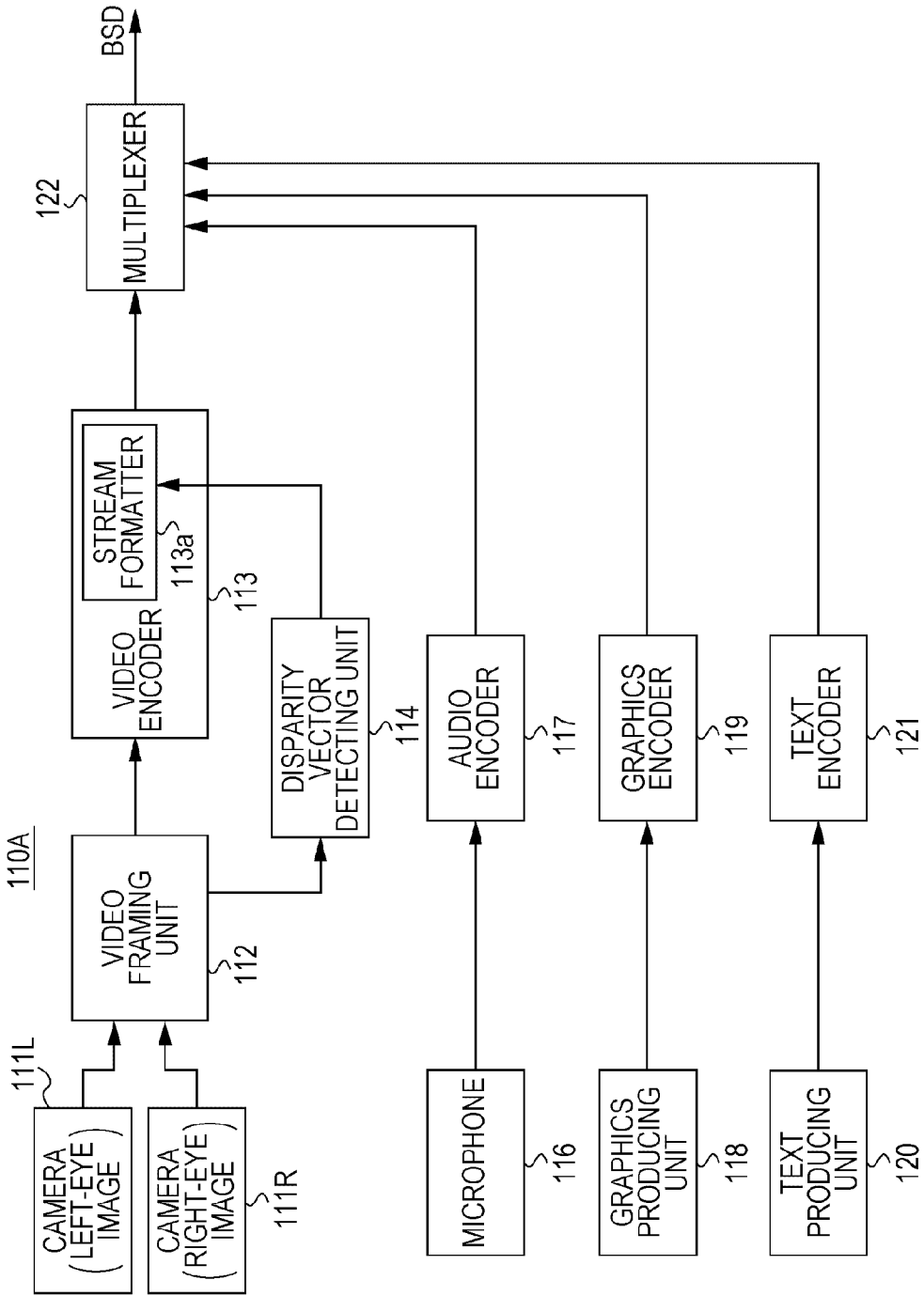
FIG. 13 is a block diagram illustrating another example configuration of the transmission data generating unit in the broadcast station.

FIG. 13 illustrates an example configuration of a transmission data generating unit 110A. This example is also an example of transmitting disparity vectors as numerical information. The transmission data generating unit 110A has a configuration for transmitting the transmission content of disparity vectors by embedding it as user data in a video stream. In FIG. 13, the parts corresponding to those in FIG. 2 are denoted by the same reference numerals, and the detailed description thereof is omitted.

In the transmission data generating unit 110A, disparity vectors at certain positions in an image detected by the disparity vector detecting unit 114 are supplied to the stream formatter 113a in the video encoder 113. In this case, the ID of a disparity detection block, the vertical position information of the disparity detection block, the horizontal position information of the disparity detection block, and a disparity vector are supplied as one set. In the stream formatter 113a, the transmission content of disparity vectors (see FIG. 8) is embedded as user data in a video stream.

Other than that, the transmission data generating unit 110A illustrated in FIG. 13 is configured similarly to the transmission data generating unit 110 illustrated in FIG. 2, although a detailed description is omitted.

Figure 14:
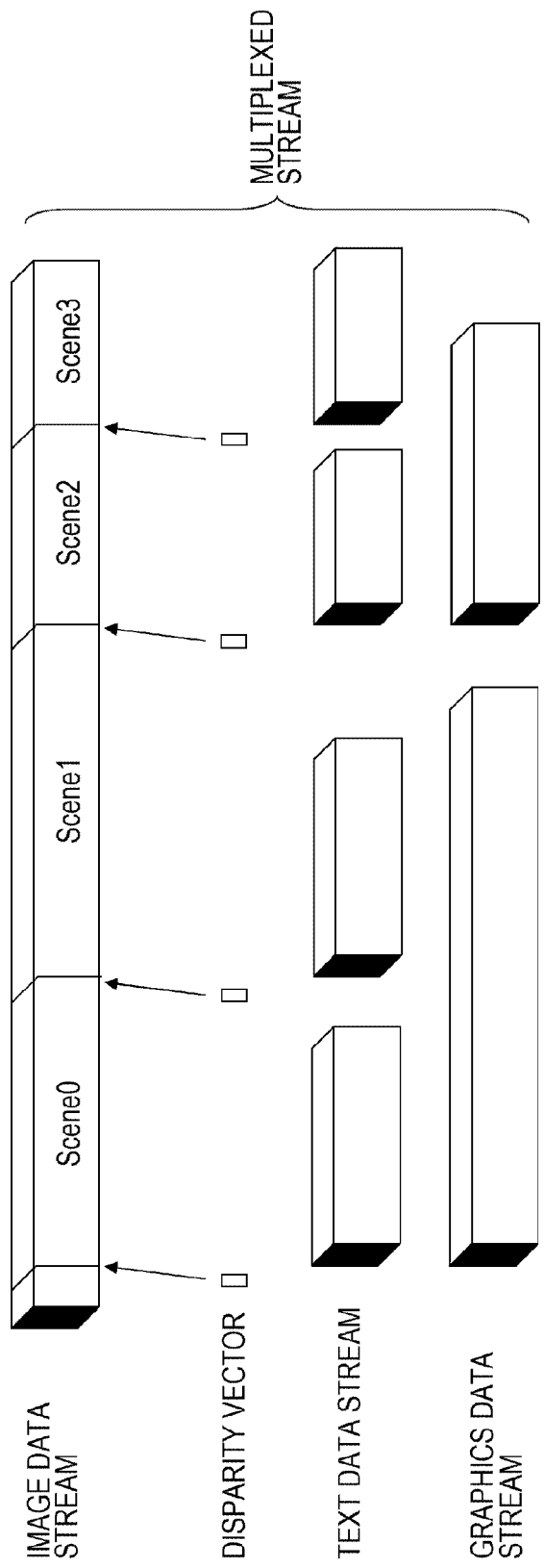
FIG. 14 illustrates an example of individual streams multiplexed in the transmission data generating unit in the broadcast station.

FIG. 14 illustrates an example of an image data stream, a graphics data stream, and a text data stream that are multiplexed in the transmission data generating unit 110A illustrated in FIG. 13. Disparity vectors (disparity information) are transmitted while being embedded in the image data stream.

[Another Example Configuration of Transmission Data Generating Unit]

Figure 15:
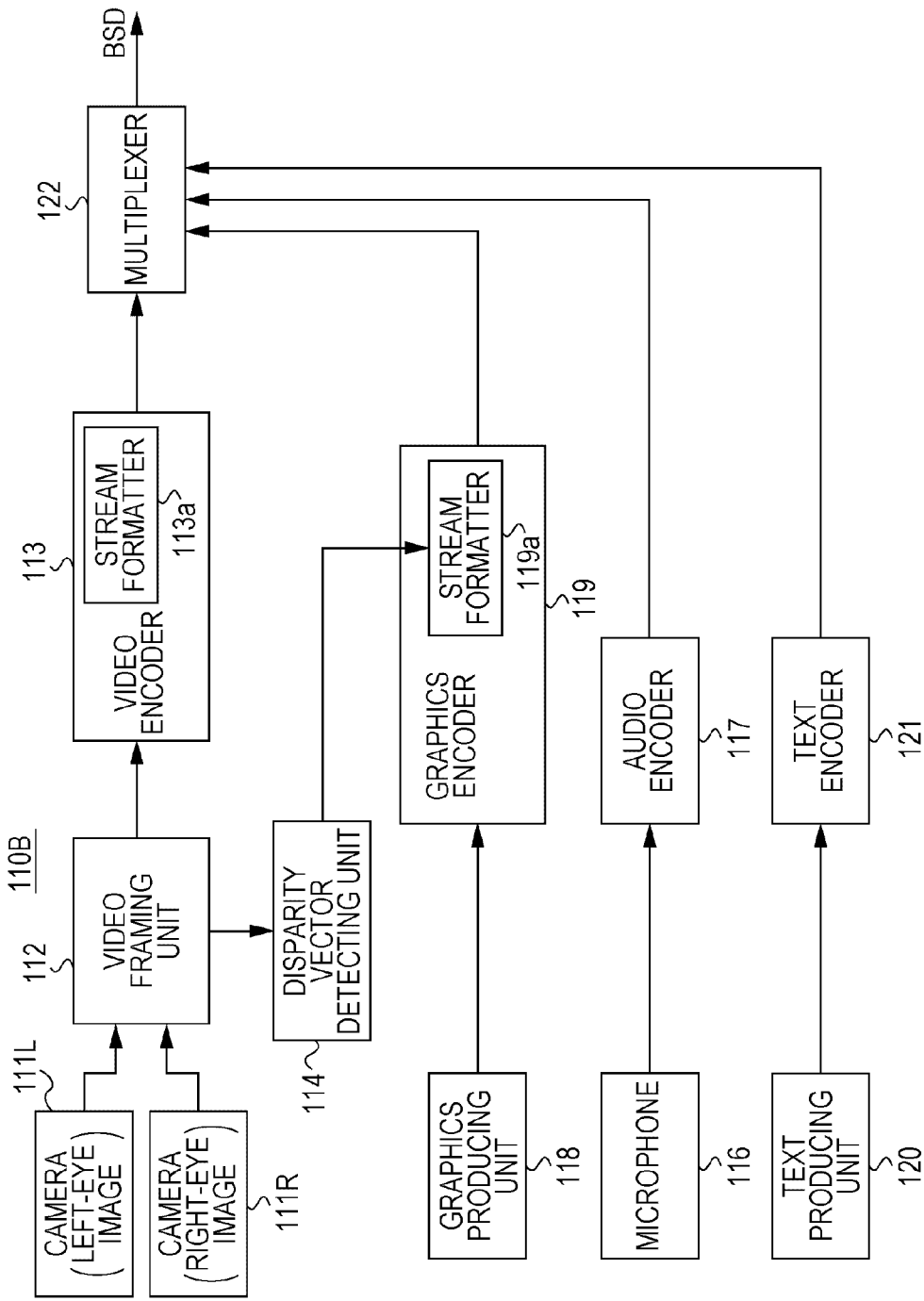
FIG. 15 is a block diagram illustrating another example configuration of the transmission data generating unit in the broadcast station.

FIG. 15 illustrates an example configuration of a transmission data generating unit 110B. This example is also an example of transmitting disparity vectors as numerical information. The transmission data generating unit 110B has a configuration for transmitting the transmission content of disparity vectors by embedding it in a graphics data stream. In FIG. 15, the parts corresponding to those in FIG. 2 are denoted by the same reference numerals, and the detailed description thereof is omitted.

In the transmission data generating unit 110B, disparity vectors at certain positions in an image detected by the disparity vector detecting unit 114 are supplied to a stream formatter 119a in the graphics encoder 119. In this case, the ID of a disparity detection block, the vertical position information of the disparity detection block, the horizontal position information of the disparity detection block, and a disparity vector are supplied as one set. In the stream formatter 119a, the transmission content of disparity vectors (see FIG. 8) is embedded in a graphics data stream.

Other than that, the transmission data generating unit 110B illustrated in FIG. 15 is configured similarly to the transmission data generating unit 110 illustrated in FIG. 2 and operates similarly thereto, although a detailed description is omitted.

Figure 16:
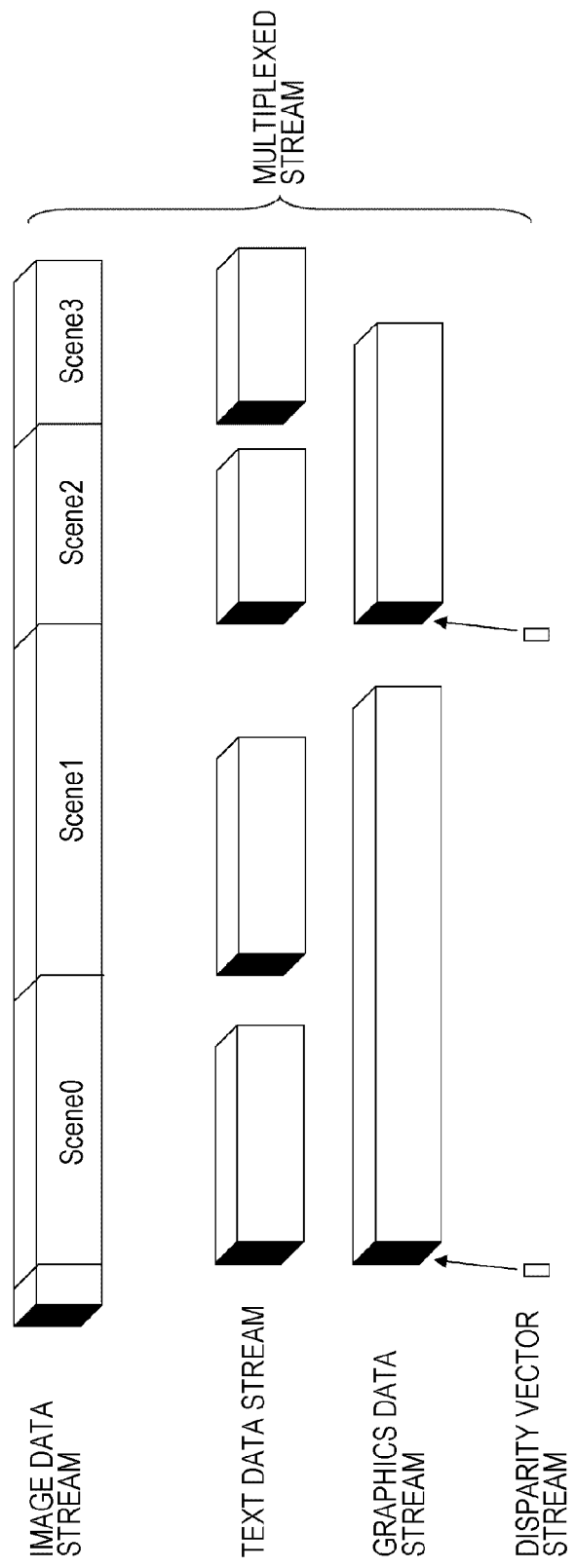
FIG. 16 illustrates an example of individual streams multiplexed in the transmission data generating unit in the broadcast station.

FIG. 16 illustrates an example of an image data stream, a graphics data stream, and a text data stream that are multiplexed in the transmission data generating unit 110B illustrated in FIG. 15. Disparity vectors (disparity information) are transmitted while being embedded in a graphics data stream.

[Another Example Configuration of Transmission Data Generating Unit]

Also, the above-described transmission data generating units 110, 110A, and 110B illustrated in FIG. 2, FIG. 13, and FIG. 15 transmit disparity vectors as numerical information (see FIG. 8). However, instead of transmitting disparity vectors as numerical information, the disparity information may be reflected in advance in the data of superimposition information (such as graphics information and text information, for example) that is to be superimposed on an image on a transmitter side, before transmitting the disparity information.

For example, in the case of reflecting the disparity information in the data of graphics information, graphics data corresponding to both the left-eye graphics information that should be superimposed on a left-eye image and right-eye graphics information that should be superimposed on a right-eye image is generated on a transmitter side. In this case, the left-eye graphics information and the right-eye graphics information are the same graphics information. However, the display position in an image of the right-eye graphics information is shifted in the horizontal direction by the horizontal direction component of the disparity vector corresponding to the display position with respect to the left-eye graphics information, for example.

For example, a disparity vector corresponding to the superimposed position among the disparity vectors detected at a plurality of positions in an image is used as a disparity vector. Also, for example, a disparity vector at the nearest position recognized in terms of perspective among the disparity vectors detected at a plurality of positions in an image is used as a disparity vector. Note that this is the same in the case of reflecting disparity information in the data of text information, although a detailed description is omitted.

Figure 17:
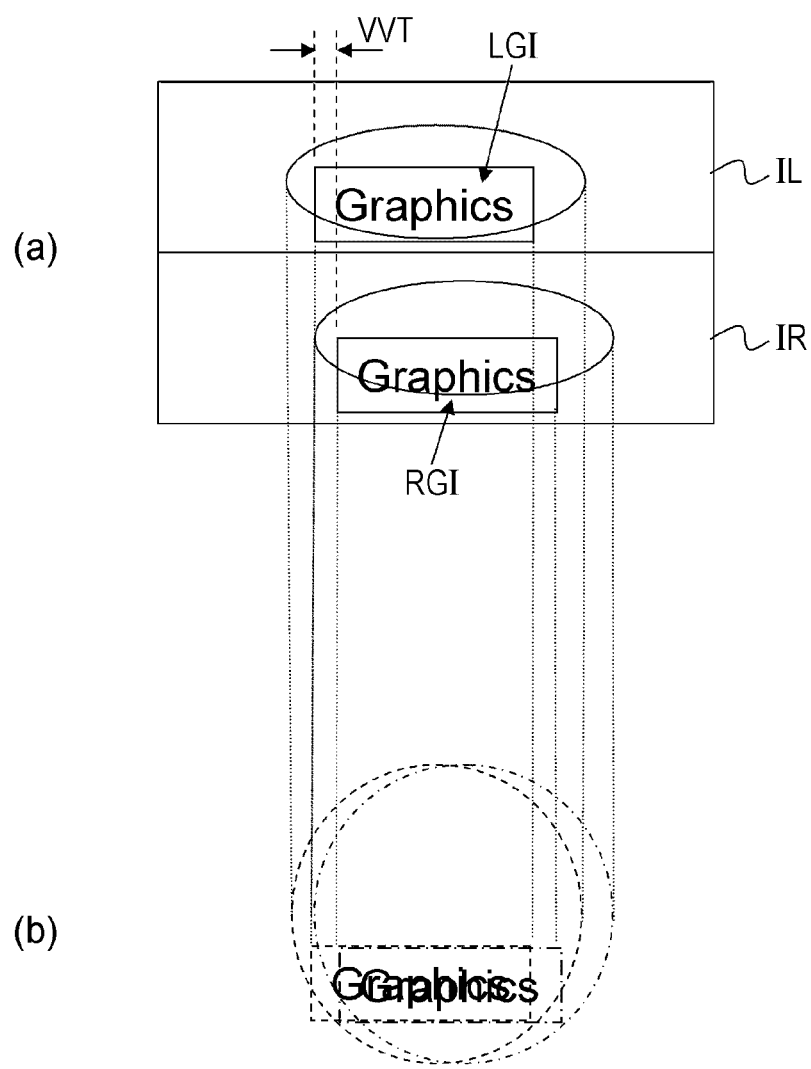
FIG. 17 includes diagrams for explaining superimposed positions or the like of left-eye graphics information and right-eye graphics information in a case where a transmission method is a first transmission method ("Top & Bottom" method).

FIG. 17(a) illustrates the superimposed positions of left-eye graphics information and right-eye graphics information in a case where the transmission method is the above-described first transmission method ("Top & Bottom" method). The left-eye graphics information and the right-eye graphics information are the same graphics information. However, the right-eye graphics information RGI superimposed on a right-eye image IR is at the position shifted in the horizontal direction by a horizontal direction component VVT of a disparity vector with respect to the left-eye graphics information LGI superimposed on a left-eye image IL.

Graphics data is generated so that the individual pieces of graphics information LGI and RGI are superimposed on the respective images IL and IR, as illustrated in FIG. 17(a). Accordingly, a viewer can observe the individual pieces of graphics information LGI and RGI with disparity together with the respective images IL and IR, as illustrated in FIG. 17(b), and perspective can be recognized also in the graphics information.

Figure 18:
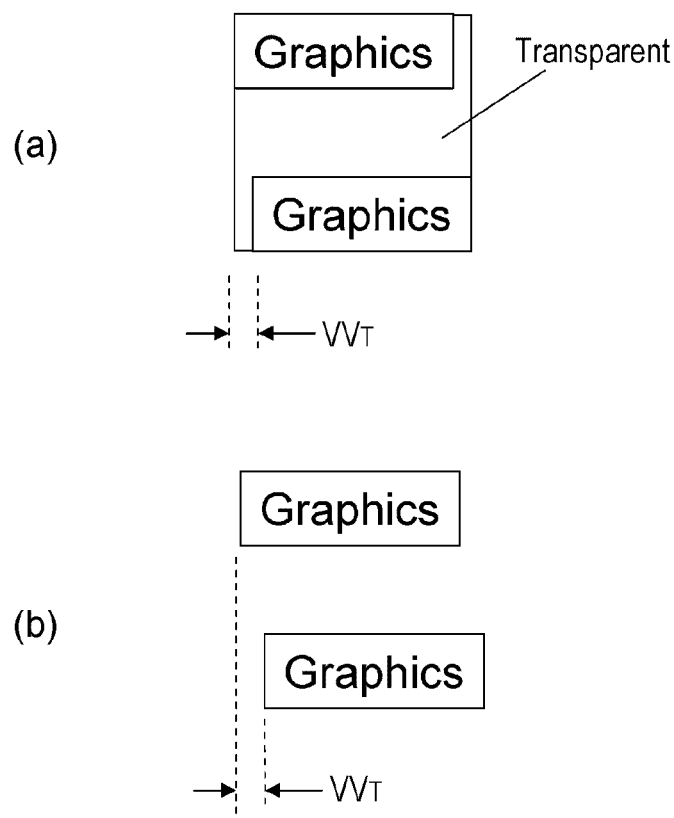
FIG. 18 includes diagrams for explaining a method for generating left-eye graphics information and right-eye graphics information in a case where a transmission method is the first transmission method ("Top & Bottom" method).

For example, the graphics data of the individual pieces of graphics information LGI and RGI is generated as data of a single area, as illustrated in FIG. 18(a). In this case, the data of the portion other than the individual pieces of graphics information LGI and RGI may be generated as transparent data. Also, for example, the graphics data of the individual pieces of graphics information LGI and RGI is generated as data of separate areas, as illustrated in FIG. 18(b).

Figure 19:
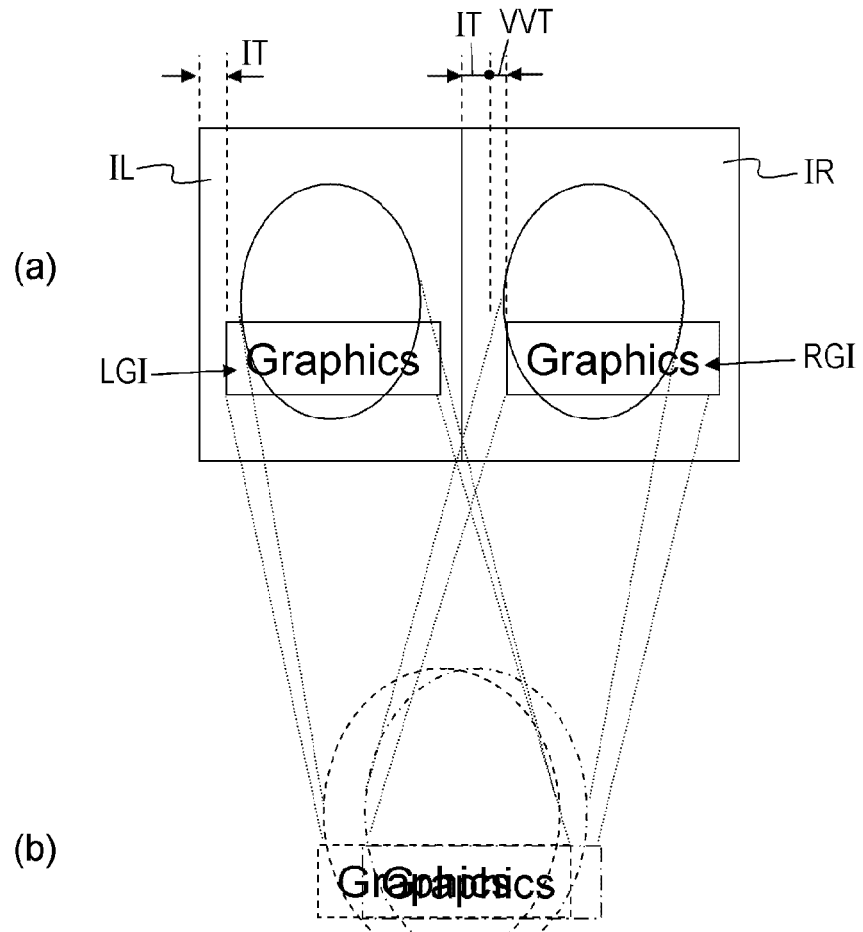
FIG. 19 includes diagrams for explaining a method for generating left-eye graphics information and right-eye graphics information in a case where a transmission method is a second transmission method ("Side By Side" method).

FIG. 19(a) illustrates the superimposed positions of left-eye graphics information and right-eye graphics information in a case where the transmission method is the above-described second transmission method ("Side By Side" method). The left-eye graphics information and the right-eye graphics information are the same graphics information. However, the right-eye graphics information RGI superimposed on the right-eye image IR is at the position shifted in the horizontal direction by the horizontal direction component VVT of the disparity vector with respect to the left-eye graphics information LGI superimposed on the left-eye image IL. Note that IT is an idling offset value.

Graphics data is generated so that the individual pieces of graphics information LGI and RGI are superimposed on the respective images IL and IR, as illustrated in FIG. 19(a). Accordingly, a viewer can observe the individual pieces of graphics information LGI and RGI with disparity together with the respective images IL and IR, as illustrated in FIG. 19(b), and perspective can be recognized also in the graphics information.

Figure 20:
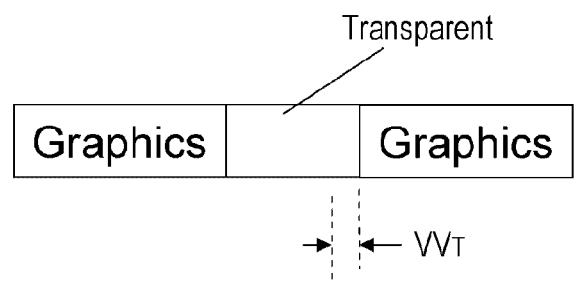
FIG. 20 is a diagram for explaining a method for generating left-eye graphics information and right-eye graphics information in a case where a transmission method is the second transmission method ("Side By Side" method).

For example, the graphics data of the individual pieces of graphics information LGI and RGI is generated as data of a single area, as illustrated in FIG. 20. In this case, the data of the portion other than the individual pieces of graphics information LGI and RGI may be generated as transparent data.

Figure 21:
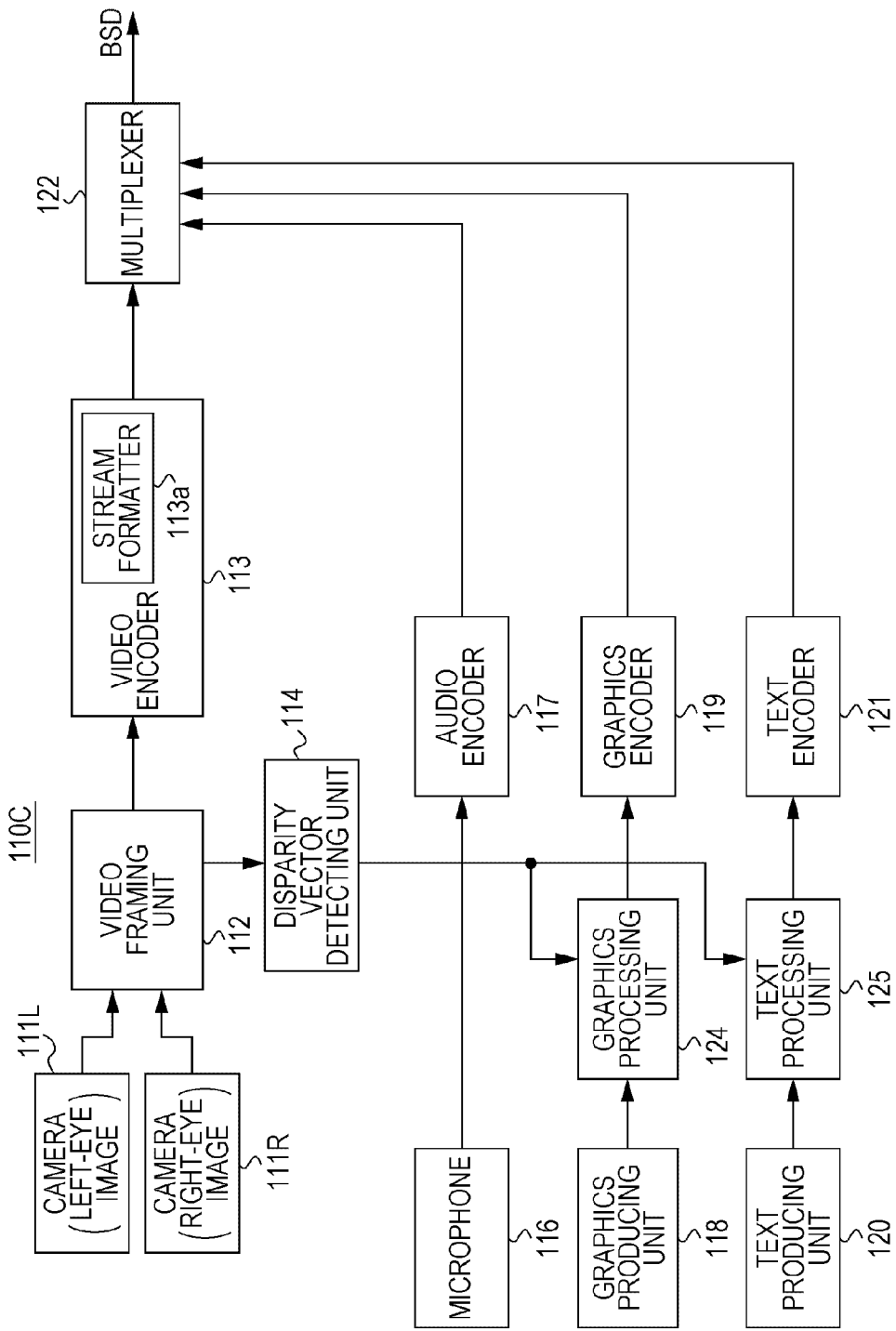
FIG. 21 is a block diagram illustrating another example configuration of the transmission data generating unit in the broadcast station.

FIG. 21 illustrates an example configuration of a transmission data generating unit 110C. The transmission data generating unit 110C has a configuration for reflecting disparity information in the data of superimposition information, such as graphics information and text information, and transmitting it. In FIG. 21, the parts corresponding to those in FIG. 2 are denoted by the same reference numerals, and the detailed description thereof is omitted.

In the transmission data generating unit 110C, a graphics processing unit 124 is inserted between the graphics producing unit 118 and the graphics encoder 119. Also, in the transmission data generating unit 110C, a text processing unit 125 is inserted between the text producing unit 120 and the text encoder 121. Also, the disparity vectors at certain positions in an image detected by the disparity vector detecting unit 114 are supplied to the graphics processing unit 124 and the text processing unit 125.

In the graphics processing unit 124, the data of left-eye graphics information that is to be superimposed on a left-eye image and the data of right-eye graphics information that is to be superimposed on a right-eye image are generated on the basis of the graphics data produced by the graphics producing unit 118. In this case, the left-eye graphics information and the right-eye graphics information are the same graphics information. However, the superimposed position in an image of the right-eye graphics information is shifted in the horizontal direction by the horizontal direction component VVT of the disparity vector with respect to the left-eye graphics information, for example (see FIG. 17(a) and FIG. 19(a)).

The graphics data generated in this way by the graphics processing unit 124 is supplied to the graphics encoder 119. Note that the graphics data is added with idling offset information indicating the superimposed position on an image. In the graphics encoder 119, an elementary stream of the graphics data generated by the graphics processing unit 124 is generated.

Also, in the text processing unit 125, the data of left-eye text information that is to be superimposed on a left-eye image and the data of right-eye text information that is to be superimposed on a right-eye image are generated on the basis of the text data produced by the text producing unit 120. In this case, the left-eye text information and the right-eye text information are the same text information, but the superimposed position in an image of the right-eye text information is shifted in the horizontal direction by the horizontal direction component VVT of the disparity vector with respect to the left-eye text information, for example.

The text data generated in this way by the text processing unit 125 is supplied to the text encoder 121. Note that the text data is added with idling offset information indicating the superimposed position on an image. In the text encoder 121, an elementary stream of the text data generated by the text processing unit 125 is generated.

Other than that, the transmission data generating unit 110C illustrated in FIG. 21 is configured similarly to the transmission data generating unit 110 illustrated in FIG. 2, although a detailed description is omitted.

[Another Example Configuration of Transmission Data Generating Unit]

Figure 22:
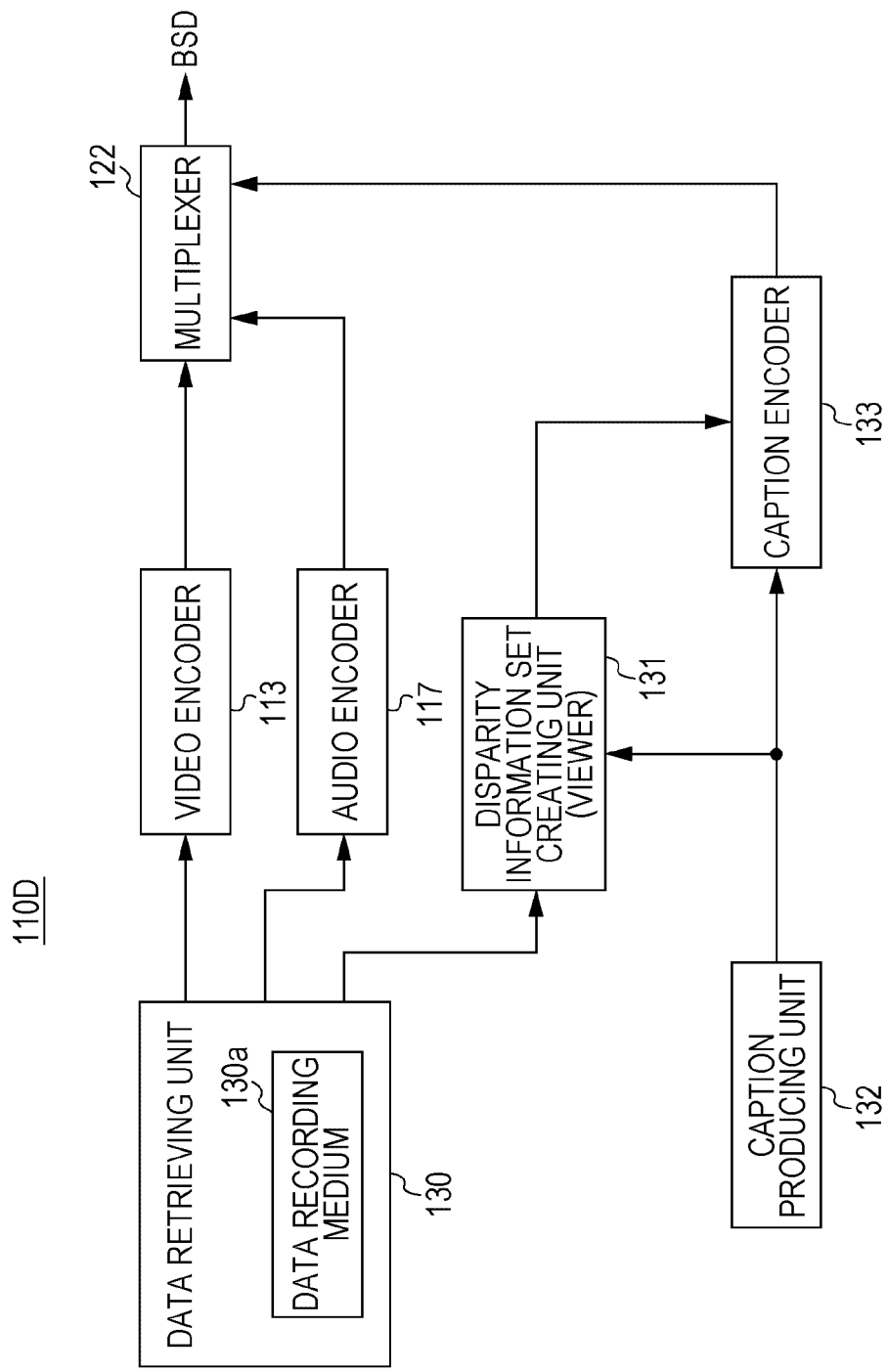
FIG. 22 is a block diagram illustrating another example configuration of the transmission data generating unit in the broadcast station.

FIG. 22 illustrates an example configuration of a transmission data generating unit 110D. The transmission data generating unit 110D is an example of transmitting disparity information with a data structure that can be easily compatible with ARIB (association of Radio Industries and Businesses), which is one of existing broadcasting standards. The transmission data generating unit 110D includes a data retrieving unit (archive unit) 130, a disparity information set creating unit 131, the video encoder 113, the audio encoder 117, a caption producing unit 132, a caption encoder 133, and the multiplexer 122.

A data recording medium 130a is loaded to the data retrieving unit 130 in a removable manner, for example. Audio data and disparity vectors are recorded on the data recording medium 130a together with stereo image data including left-eye image data and right-eye image data, while being associated with each other. The data retrieving unit 130 retrieves stereo image data, audio data, disparity information, etc., from the data recording medium 130a, and outputs them. The data recording medium 130a is a disc-shaped recording medium, a semiconductor memory, or the like.

Here, the stereo image data recorded on the data recording medium 130a corresponds to the stereo image data obtained by the video framing unit 112 of the transmission data generating unit 110 illustrated in FIG. 2. Also, the disparity information recorded on the data recording medium 130a corresponds to the disparity vectors of respective pixels forming an image, for example.

Figure 23:
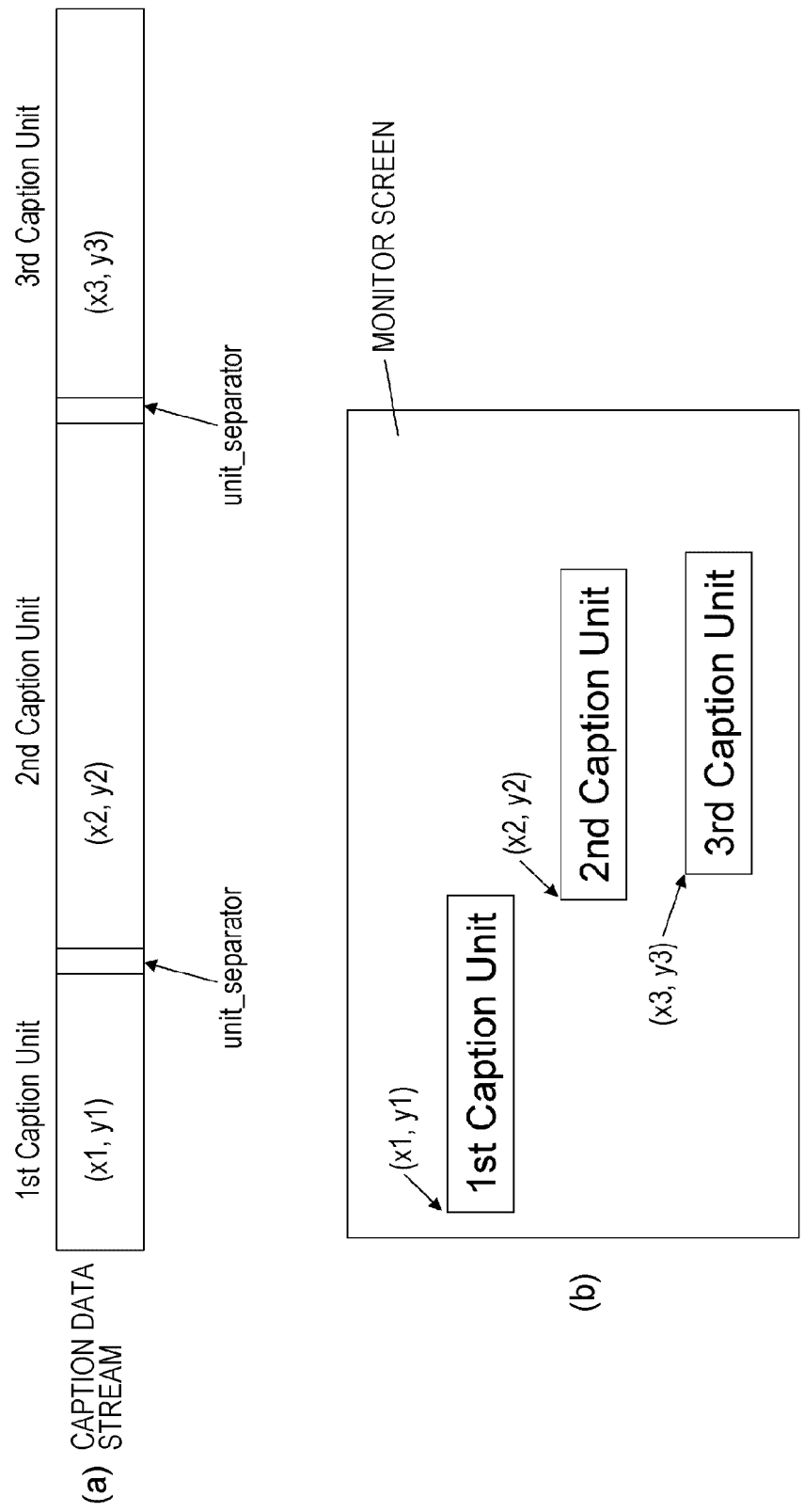
FIG. 23 includes diagrams illustrating an example configuration of a caption elementary stream (caption data stream) including caption data in an ARIB method.

The caption producing unit 132 produces caption data in the ARIB method. The caption encoder 133 generates a caption elementary stream (caption data stream) including the caption data produced by the caption producing unit 132. FIG. 23(*a*) illustrates an example configuration of the caption data stream. This example shows, as illustrated in FIG. 23(*b*), an example in which three caption units (captions) "1st Caption Unit", "2nd Caption Unit", and "3rd Caption Unit" are displayed on one screen.

In the caption data stream, the pieces of caption data of the respective caption units are sequentially arranged via a unit separator (unit_separator). The caption data of each caption unit includes the data indicating a display area. The display areas of the caption units "1st Caption Unit", "2nd Caption Unit", and "3rd Caption Unit" are represented by (x1, y1), (x2, y2), and (x3, y3), respectively.

The disparity information set creating unit 131 has a viewer function. The disparity information set creating unit 131 performs a downsizing process on the disparity vectors output from the data retrieving unit, that is, the disparity vectors of respective pixels, thereby generating a disparity vector belonging to a certain area.

Figure 24:
FIG. 24 is a diagram illustrating an example image in a case where the values of disparity vectors of respective pixels are used as luminance values of the respective pixels.

FIG. 24 illustrates an example of data in a relative depth direction that is given as the luminance values of respective pixels. Here, the data in the relative depth direction can be handled as disparity vectors of respective pixels by using certain conversion. In this example, the luminance value is large in the portion of the person. This means that the value of a disparity vector is large in the portion of the person, and thus means that the portion of the person is perceived as being popped up in stereo image display. Also, in this example, the luminance value is small in the portion of the background. This means that the value of a disparity vector is small in the portion of the background, and thus means that the portion of the background is perceived as being on the back side in stereo image display.

Figure 25:
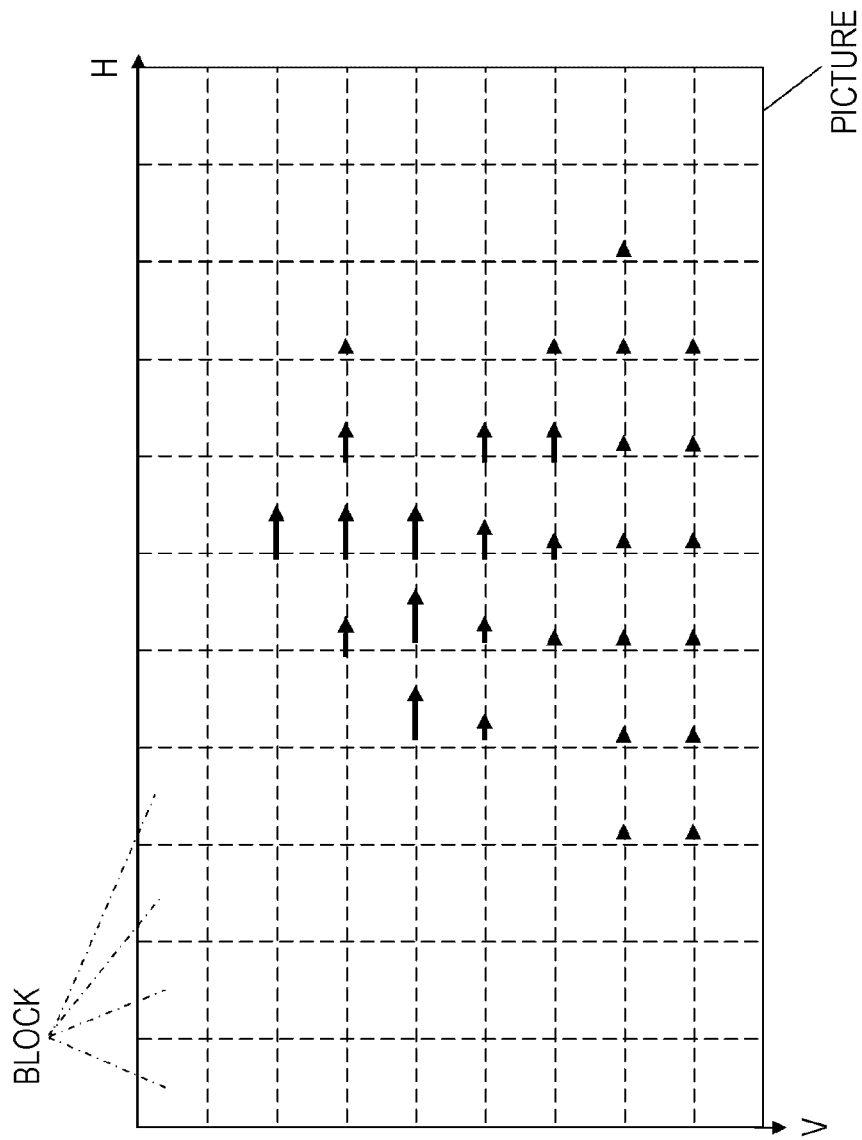
FIG. 25 is a diagram illustrating an example of disparity vectors of respective blocks.

FIG. 25 illustrates an example of disparity vectors of respective blocks. The blocks are in the upper layer of pixels positioned in the bottom layer. These blocks are formed by dividing an image (picture) area into areas of a certain size in the horizontal direction and the vertical direction. The disparity vector of each block is obtained by selecting the disparity vector of the largest value from among the disparity vectors of all the pixels existing in the block, for example. In this example, the disparity vector of each block is represented by an arrow, and the length of the arrow corresponds to the size of the disparity vector.

Figure 26:
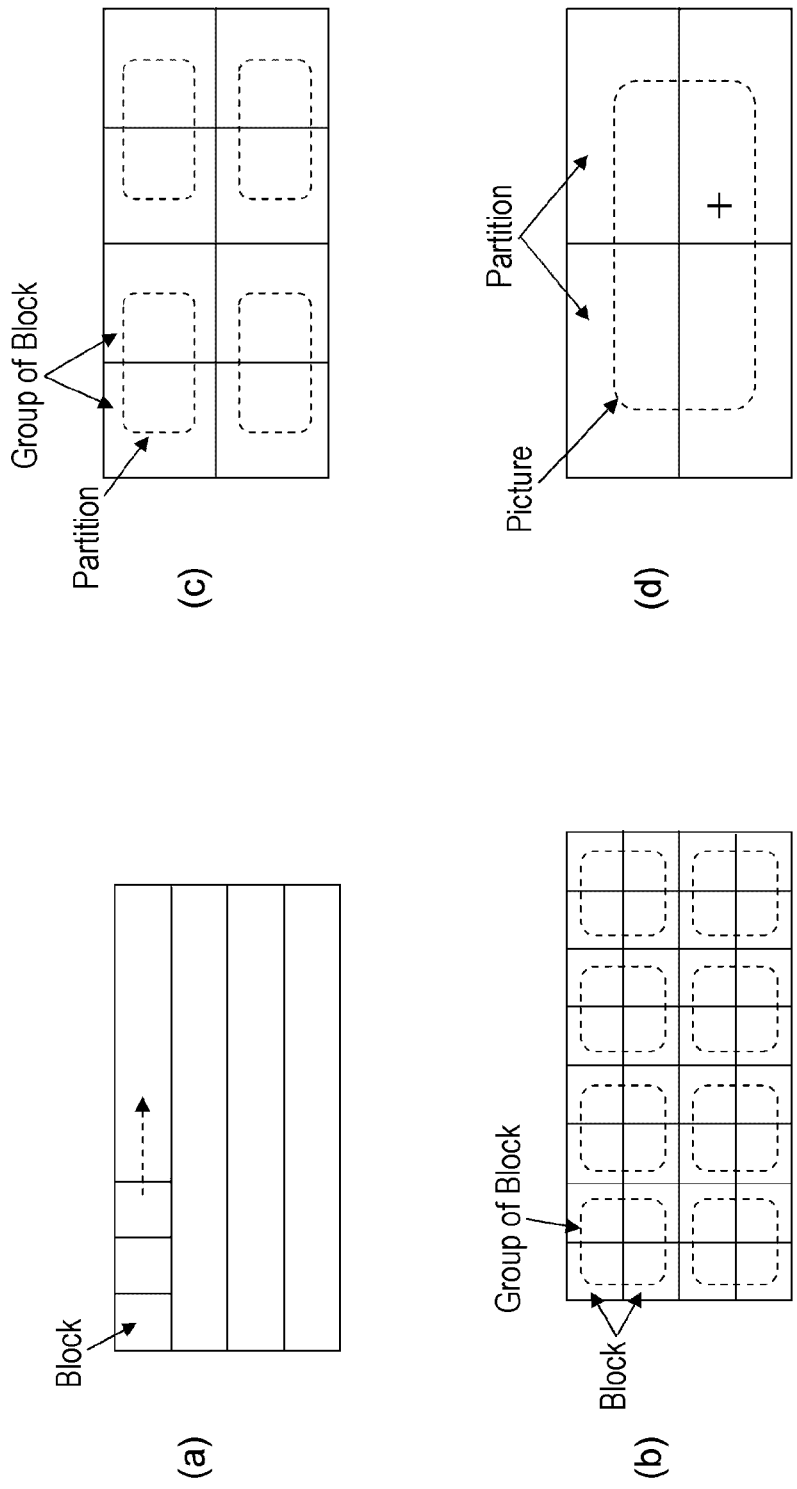
FIG. 26 includes diagrams illustrating an example of a downsizing process that is performed in a disparity information set creating unit in the transmission data generating unit.

FIG. 26 illustrates an example of a downsizing process that is performed in the disparity information set creating unit 131. First, the disparity information set creating unit 134 obtains the disparity vectors of the respective blocks using the disparity vectors of the respective pixels, as illustrated in FIG. 26(*a*). As described above, the blocks are in the upper layer of pixels positioned in the bottom layer and are formed by dividing an image (picture) area into areas of a certain size in the horizontal direction and the vertical direction. Also, the disparity vector of each block is obtained by selecting the disparity vector of the largest value from among the disparity vectors of all the pixels existing in the block, for example.

Next, the disparity information set creating unit 131 obtains the disparity vectors of respective groups (Groups Of Blocks) using the disparity vectors of the respective blocks, as illustrated in FIG. 26(*b*). The groups are in the upper layer of blocks and are obtained by grouping a plurality of blocks close to each other. In the example in FIG. 26(*b*), each group is constituted by four blocks defined by a broken-line frame. Also, the disparity vector of each group is obtained by selecting the disparity vector of the largest value from among the disparity vectors of all the blocks existing in the group, for example.

Next, the disparity information set creating unit 131 obtains the disparity vectors of respective partitions using the disparity vectors of the respective groups, as illustrated in FIG. 26(*c*). The partitions are in the upper layer of groups and are obtained by grouping a plurality of groups close to each other. In the example in FIG. 26(*c*), each partition is constituted by two groups defined by a broken-line frame. Also, the disparity vector of each partition is obtained by selecting the disparity vector of the largest value from among the disparity vectors of all the groups existing in the partition, for example.

Next, the disparity information set creating unit 131 obtains the disparity vector of the entire picture (entire image) positioned in the top layer using the disparity vectors of the respective partitions, as illustrated in FIG. 26(*d*). In the example in FIG. 26(*d*), four partitions defined by a broken-line frame are included in the entire picture. Also, the disparity vector of the entire picture is obtained by selecting the disparity vector of the largest value from among the disparity vectors of all the partitions included in the entire picture, for example.

In this way, the disparity information set creating unit 131 performs a downsizing process on the disparity vectors of the respective pixels positioned in the bottom layer, thereby being able to obtain the disparity vectors of the respective areas in the individual layers, that is, blocks, groups, partitions, and an entire picture. Note that, in the example of a downsizing process illustrated in FIG. 26, the disparity vectors in four layers, that is, blocks, groups, partitions, and an entire picture, are eventually obtained in addition to the layer of pixels. However, the number of layers, the method for dividing an area in each layer, and the number of areas are not limited thereto.

The disparity information set creating unit 131 creates a disparity information set including disparity vectors of respective areas of a certain size through the above-described downsizing process in the case of transmitting a disparity information set for general purpose. Note that the area of the certain size is a block, as described below.

Also, the disparity information set creating unit 131 creates a disparity information set for specific service application. In this embodiment, the disparity information set creating unit 131 creates a disparity information set for a caption in the ARIB method. The disparity vectors corresponding to the respective display areas of a certain number of captions that are displayed on each screen are created. In the case of performing superimposed display of a caption on a stereo image, the caption should be recognized as being in front of the nearest position of the image. Thus, the disparity information set creating unit 131 creates a disparity vector corresponding to the display area of the caption on the basis of the display area of the caption and the disparity vector of the image area corresponding to the display area. Note that this display area of the caption is regarded as a region, as described below.

Figure 27:
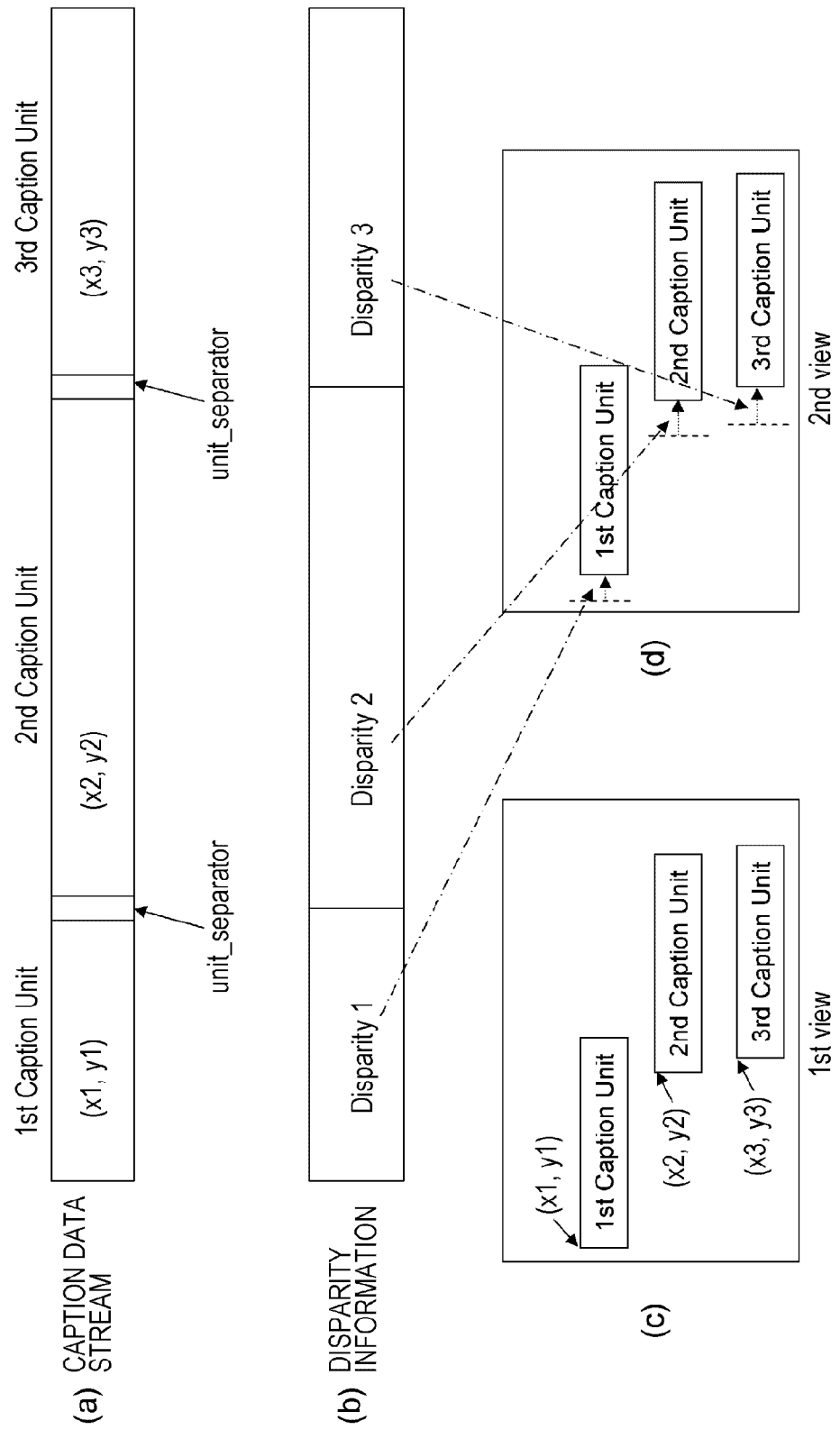
FIG. 27 includes diagrams for explaining disparity information of individual captions (caption units) created by the disparity information set creating unit.

For example, assume a case where there are the pieces of caption data of three caption units "1st Caption Unit", "2nd Caption Unit", and "3rd Caption Unit" in a caption data stream, as illustrated in FIG. 27(a). In this case, the disparity information set creating unit 131 creates the pieces of disparity information (Disparity Set) corresponding to the respective caption units, as illustrated in FIG. 27(b). Here, the individual pieces of disparity information are added with respective pieces of identification information indicating the arrangement order in the caption data stream of the pieces of caption data of the corresponding caption units. Accordingly, the pieces of caption data of the respective caption units are associated with the corresponding pieces of identification information.

FIG. 27(c) illustrates a first view (1st View) in which the individual caption units (captions) are superimposed, for example, a left-eye image. Also, FIG. 27(d) illustrates a second view (1st View) in which the individual caption units (captions) are superimposed, for example, a right-eye image. The pieces of disparity information corresponding to the respective caption units are used to give disparity between the individual caption units superimposed on the left-eye image and the individual caption units superimposed on the right-eye image. Note that, in the example illustrated in the figure, the positions of the respective caption units superimposed on the right-eye image are shifted. However, the positions of the respective caption units superimposed on the left-eye image may be shifted, or the positions of the both may be shifted.

The video encoder 113 performs encoding on the stereo image data supplied from the data retrieving unit 130 in accordance with MPEG4-AVC, MPEG2, VC-1, or the like, thereby obtaining encoded video data. Also, the video encoder 113 generates a video elementary stream that includes the encoded video data in a payload portion, using the stream formatter 113a provided in the latter stage.

The audio encoder 117 performs encoding on the audio data supplied from the data retrieving unit 130 in accordance with MPEG-2 Audio AAC or the like, thereby generating an audio elementary stream. The caption encoder 133 generates a caption elementary stream (caption data stream) including the caption data produced by the caption producing unit 132, as described above.

The caption encoder 133 causes the disparity information set created by the disparity information set creating unit 131 as described above to be included in the caption elementary stream (caption data stream). As illustrated in FIG. 23(a) or FIG. 27(a), the pieces of caption data of the respective caption units are sequentially arranged via a unit separator (unit_separator) in the caption data stream.

There are various data units as the pieces of caption data of the respective caption units. FIG. 28 illustrates the structure (Syntax) of a data unit included in the caption data stream. The unit separator "unit_separator" is an 8-bit data unit separation code, represented by "0x1F".

The data unit parameter "data_unit_parameter" is an 8-bit parameter for identifying the type of data unit. For example, as illustrated in FIG. 29, the data unit parameter indicating the data unit of text is "0x20". Also, the data unit parameter indicating the data unit of geometric is "0x28". Also, the data unit parameter indicating the data unit of bitmap is "0x35".

The data unit size "data_unit_size" is 24-bit data indicating the number of bytes of the subsequent data unit data. The data unit data byte "data_unit_data_byte" is a byte storing data unit data. For example, in the data unit of text, the data of the data unit of text is stored in a certain number of data unit data bytes.

In this embodiment, the data unit in which disparity information is stored in the data unit data byte is newly defined. The data unit parameter indicating the data unit of disparity information is "0x48", for example, as illustrated in FIG. 29.

FIG. 30 illustrates an example of the structure (Syntax) of disparity information (Disparity data) stored in a certain number of data unit data bytes in the data unit of disparity information. FIG. 31 and FIG. 32 illustrate the data specification content (Semantics) of disparity information (Disparity data).

"select_view_shift" is 2-bit information forming shift target information. The "select_view_shift" specifies a caption unit that is to be shifted on the basis of disparity information among a service component superimposed on a left-eye image and a service component superimposed on a right-eye image. In this embodiment, a service component is a caption unit.

For example, "select_view_shift=00" is regarded as reserved. Also, for example, "select_view_shift=01" represents that only a service component superimposed on a right-eye image is shifted in the horizontal direction by disparity information (disparity). Here, when the disparity information (disparity) has a positive value, the service component superimposed on the right-eye image is shifted in the right direction. On the other hand, when the disparity information (disparity) has a negative value, the service component superimposed on the right-eye image is shifted in the left direction.

Also, for example, "select_view_shift=10" represents that only a service component superimposed on a left-eye image is shifted in the horizontal direction by disparity information (disparity). Here, when the disparity information (disparity) has a positive value, the service component superimposed on the left-eye image is shifted in the right direction. On the other hand, when the disparity information (disparity) has a negative value, the service component superimposed on the left-eye image is shifted in the left direction.

Also, for example, "select_view_shift=11" represents that both the service component superimposed on the left-eye image and the service component superimposed on the right-eye image are shifted in the directions opposite to each other in the horizontal direction. In a case where disparity information (disparity) has an even value, the service component superimposed on the left-eye image is shifted in the following manner. That is, the service component is shifted in the right direction by "disparity/2" when the value is a positive value, and the service component is shifted in the left direction by "disparity/2" when the value is a negative value. In a case where disparity information (disparity) has an even value, the service component superimposed on the right-eye image is shifted in the following manner. That is, the service component is shifted in the left direction by "disparity/2" when the value is a positive value, and the service component is shifted in the right direction by "disparity/2" when the value is a negative value.

Also, in a case where disparity information (disparity) has an odd value, the service component superimposed on the left-eye image is shifted in the following manner. That is, the service component is shifted in the right direction by "(disparity+1)/2" when the value is a positive value, and the service component is shifted in the left direction by "(disparity+1)/2" when the value is a negative value. Also, in a case where disparity information (disparity) has an odd value, the service component superimposed on the right-eye image is shifted in the following manner. That is, the service component is shifted in the left direction by "(disparity−1)/2" when the value is a positive value, and the service component is shifted in the right direction by "(disparity−1)/2" when the value is a negative value.

"direct_mode" is 1-bit application information indicating whether the disparity information is disparity information for general purpose (Generic application) or for a caption (caption unit). "direct_mode=1" represents disparity information for general purpose. In this case, the disparity information is not associated with a specific service component. "direct_mode=0" represents disparity information for a caption unit. In this case, there is a service component, that is, a caption unit, associated with the disparity information.

"shareddisparity" is shared information indicating whether one piece of disparity information is shared by all regions or blocks. "shareddisparity=1" represents that one piece of disparity information is shared by all regions or blocks. "shareddisparity=0" represents that there are pieces of disparity information corresponding to respective regions or respective blocks.

"number_of_regions_minus1" is 8-bit data indicating 0 to 255, indicating the number of regions or blocks. Note that 0 to 255 actually mean 1 to 256. When "direct_mode=0", "number_of_regions_minus1" represents the number of display areas (regions) of caption units on a display screen, that is, the number of regions.

Also, when "direct_mode=1", "number_of_regions_minus1" represents the number of division areas (blocks) obtained by dividing a screen. For example, when "number_of_regions_minus1+1" is "1", which means that the screen is not divided and the entire screen has one block. Also, for example, when "number_of_regions_minus1+1" is "16", which means that each of the vertical and horizontal sides of the screen is divided into four blocks, that is, sixteen blocks exist. Also, for example, when "number_of_regions_minus1+1" is "256", which means that each of the vertical and horizontal sides of the screen is divided into sixteen blocks, that is, 256 blocks exist.

"region_block_id" is 8-bit identification information for identifying each display area (region) on the display screen or each division area (block) obtained through division of the screen. When "region_block_id" is identification information for identifying each display area (region) on the display screen, the identification information indicates the arrangement order in a caption data stream of the data of the caption (caption unit) displayed in each display area.

"temporal_extension_flag" is 1-bit flag information with respect to the disparity information corresponding to the region or block represented by "region_block_id". The flag information indicates whether the disparity information is used in common among individual frames in a display frame period of a service component (caption unit) or is disparity information that is sequentially updated in individual frames. "temporal_extension_flag=1" represents that the value of disparity information is updated in the individual frames in the display frame period. Also, "temporal_extension_flag=0" represents that the value of disparity information is not updated in the individual frame in the display frame period and that the same disparity information is used.

"disparity" is 8-bit information indicating the value of disparity information of the first frame in the display frame period, and has values in the range from −128 to +127. When "temporal_extention_flag=0", the disparity information corresponding to the region or block represented by "region_block_id" is only 8-bit information of "disparity". On the other hand, when "temporal_extension_flag=1", the following occurs. That is, as the disparity information corresponding to the region or block represented by "region_block_id", there is the disparity information of the second and subsequent frames, in addition to the 8-bit disparity information of the first frame of "disparity".

The disparity information of the second and subsequent frames is given as offset information with respect to the disparity information of the preceding frame. "number_of_frame set" is 8-bit information indicating the number of necessary units in a case where the number of the second and subsequent frames in the display frame period is divided in eleven frame units. For example, in a case where the display frame period has thirty frames, the number of the second and subsequent frames is twenty-nine, and thus the number of units represented by "number_of_frame set" is "3".

"offset_sequence" is 2-bit information serving as offset information with respect to the disparity information of the preceding frame. "offset_sequence=00" represents that the offset value is "0". "offset_sequence=01" represents that the offset value is "+1". "offset_sequence=10" represents that the offset value is "−1". Furthermore, "offset_sequence=11" represents that there is no allocation of offset information to the frame. In a case where the above-described display frame period has thirty frames and in a case where the period is divided in eleven frame units, "offset_sequence=11" is obtained at "offset_sequence_7" and thereafter in the third unit.

"offset_precision" is the precision of "1" in the offset value represented by the above-described "offset_sequence", that is, 1-bit information indicating the number of pixels of this "1". "offset_precision=0" represents that "1" in the offset value corresponds to one pixel. Also, "offset_precision=1" represents that "1" in the offset value corresponds to two pixels.

Referring back to FIG. 22, the multiplexer 122 multiplexes the individual elementary streams output from the video encoder 113, the audio encoder 117, and the caption encoder 133. Then, the multiplexer 122 outputs bit stream data (transport stream) BSD as transmission data (multiplexed data stream).

The operation of the transmission data generating unit 110D illustrated in FIG. 22 will be briefly described. The stereo image data output from the data retrieving unit 130 is supplied to the video encoder 113. In the video encoder 113, encoding is performed on the stereo image data in accordance with MPEG4-AVC, MPEG2, VC-1, or the like, so that a video elementary stream including the encoded video data is generated. This video elementary stream is supplied to the multiplexer 122.

Also, in the caption producing unit 132, caption data in the ARIB method is produced. The caption data is supplied to the caption encoder 133. In the caption encoder 133, a caption elementary stream (caption data stream) including the caption data produced by the caption producing unit 132 is generated (see FIG. 27(*a*)). This caption elementary stream is supplied to the multiplexer 122.

Also, the disparity vectors of the respective pixels output from the data retrieving unit 130 are supplied to the disparity information set creating unit 131. In the disparity information set creating unit 131, in the case of transmitting a disparity information set for general purpose, a disparity information set including the disparity vectors of respective areas (blocks) of a certain size is created through a downsizing process. Also, in the disparity information set creating unit 131, in the case of transmitting a disparity information set for a caption in the ARIB method, a disparity information set including the disparity vectors corresponding to the respective display areas (regions) of a certain number of captions displayed in each screen is created.

The disparity information (disparity information set) created by the disparity information set creating unit 131 is supplied to the caption encoder 133. In the caption encoder 133, the disparity information (disparity information set) is inserted into a caption elementary stream (caption data stream). In this case, in the caption data stream, the disparity information is inserted as an independent data unit, and is distinguished from the other data units of caption data with the data unit parameter (see FIG. 28 and FIG. 29).

Also, the audio data output from the data retrieving unit 130 is supplied to the audio encoder 117. In the audio encoder 117, encoding is performed on the audio data in accordance with MPEG-2 Audio AAC or the like, so that an audio elementary stream including the encoded audio data is generated. This audio elementary stream is supplied to the multiplexer 122.

As described above, the multiplexer 122 is supplied with the elementary streams from the video encoder 113, the audio encoder 117, and the caption encoder 133. Then, in the multiplexer 122, the elementary streams supplied from the respective encoders are packetized and multiplexed, so that bit stream data (transport stream) BSD as transmission data is obtained.

In the transmission data generating unit 110D illustrated in FIG. 22, the bit stream data BSD output from the multiplexer 122 is a multiplexed data stream including a video data stream and a caption data stream. The video data stream includes stereo image data. Also, the caption data stream includes the data of captions (caption units) in the ARIB method serving as superimposition information and disparity information (disparity information set).

Also, in the caption data stream, the pieces of data of a certain number of captions (caption units) to be displayed on the same screen are sequentially arranged via a separator (Unit_Separator). Also, the disparity information (disparity information set) inserted into the caption data stream includes a certain number of pieces of disparity information having respective pieces identification information (region_block_id) corresponding to the arrangement order of the pieces of data of the certain number of captions (caption units).

In this way, the certain number of pieces of disparity information have respective pieces of identification information corresponding to the arrangement order of the pieces of data of the certain number of captions (caption units), so that the pieces of data of the certain number of captions (caption units) are associated with the certain number of pieces of disparity information. Thus, on the receiver side (set top box 200), appropriate disparity can be given using the pieces of disparity information corresponding to the certain number of captions (caption units) superimposed on a left-eye image and a right-eye image. Accordingly, the perspective consistency among individual objects in an image can be maintained in the optimum state in display of captions (caption units).

Also, in the transmission data generating unit 110D illustrated in FIG. 22, shift target information (select_view_shift) is added to disparity information. The shift target information specifies the caption (caption unit) that is to be shifted on the basis of the disparity information among a left-eye caption (caption unit) that is to be superimposed on a left-eye image and a right-eye caption (caption unit) that is to be superimposed on a right-eye image. Accordingly, with the shift target information, it arbitrarily becomes possible to shift only the left-eye caption (caption unit), to shift only the right-eye caption (caption unit), or to shift both of them.

Also, in the transmission data generating unit 110D illustrated in FIG. 22, any of disparity information that is used in common in a certain number of frames on which a caption (caption unit) is displayed and disparity information that is sequentially updated in the certain number of frames can be selected as disparity information. The disparity information is added with flag information (temporal_extension_flag) indicating any of them. Thus, the disparity information that is used in common in individual frames or disparity information that is sequentially updated in individual frames can be selectively transmitted in accordance with the content of an image, for example.

That is, in a case where the motion in an image is large, disparity information that is sequentially updated in individual frames is transmitted, so that the disparity given to superimposition information can be dynamically changed in conjunction with the change in image content on the receiver side. Also, in a case where the motion in an image is small, disparity information that is used in common in individual frames is transmitted, so that the amount of data of disparity information can be suppressed.

Also, in the transmission data generating unit 110D illustrated in FIG. 22, the disparity information that is sequentially updated in individual frames is made up of disparity information of the first frame in the period of a certain number of frames and offset information with respect to the disparity information of the preceding frame of the second and subsequent frames. Thus, the amount of data of disparity information can be suppressed.

[Description of Set Top Box]

Referring back to FIG. 1, the set top box 200 receives bit stream data (transport stream) BSD that is transmitted using airwaves from the broadcast station 100. The bit stream data BSD includes stereo image data including left-eye image data and right-eye image data, audio data, superimposition information data, and furthermore disparity information (disparity vectors). Here, the superimposition information data may be graphics data, text data, caption data, and the like, for example.

The set top box 200 includes a bit stream processing unit 201. The bit stream processing unit 201 extracts stereo image data, audio data, superimposition information data, disparity vectors, etc., from bit stream data BSD. The bit stream processing unit 201 generates the data of a left-eye image and a right-eye image on which superimposition information is superimposed, using stereo image data, superimposition information data (graphics data, text data, and caption data), etc.

Here, in a case where disparity vectors are transmitted as numerical information, left-eye superimposition information and right-eye superimposition information that are to be superimposed on a left-eye image and a right-eye image, respectively, are generated on the basis of the disparity vectors and the superimposition information data. In this case, the left-eye superimposition information and the right-eye superimposition information are the same superimposition information. However, the superimposed position in an image of the right-eye superimposition information is shifted in the horizontal direction by the horizontal direction component of the disparity vector with respect to the left-eye superimposition information, for example.

FIG. 33(a) illustrates the superimposed positions of left-eye graphics information and right-eye graphics information in a case where the transmission method is the above-described second transmission method ("Side By Side" method). The right-eye graphics information RGI superimposed on a right-eye image IR is at the position shifted in the horizontal direction by the horizontal direction component VVT of the disparity vector with respect to the left-eye graphics information LGI superimposed on a left-eye image IL. Note that IT is an idling offset value.

The bit stream processing unit 201 generates graphics data so that the individual pieces of graphics information LGI and RGI are superimposed on the respective images IL and IR in the manner illustrated in FIG. 33(a). The bit stream processing unit 201 combines the generated left-eye graphics data and right-eye graphics data with the stereo image data (left-eye image data and right-eye image data) extracted from the bit stream data, thereby obtaining processed stereo image data. According to the stereo image data, a viewer can observe the individual pieces of graphics information LGI and RGI with disparity together with the respective images IL and IR, as illustrated in FIG. 33(b), and perspective can be recognized also in the graphics information.

Figure 34:
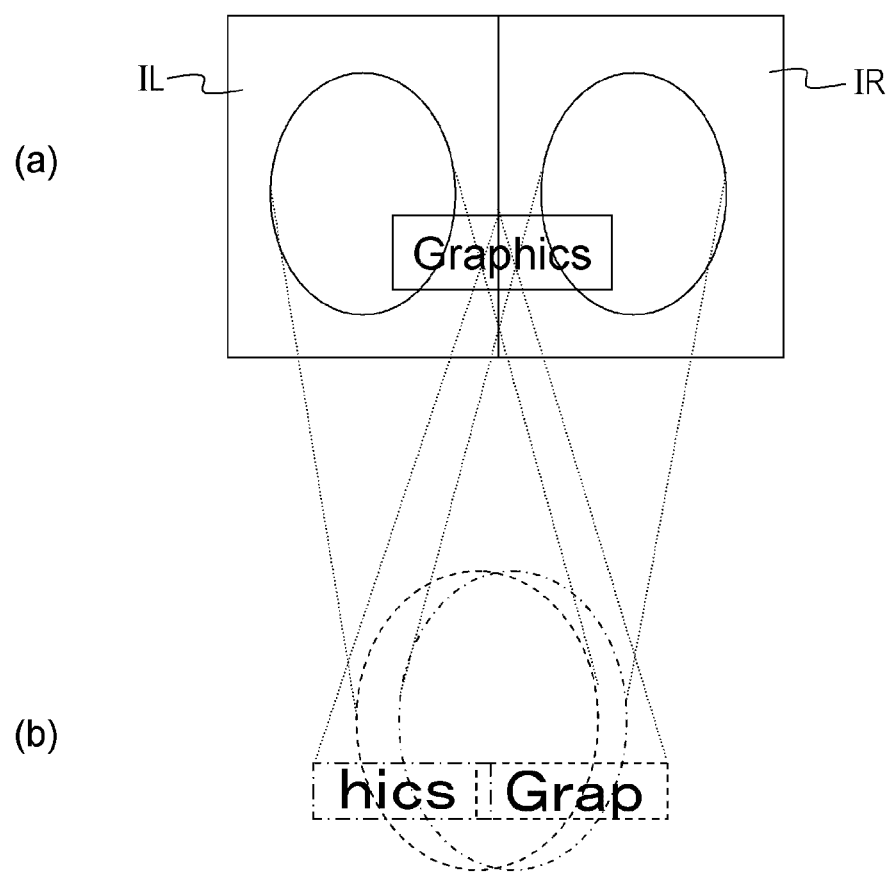
FIG. 34 includes diagrams illustrating a state where a graphics image based on graphics data that is extracted from bit stream data and that is transmitted using a conventional method is superimposed as is on a left-eye image and a right-eye image.
Figure 35:
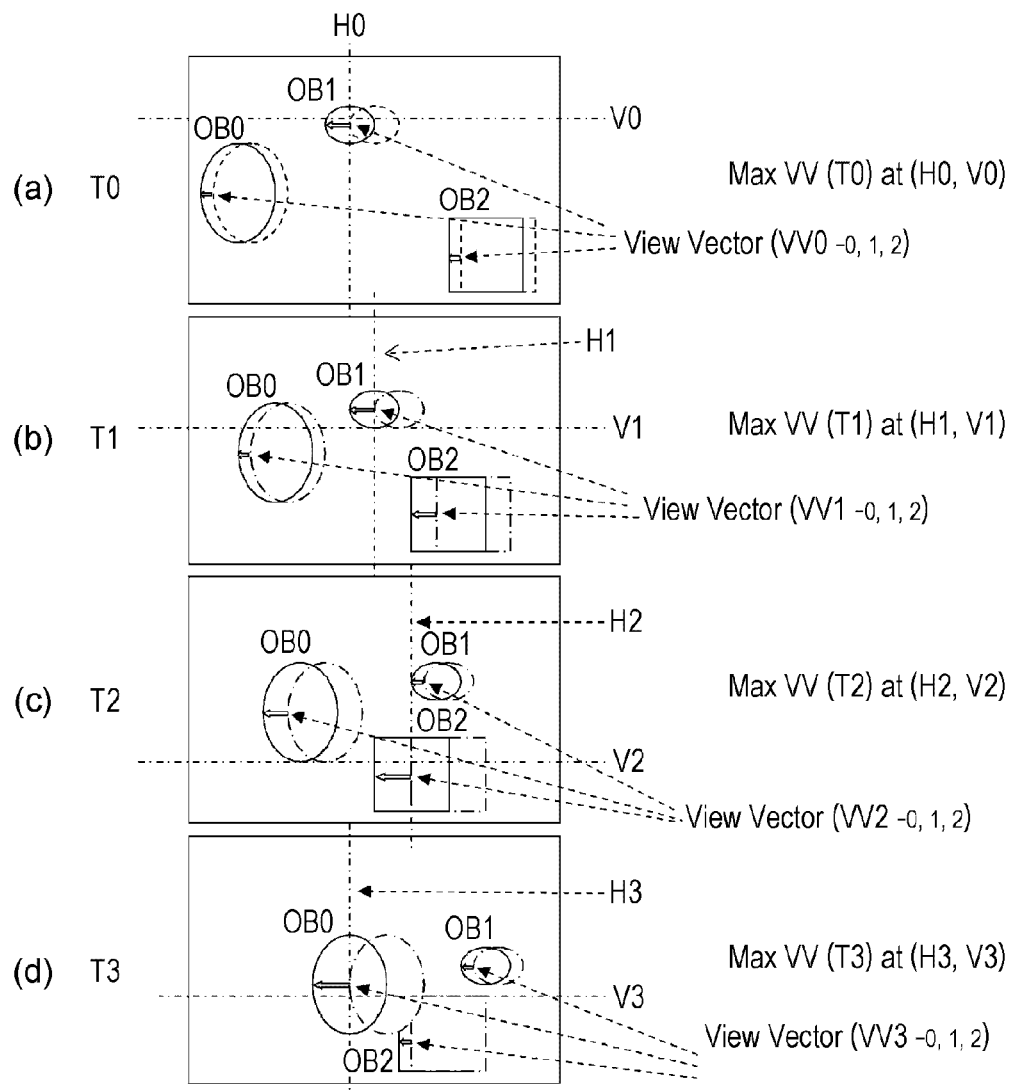
FIG. 35 includes diagrams illustrating disparity vectors (View Vectors) at three object positions at times T0, T1, T2, and T3, respectively.

Note that FIG. 34(a) illustrates a state where a graphics image based on the graphics data extracted from the bit stream data is superimposed as is on the respective images IL and IR. In this case, a viewer observes the left half of the graphics information together with the left-eye image IL, and the right half of the graphics information together with the right-eye image IR, as illustrated in FIG. 34(b). Thus, the graphics information cannot be correctly recognized.

Figure 33:
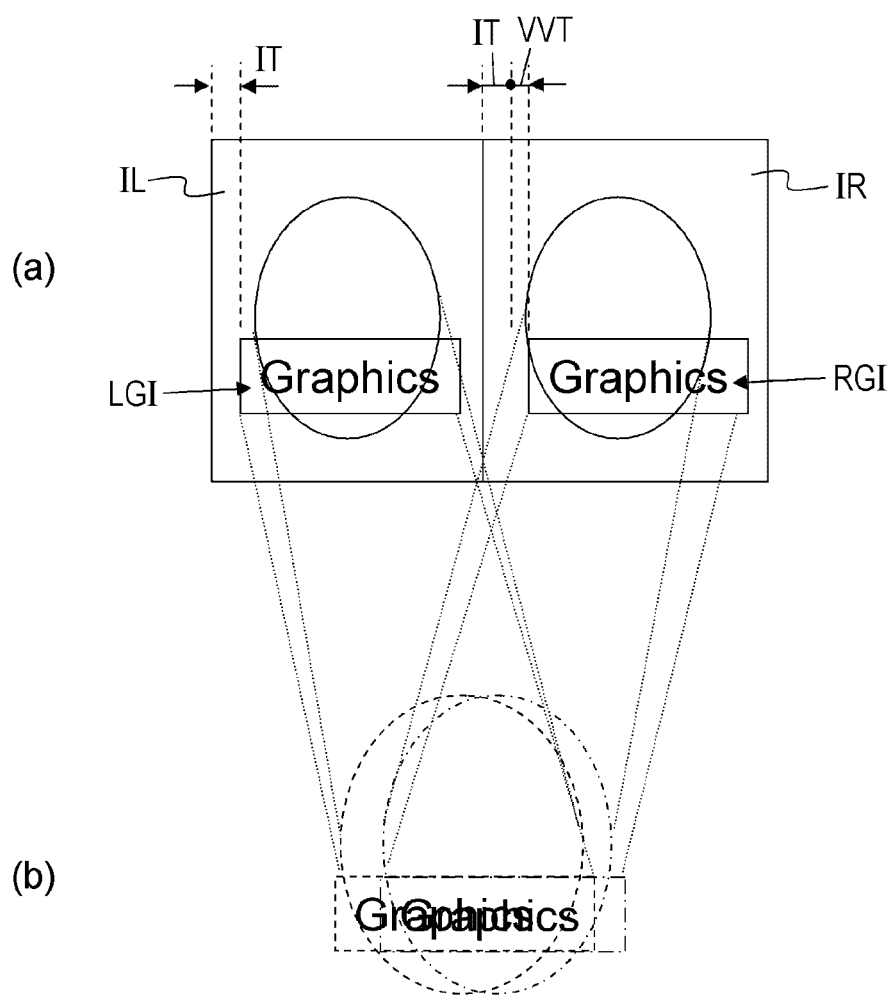
FIG. 33 includes diagrams illustrating superimposed positions of left-eye graphics information and right-eye graphics information in a case where a transmission method is the second transmission method ("Side By Side" method).

FIG. 33 illustrates the case of graphics information, and this is the same for other superimposition information (text information, subtitle information, closed-caption information, caption in the ARIB method, etc.). That is, in a case where disparity vectors are transmitted as numerical information, left-eye superimposition information and right-eye superimposition information that are to be superimposed on a left-eye image and a right-eye image, respectively, are generated on the basis of the disparity vectors and the superimposition information data. In this case, the left-eye superimposition information and the right-eye superimposition information are the same superimposition information. However, the superimposed position in an image of the right-eye superimposition information is shifted in the horizontal direction by the horizontal direction component of the disparity vector with respect to the left-eye superimposition information, for example.

Here, the following disparity vector may be used as a disparity vector that gives disparity between the left-eye superimposition information and the right-eye superimposition information. For example, a disparity vector at the nearest position recognized in terms of perspective among disparity vectors detected at a plurality of positions in an image may be used as the disparity vector. FIGS. 35(a), 35(b), 35(c), and 35(d) illustrate disparity vectors (View Vectors) at three object positions at times T0, T1, T2, and T3, respectively.

At time T0, the disparity vector VV0-1 at the position corresponding to an object 1 (H0, V0) is the maximum disparity vector MaxVV(T0). At time T1, the disparity vector VV1-1 at the position corresponding to the object 1 (H1, V1) is the maximum disparity vector MaxVV(T1). At time T2, the disparity vector VV2-2 at the position corresponding to the object 2 (H2, V2) is the maximum disparity vector MaxVV(T2). At time T3, the disparity vector VV3-0 at the position corresponding to the object 1 (H3, V3) is the maximum disparity vector MaxVV(T3).

In this way, a disparity vector at the nearest position recognized in terms of perspective among disparity vectors detected at a plurality of positions in an image is used as the disparity vector, whereby superimposition information can be displayed in front of the nearest object in the image in terms of perspective.

Figure 36:
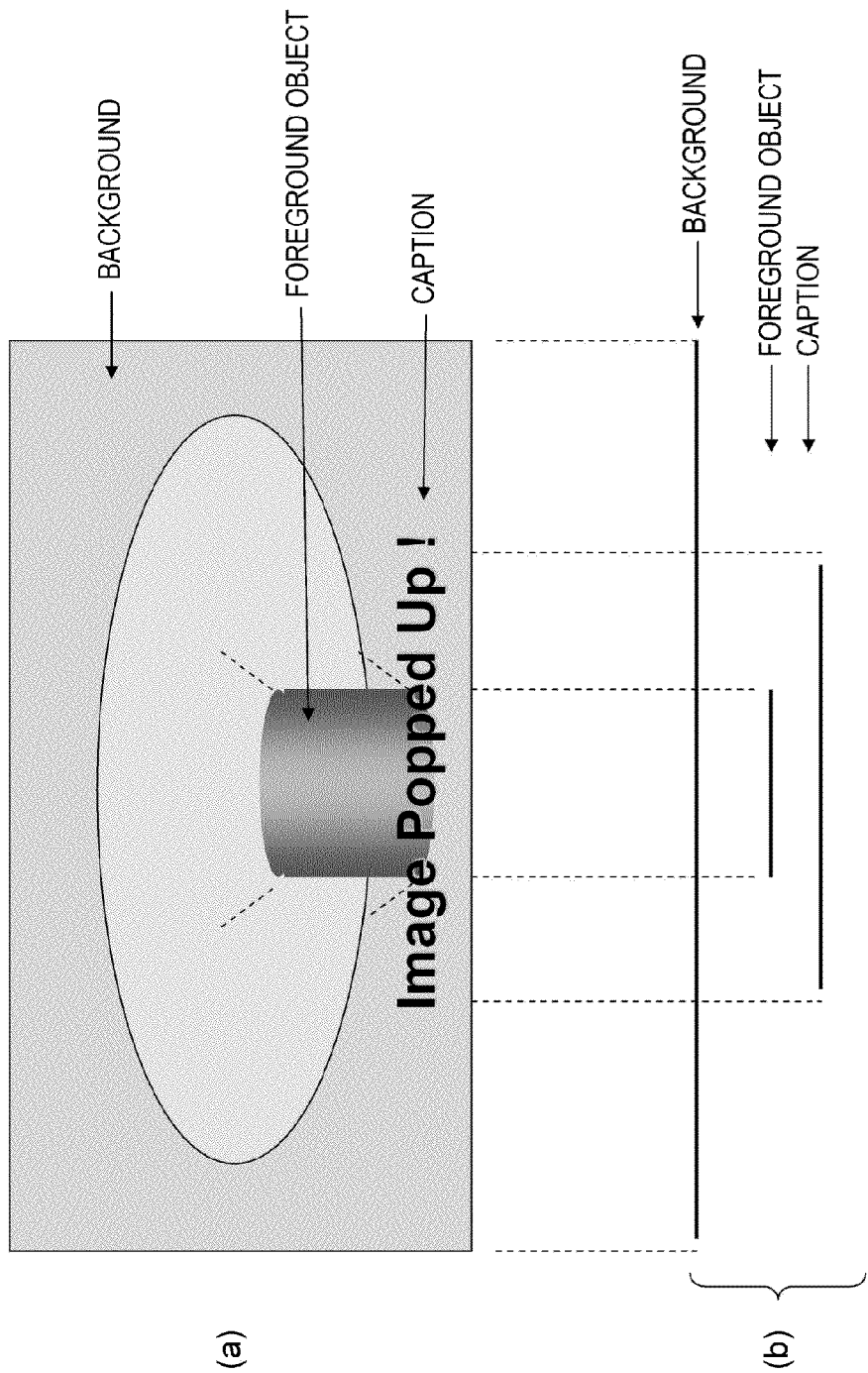
FIG. 36 includes diagrams illustrating an example display of a caption (graphics information) on an image and the perspective of a background, a foreground object, and the caption.

FIG. 36(a) illustrates an example display of a caption (e.g., closed-caption information, subtitle information, and caption in the ARIB method) on an image. In this example display, a caption is superimposed on an image made up of a background and a foreground object. FIG. 36(b) illustrates the perspective of the background, foreground object, and caption, and illustrates that the caption is recognized as being the nearest.

Figure 37:
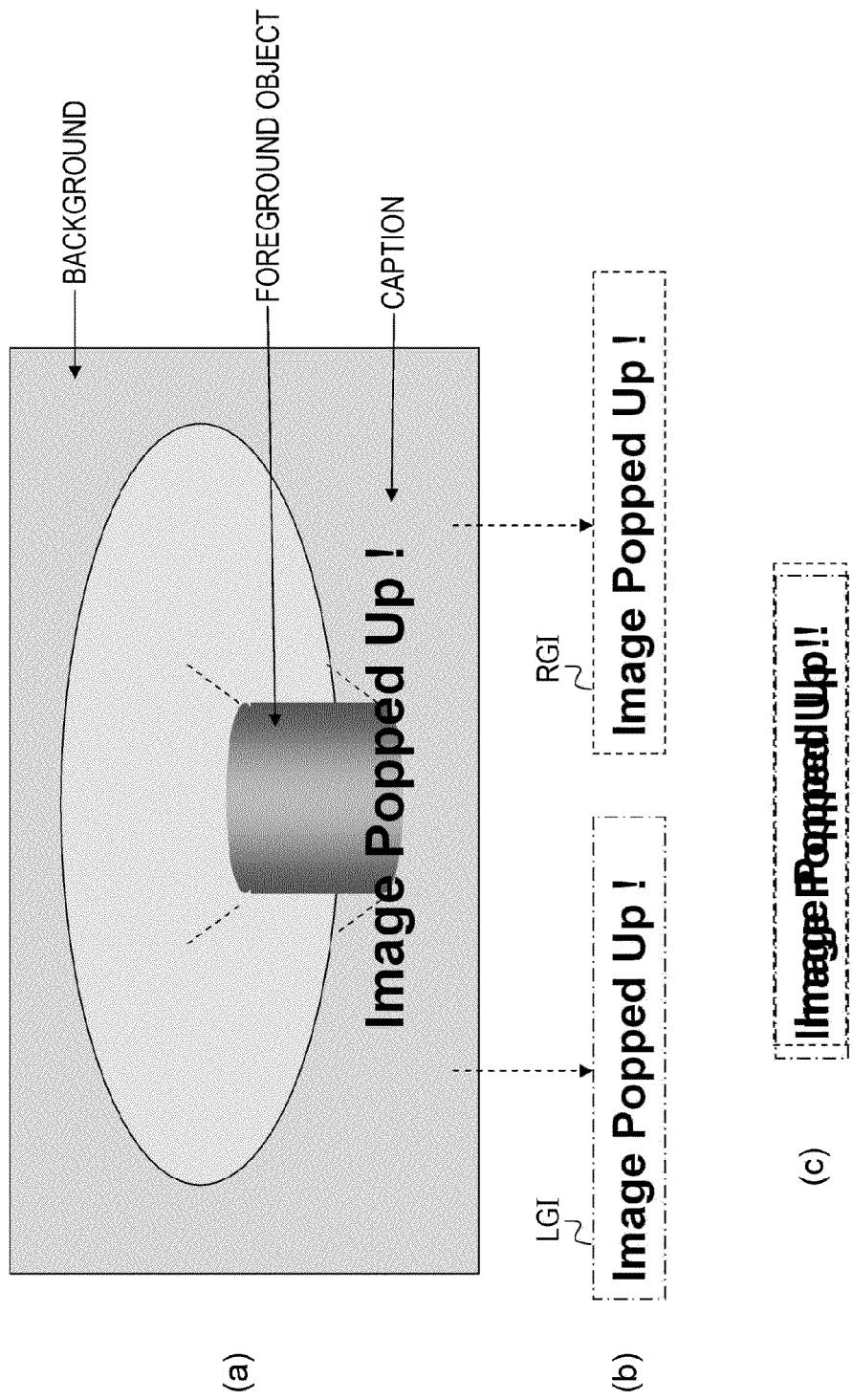
FIG. 37 includes diagrams illustrating an example display of a caption (graphics information) on an image and left-eye graphics information LGI and right-eye graphics information RGI for displaying a caption.

FIG. 37(a) illustrates an example display of a caption (e.g., closed-caption information, subtitle information, and caption in the ARIB method) on an image, like FIG. 36(a). FIG. 37(b) illustrates left-eye information LGI and right-eye information RGI for displaying a caption. FIG. 37(c) illustrates that disparity is given to the individual pieces of information LGI and RGI so that the caption is recognized as being the nearest.

Also, the disparity vector corresponding to the superimposed position among disparity vectors detected at a plurality of positions in an image (including the disparity vectors of the respective areas in individual layers included in a disparity information set) may be used as the disparity vector. FIG. 38(a) illustrates graphics information based on graphics data extracted from bit stream data and text information based on text data extracted from the bit stream data.

FIG. 38(b) illustrates a state where left-eye graphics information LGI and left-eye text information LTI are superimposed on a left-eye image. In this case, the superimposed position of the left-eye graphics information LGI is restricted in the horizontal direction with an idling offset value (IT-0). Also, the superimposed position of the left-eye text information LTI is restricted in the horizontal direction with an idling offset value (IT-1).

FIG. 38(c) illustrates a state where right-eye graphics information RGI and right-eye text information RTI are superimposed on a right-eye image. In this case, the superimposed position of the right-eye graphics information RGI is restricted in the horizontal direction with an idling offset value (IT-0), and is furthermore shifted from the superimposed position of the left-eye graphics information LGI by a horizontal direction component VVT-0 of the disparity vector corresponding to this superimposed position. Also, the superimposed position of the right-eye text information RTI is restricted in the horizontal direction with an idling offset value (IT-1), and is furthermore shifted from the superimposed position of the left-eye text information LTI by a horizontal direction component VVT-1 of the disparity vector corresponding to this superimposed position.

Figure 38:
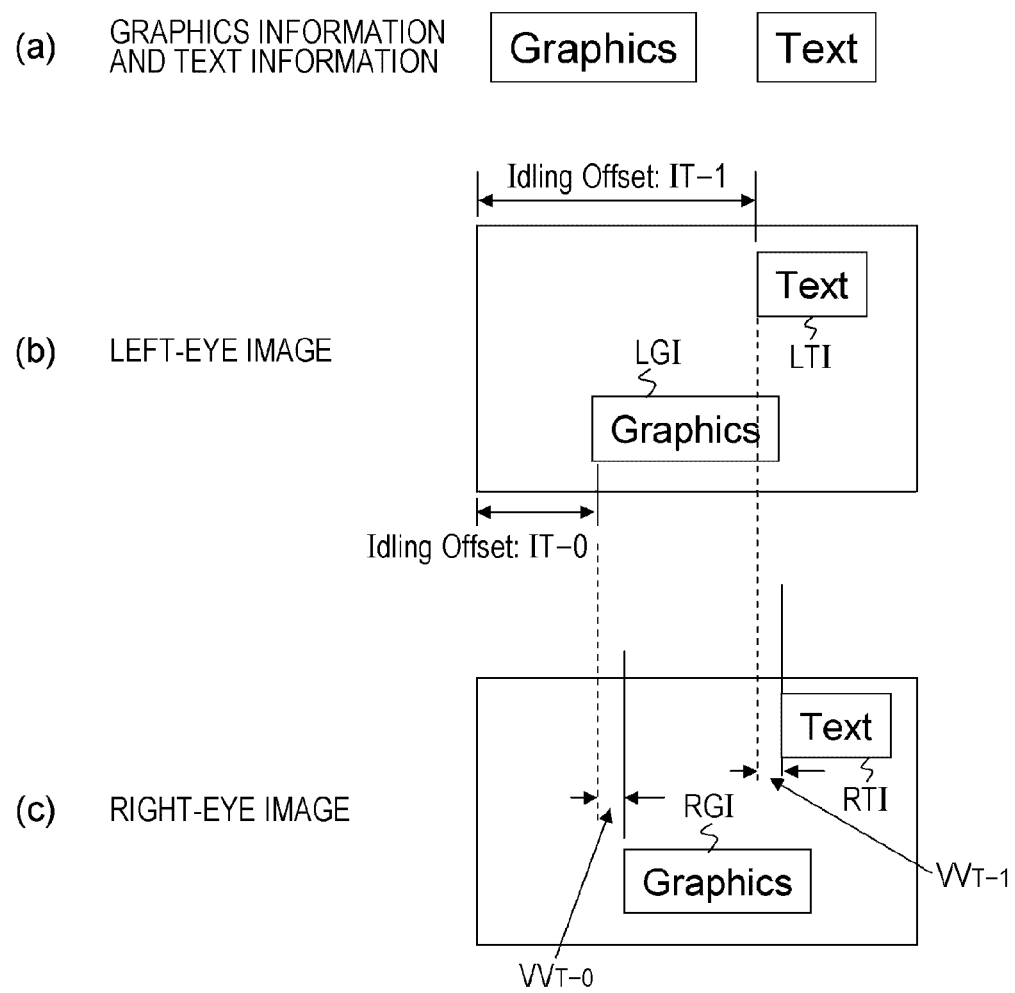
FIG. 38 includes diagrams for explaining using, as a disparity vector, a disparity vector corresponding to the superimposed position among disparity vectors detected at a plurality of positions in an image.

Note that, in the example in FIG. 38, the superimposed positions of the graphics information and text information superimposed on a right-eye image are shifted with respect to the superimposed positions of the same graphics information and text information superimposed on a left-eye image. That is, in the example in FIG. 38, a process of shifting only the superimposed positions of the graphics information and text information superimposed on the right-eye image is performed. However, a process of shifting only the superimposed position on the left-eye image may be performed, or a process of shifting the superimposed positions on both the left-eye image and right-eye image may be performed.

FIG. 39(a) illustrates graphics information based on graphics data extracted from bit stream data and text information based on text data extracted from the bit stream data. FIG. 39(b) illustrates the superimposed positions of graphics information GI and text information TI in two-dimensional display. In this case, the superimposed position of the text information is (x1, y1) and the superimposed position of the graphics information is (x2, y2).

FIG. 39(c) illustrates a state where left-eye graphics information LGI and left-eye text information LTI are superimposed on a left-eye image. In this case, the left-eye graphics information LGI is shifted in the right direction by the number of pixels of a disparity vector D1 corresponding to the graphics information with respect to the superimposed position of the graphics information GI in the two-dimensional display. Also, the left-eye text information LTI is shifted in the right direction by the number of pixels of a disparity vector D0 corresponding to the text information with respect to the superimposed position of the text information LT in the two-dimensional display.

FIG. 39(d) illustrates a state where right-eye graphics information RGI and right-eye text information RTI are superimposed on a right-eye image. In this case, the right-eye graphics information RGI is shifted in the left direction by the number of pixels of the disparity vector D1 corresponding to the graphics information with respect to the superimposed position of the graphics information GI in the two-dimensional display. Also, the right-eye text information RTI is shifted in the left direction by the number of pixels of the disparity vector D0 corresponding to the text information with respect to the superimposed position of the text information LT in the two-dimensional display.

In the above description, a description has been given of the case of superimposing graphics information based on graphics data extracted from bit stream data or text information based on text data extracted from the bit stream data on a left-eye image and a right-eye image. Other than this, the case of producing graphics data or text data in the set top box 200 and superimposing information based thereon on a left-eye image and a right-eye image is available.

In that case, too, disparity can be given between left-eye graphics information and right-eye graphics information or between left-eye text information and right-eye text information using disparity vectors at certain positions in an image extracted from the bit stream data. Accordingly, appropriate perspective in which perspective consistency is maintained among individual objects in an image can be given when graphics information and text information are displayed.

FIG. 40(a) illustrates that individual objects A, B, and C exist in an image and that text information showing annotations of the respective objects is superimposed at the vicinity of these respective objects. FIG. 40(b) illustrates a disparity vector list showing the correspondence between the positions of the respective objects A, B, and C and the disparity vectors at the positions, and also illustrates that the individual disparity vectors are used for giving disparity to the text information showing the annotations of the respective objects A, B, and C.

For example, the text information "Text" is superimposed at the vicinity of the object A, and the disparity corresponding to a disparity vector VV-a at the position (Ha, Va) of the object A is given between the left-eye text information and the right-eye text information thereof. Note that this is the same for the text information superimposed at the vicinity of the objects B and C.

Figure 39:
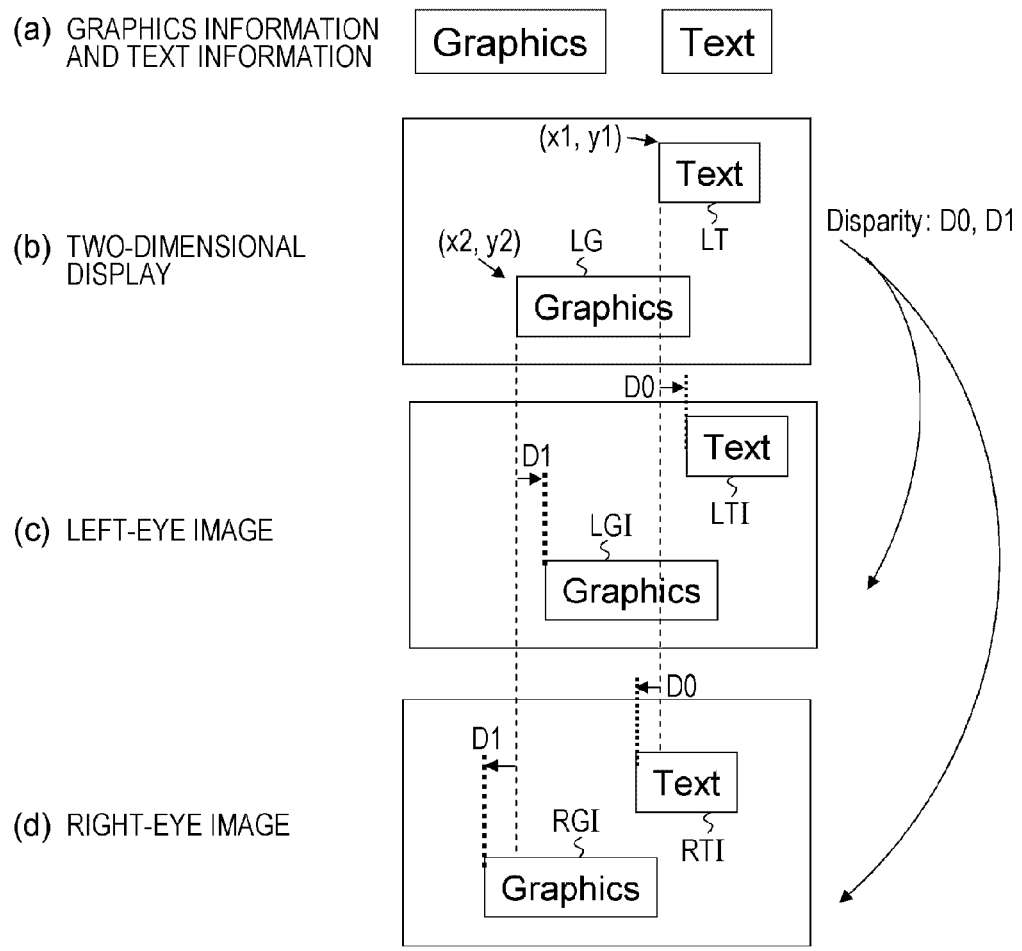
FIG. 39 includes diagrams for explaining using, as a disparity vector, a disparity vector corresponding to the superimposed position among disparity vectors detected at a plurality of positions in an image.
Figure 40:
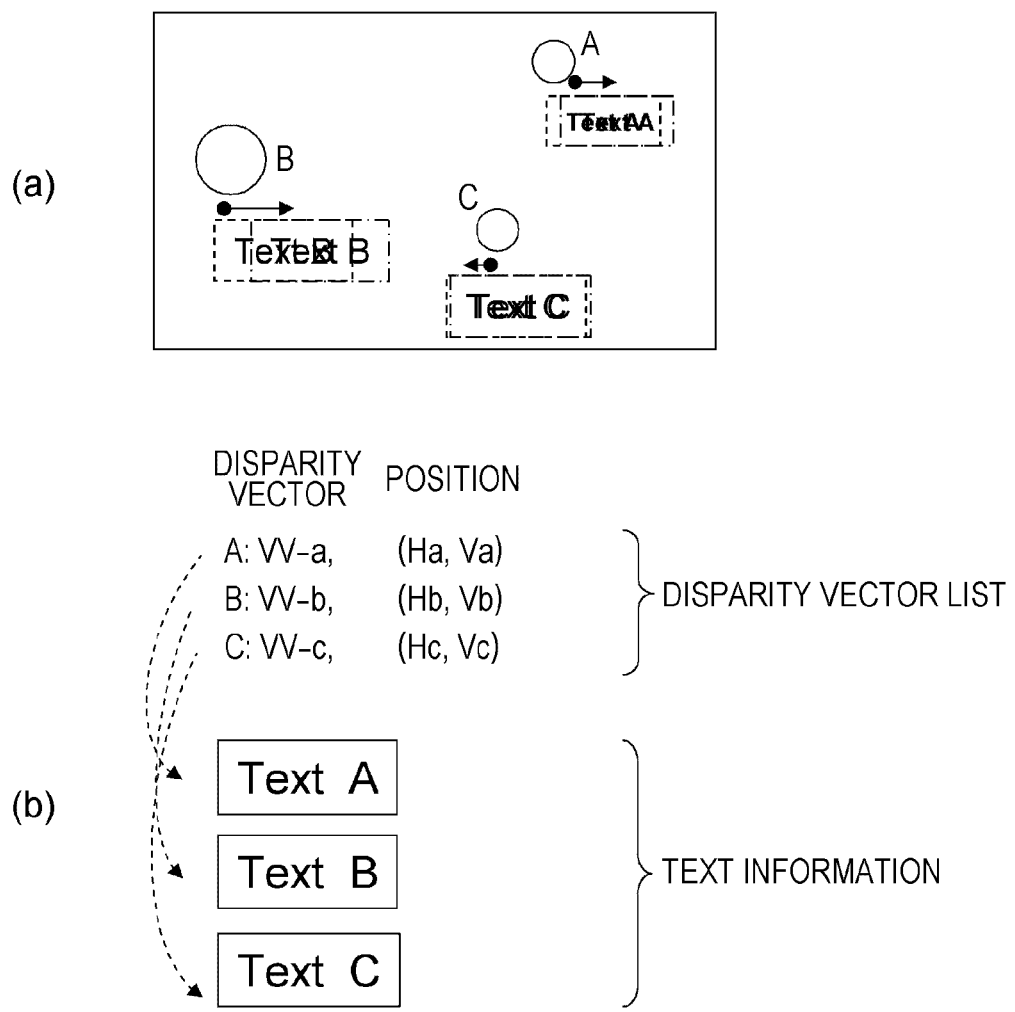
FIG. 40 includes diagrams illustrating that individual objects A, B, and C exist in an image and that text information indicating annotations of the respective objects is superimposed at the vicinity of these respective objects.

Note that FIG. 38 and FIG. 39 illustrate a case where the superimposition information includes graphics information and text information. Also, FIG. 40 illustrates a case where the superimposition information includes text information. This is the same for the case of the other superimposition information, although a detailed description is omitted.

Next, a description will be given of a case where disparity vectors are transmitted while being reflected in advance in the data of superimposition information (such as graphics information, text information, and caption in the ARIB method). In this case, the superimposition information data extracted from bit stream data includes the data of left-eye superimposition information and right-eye superimposition information to which disparity is given on the basis of a disparity vector.

Thus, the bit stream processing unit 201 simply combines the superimposition information data extracted from the bit stream data with the stereo image data (left-eye image data and right-eye image data) extracted from the bit stream data, thereby obtaining processed stereo image data. Note that, as for text data (including closed-caption data), a process of converting a character code into bitmap data or the like is necessary.

[Example Configuration of Set Top Box]

Figure 41:
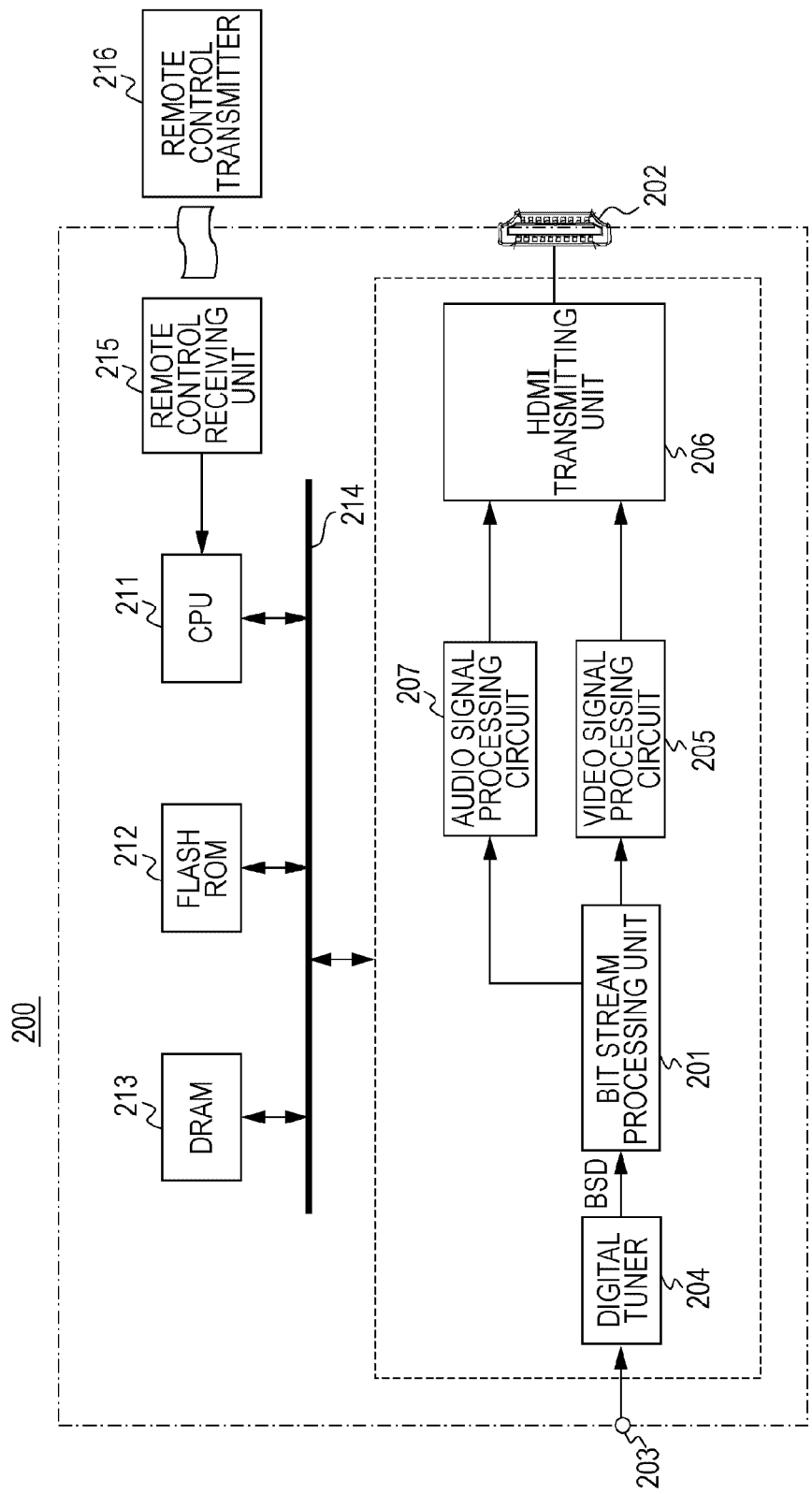
FIG. 41 is a block diagram illustrating an example configuration of a set top box forming the stereo image display system.

An example configuration of the set top box 200 will be described. FIG. 41 illustrates an example configuration of the set top box 200. The set top box 200 includes the bit stream processing unit 201, the HDMI terminal 202, an antenna terminal 203, a digital tuner 204, a video signal processing circuit 205, an HDMI transmitting unit 206, and an audio signal processing circuit 207. Also, the set top box 200 includes a CPU 211, a flash ROM 212, a DRAM 213, an internal bus 214, a remote control receiving unit 215, and a remote control transmitter 216.

The antenna terminal 203 is a terminal for inputting a television broadcast signal that is received by a receiving antenna (not illustrated). The digital tuner 204 processes the television broadcast signal input to the antenna terminal 203, and outputs certain bit stream data (transport stream) BSD corresponding to a channel selected by a user.

The bit stream processing unit 201 extracts stereo image data (left-eye image data and right-eye image data), audio data, superimposition information data, disparity information (disparity vectors), etc., from the bit stream data, as described above. The superimposition information data may be graphics data (including subtitle data), text data (including closed-caption data), or the like. The bit stream processing unit 201 combines the data of superimposition information (such as closed-caption information, subtitle information, graphics information, text information, and caption in the ARIB method) with the stereo image data, thereby obtaining stereo image data to be displayed, as described above. Also, the bit stream processing unit 201 outputs audio data. The detailed configuration of the bit stream processing unit 201 will be described below.

The video signal processing circuit 205 performs an image quality adjustment process or the like on the stereo image data output from the bit stream processing unit 201 as necessary, and supplies the processed stereo image data to the HDMI transmitting unit 206. The audio signal processing circuit 207 performs an audio quality adjustment process or the like on the audio data output from the bit stream processing circuit 201 as necessary, and supplies the processed audio data to the HDMI transmitting unit 206.

The HDMI transmitting unit 206 transmits the data of an image (video) and audio of the baseband from the HDMI terminal 202, through the communication compatible with HDMI. In this case, the data is transmitted using a TMDS channel of HDMI, and thus the data of the image and audio is packed and is output from the HDMI transmitting unit 206 to the HDMI terminal 202.

The CPU 211 controls the operation of the individual units of the set top box 200. The flash ROM 212 stores control software and stores data. The DRAM 213 forms a work area of the CPU 211. The CPU 211 expands software and data read from the flash ROM 212 on the DRAM 213 and starts the software, and controls the individual units of the set top box 200.

The remote control receiving unit 215 receives a remote control signal (remote control code) transmitted from the remote control transmitter 216, and supplies it to the CPU 211. The CPU 211 controls the individual units of the set top box 200 on the basis of this remote control code. The CPU 211, the flash ROM 212, and the DRAM 213 are connected to the internal bus 214.

The operation of the set top box 200 will be briefly described. A television broadcast signal input to the antenna terminal 203 is supplied to the digital tuner 204. The digital tuner 204 processes the television broadcast signal, and outputs certain bit stream data (transport stream) BSD corresponding to a channel selected by a user.

The bit stream data BSD output from the digital tuner 204 is supplied to the bit stream processing unit 201. In the bit stream processing unit 201, stereo image data (left-eye image data and right-eye image data), audio data, superimposition information data, disparity information (disparity vectors), etc. are extracted from the bit stream data BSD. Also, in the bit stream processing unit 201, the data of superimposition information (such as closed-caption information, subtitle information, graphics information, text information, and caption in the ARIB method) is combined with the stereo image data, so that stereo image data to be displayed is generated.

The stereo image data to be displayed that is generated by the bit stream processing unit 201 is subjected to an image quality adjustment process or the like as necessary in the video signal processing circuit 205, and is then supplied to the HDMI transmitting unit 206. Also, the audio data obtained by the bit stream processing unit 201 is subjected to an audio quality adjustment process or the like as necessary in the audio signal processing circuit 207, and is then supplied to the HDMI transmitting unit 206. The stereo image data and the audio data supplied to the HDMI transmitting unit 206 are transmitted from the HDMI terminal 202 to the HDMI cable 400 using the TMDS channel of HDMI.

[Example Configuration of Bit Stream Processing Unit]

Figure 42:
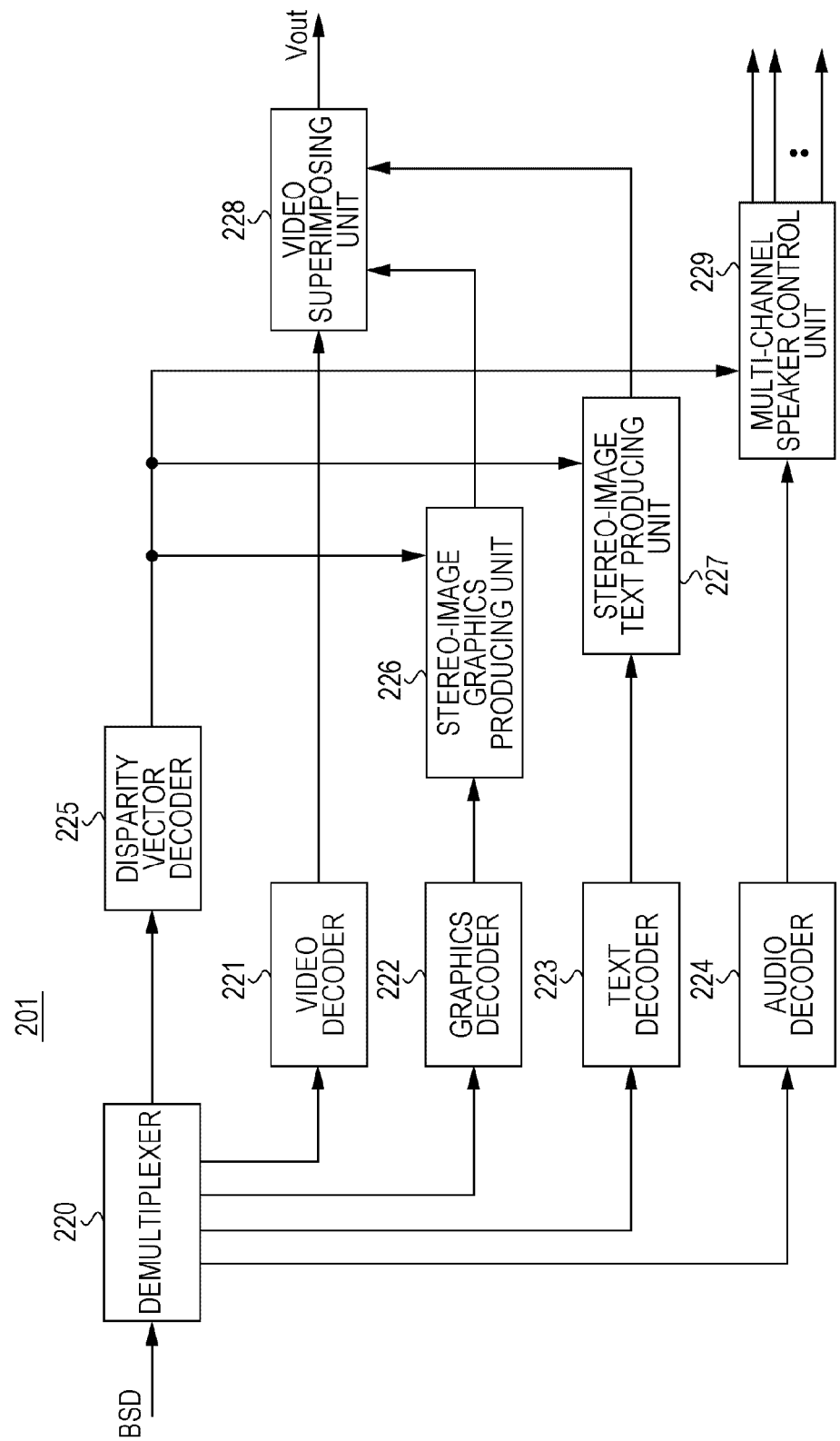
FIG. 42 is a block diagram illustrating an example configuration of a bit stream processing unit forming the set top box.

FIG. 42 illustrates an example configuration of the bit stream processing unit 201. The bit stream processing unit 201 has a configuration corresponding to the above-described transmission data generating unit 110 illustrated in FIG. 2. The bit stream processing unit 201 includes a demultiplexer 220, a video decoder 221, a graphics decoder 222, a text decoder 223, an audio decoder 224, and a disparity vector decoder 225. Also, the bit stream processing unit 201 includes a stereo-image graphics producing unit 226, a stereo-image text producing unit 227, a video superimposing unit 228, and a multi-channel speaker control unit 229.

The demultiplexer 220 extracts packets (PES packets) of video, audio, disparity vector, graphics, and text from the bit stream data BSD, and transmits them to the respective decoders.

The video decoder 221 performs an inverse process of the process performed by the above-described video encoder 113 of the transmission data generating unit 110. That is, the video decoder 221 reconstructs a video elementary stream from the video packets extracted by the demultiplexer 220, performs a decoding process, and obtains stereo image data including left-eye image data and right-eye image data. Examples of the method for transmitting the stereo image data are the above-described first transmission method ("Top & Bottom" method), second transmission method ("Side By Side" method), third transmission method ("Frame Sequential" method), and the like (see FIG. 4).

The graphics decoder 222 performs an inverse process of the process performed by the above-described graphics encoder 119 of the transmission data generating unit 110. That is, the graphics decoder 222 reconstructs a graphics elementary stream from the graphics packets extracted by the demultiplexer 220. Then, the graphics decoder 222 further performs a decoding process to obtain graphics data (including subtitle data).

The text decoder 223 performs an inverse process of the process performed by the above-described text encoder 121 of the transmission data generating unit 110. That is, the text decoder 223 reconstructs a text elementary stream from the text packets extracted by the demultiplexer 220, performs a decoding process, and obtains text data (including closed-caption data).

The audio decoder 224 performs an inverse process of the process performed by the above-described audio encoder 117 of the transmission data generating unit 110. That is, the audio decoder 224 reconstructs an audio elementary stream from the audio packets extracted by the demultiplexer 220, performs a decoding process, and obtains audio data.

The disparity vector decoder 225 performs an inverse process of the process performed by the above-described disparity vector encoder 115 of the transmission data generating unit 110. That is, the disparity vector decoder 225 reconstructs a disparity vector elementary stream from the disparity vector packets extracted by the demultiplexer 220, performs a decoding process, and obtains disparity vectors at certain positions in an image.

The stereo-image graphics producing unit 226 generates pieces of graphics information for a left eye and a right eye that are to be superimposed on a left-eye image and a right-eye image, respectively. This generation process is performed on the basis of the graphics data obtained by the graphics decoder 222 and the disparity vectors obtained by the disparity vector decoder 225. In this case, the pieces of graphics information for the left eye and left eye are the same information. However, the superimposed position in an image of the right-eye graphics information is shifted in the horizontal direction by the horizontal direction component of the disparity vector with respect to the left-eye graphics information, for example. Then, the stereo-image graphics producing unit 226 outputs the data (bitmap data) of the generated pieces of graphics information for the left eye and left eye.

The stereo-image text producing unit 227 generates left-eye text information and right-eye text information that are to be superimposed on a left-eye image and a right-eye image, respectively, on the basis of the text data obtained by the text decoder 223 and the disparity vectors obtained by the disparity vector decoder 225. In this case, the left-eye text information and the right-eye text information are the same text information, but the superimposed position in an image of the right-eye text information is shifted in the horizontal direction by the horizontal direction component of the disparity vector with respect to the left-eye text information, for example. Then, the stereo-image text producing unit 227 outputs the data (bitmap data) of the generated left-eye text information and right-eye text information.

The video superimposing unit 228 superimposes the data produced by the producing units 226 and 227 on the stereo image data (left-eye image data and right-eye image data) obtained by the video decoder 221, thereby obtaining stereo image data to be displayed Vout. Note that the superimposition of the superimposition information data on the stereo image data (left-eye image data and right-eye image data) is started in accordance with a time stamp of a system layer.

The multi-channel speaker control unit 229 performs a process of generating audio data of a multi-channel speaker for realizing 5.1 ch surround or the like, for example, and a process of giving a certain sound field characteristic on the audio data obtained by the audio decoder 224. Also, the multi-channel speaker control unit 229 controls the output of the multi-channel speaker on the basis of a disparity vector obtained by the disparity vector decoder 225.

As the disparity vector is larger, the stereo effect is higher. The output of the multi-channel speaker is controlled in accordance with the degree of stereo effect, whereby further provision of stereo experience can be realized.

Figure 43:
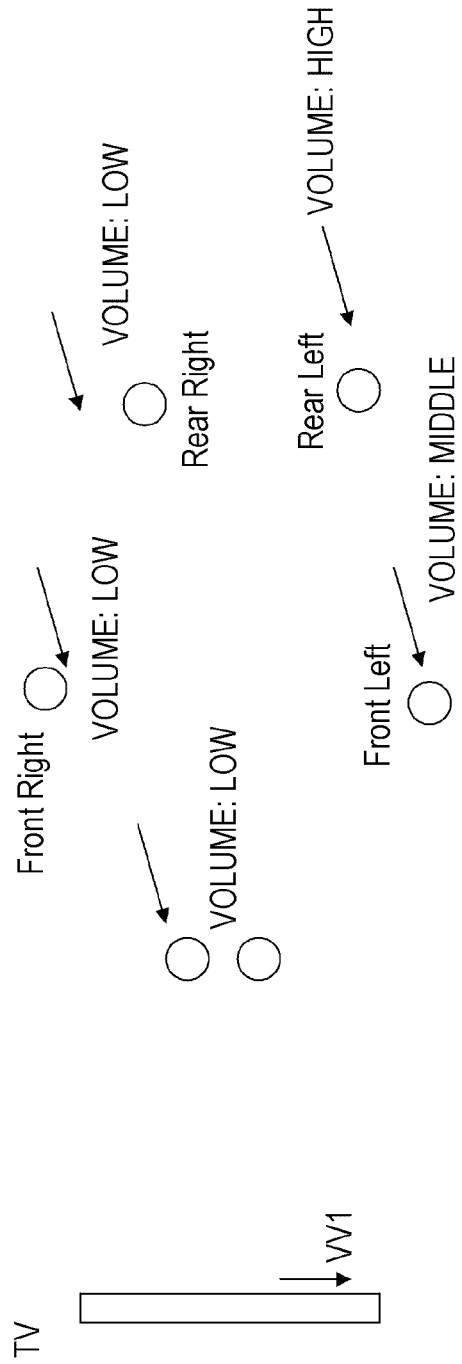
FIG. 43 is a diagram illustrating an example of speaker output control in a case where a disparity vector VV1 is larger in a video object on the left side in the direction of a television display.

FIG. 43 illustrates an example of speaker output control in a case where a disparity vector VV1 is larger in a video object on the left side viewed in the direction of a television display. In this control example, the volume of the rear left speaker of the multi-channel speaker is high, the volume of the front left speaker is middle, and furthermore, the volume of the front right and rear right speakers is low. In this way, a disparity vector of video content (stereo image data) is applied to other medium data, such as audio data, on a receiver side, which enables a viewer to comprehensively experience a stereo effect.

The operation of the bit stream processing unit 201 illustrated in FIG. 42 will be briefly described. The bit stream data BSD output from the digital tuner 204 (see FIG. 41) is supplied to the demultiplexer 220. In the demultiplexer 220, packets (PES packets) of video, audio, disparity vector, graphics, and text are extracted from the bit stream data BSD, and are supplied to the respective decoders.

In the video decoder 221, a video elementary stream is reconstructed from the video packets extracted by the demultiplexer 220, furthermore a decoding process is performed, and stereo image data including left-eye image data and right-eye image data is obtained. The stereo image data is supplied to the video superimposing unit 228. Also, in the disparity vector decoder 225, a disparity vector elementary stream is reconstructed from the disparity vector packets extracted by the demultiplexer 220, furthermore a decoding process is performed, and disparity vectors at certain positions in an image are obtained (see FIG. 8, etc.).

In the graphics decoder 222, a graphics elementary stream is reconstructed from the graphics packets extracted by the demultiplexer 220. Furthermore, in the graphics decoder 222, a decoding process is performed on the graphics elementary stream, whereby graphics data is obtained. The graphics data is supplied to the stereo-image graphics producing unit 226.

The stereo-image graphics producing unit 226 is also supplied with the disparity vectors obtained by the disparity vector decoder 225. In the stereo-image graphics producing unit 226, the data of left-eye graphics information and right-eye graphics information that are to be superimposed on a left-eye image and a right-eye image, respectively, is generated. This generation process is performed on the basis of the graphics data obtained by the graphics decoder 222 and the disparity vectors obtained by the disparity vector decoder 225.

In this case, the superimposed position in an image of the right-eye graphics information is shifted in the horizontal direction by the horizontal direction component of the disparity vector with respect to the left-eye graphics information, for example. The data (bitmap data) of the generated left-eye and right-eye graphics information is output from the stereo-image graphics producing unit 226.

Also, in the text decoder 223, a text elementary stream is reconstructed from the text packets extracted by the demultiplexer 220, furthermore a decoding process is performed, and text data is obtained. The text data is supplied to the stereo-image text producing unit 227. The stereo-image text producing unit 227 is also supplied with the disparity vectors obtained by the disparity vector decoder 225.

In the stereo-image text producing unit 227, left-eye text information and right-eye text information that are to be superimposed on a left-eye image and a right-eye image are generated, respectively, on the basis of the text data obtained by the decoder 223 and the disparity vectors obtained by the decoder 225. In this case, the left-eye text information and the right-eye text information are the same text information, but the superimposed position in an image of the right-eye text information is shifted in the horizontal direction by the horizontal direction component of the disparity vector with respect to the left-eye text information, for example. The data (bitmap data) of the generated left-eye text information and right-eye text information is output from the stereo-image text producing unit 227.

The data output from the graphics producing unit 226 and the text producing unit 227, in addition to the stereo image data (left-eye image data and right-eye image data) from the above-described video decoder 221, is supplied to the video superimposing unit 228. In the video superimposing unit 228, the data produced by the graphics producing unit 226 and the text producing unit 227 is superimposed on the stereo image data (left-eye image data and right-eye image data), so that stereo image data to be displayed Vout is obtained. The stereo image data to be displayed Vout is supplied as transmission image data to the HDMI transmitting unit 206 (see FIG. 41) via the video signal processing circuit 205.

Also, in the audio decoder 224, an audio elementary stream is reconstructed from the audio packets extracted by the demultiplexer 220, furthermore a decoding process is performed, and audio data is obtained. The audio data is supplied to the multi-channel speaker control unit 229. In the multi-channel speaker control unit 229, a process of generating audio data of a multi-channel speaker for realizing 5.1 ch surround or the like, for example, and a process of giving a certain sound field characteristic are performed on the audio data.

The multi-channel speaker control unit 229 is also supplied with the disparity vectors obtained by the disparity vector decoder 225. Also, in the multi-channel speaker control unit 229, the output of the multi-channel speaker is controlled on the basis of the disparity vectors. The multi-channel audio data obtained by the multi-channel speaker control unit 229 is supplied as transmission audio data to the HDMI transmitting unit 206 (see FIG. 41) via the audio signal processing circuit 207.

[Another Example Configuration of Bit Stream Processing Unit]

Figure 44:
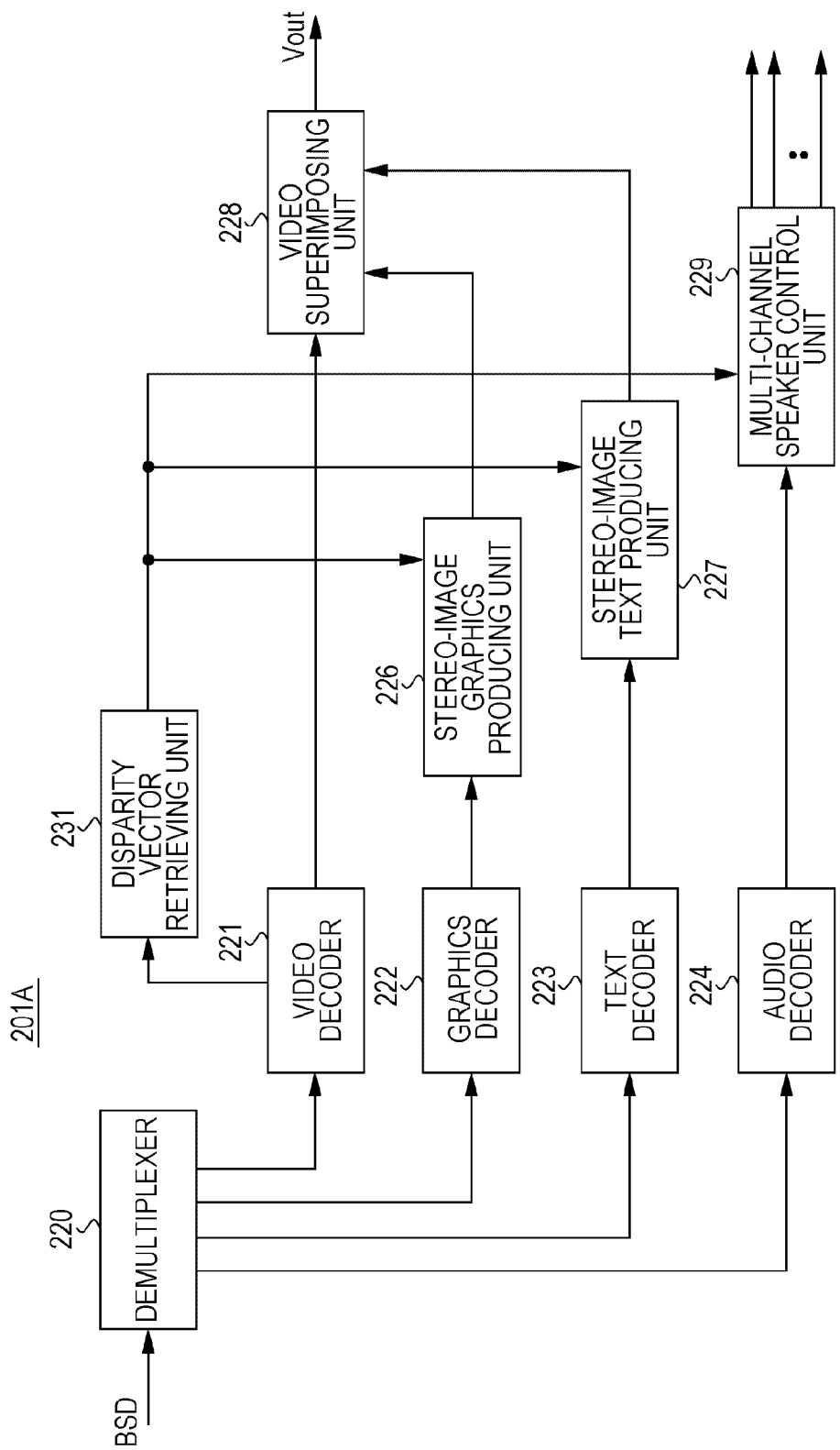
FIG. 44 is a block diagram illustrating another example configuration of the bit stream processing unit forming the set top box.

A bit stream processing unit 201A illustrated in FIG. 44 has a configuration corresponding to the above-described transmission data generating unit 110A illustrated in FIG. 13. In FIG. 44, the parts corresponding to those in FIG. 42 are denoted by the same reference numerals, and the detailed description thereof is omitted.

The bit stream processing unit 201A is provided with a disparity vector retrieving unit 231 instead of the disparity vector decoder 225 of the bit stream processing unit 201 illustrated in FIG. 42. The disparity vector retrieving unit 231 retrieves disparity vectors embedded in a user data area from the video stream that is obtained through the video decoder 221. Then, the disparity vector retrieving unit 231 supplies the retrieved disparity vectors to the stereo-image graphics producing unit 226, the stereo-image text producing unit 227, and the multi-channel speaker control unit 229.

Other than that, the bit stream processing unit 201A illustrated in FIG. 44 is configured similarly to the bit stream processing unit 201 illustrated in FIG. 42, and operates similarly thereto, although a detailed description is omitted.

[Another Example Configuration of Bit Stream Processing Unit]

Figure 45:
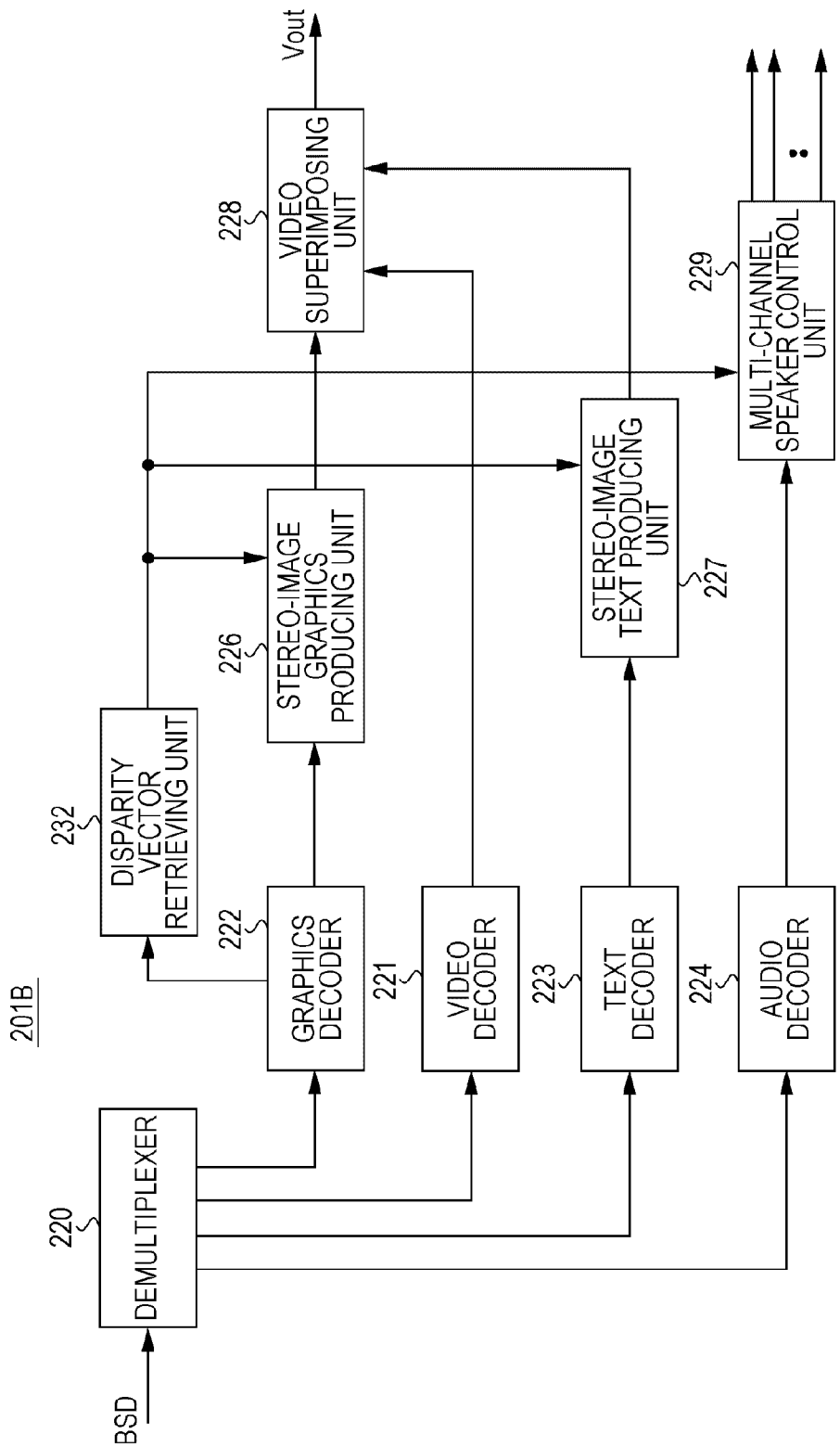
FIG. 45 is a block diagram illustrating another example configuration of the bit stream processing unit forming the set top box.

A bit stream processing unit 201B illustrated in FIG. 45 has a configuration corresponding to the above-described transmission data generating unit 110B illustrated in FIG. 15. In FIG. 45, the parts corresponding to those in FIG. 42 are denoted by the same reference numerals, and the detailed description thereof is omitted.

The bit stream processing unit 201B is provided with a disparity vector retrieving unit 232 instead of the disparity vector decoder 225 of the bit stream processing unit 201 illustrated in FIG. 42. The disparity vector retrieving unit 232 retrieves disparity vectors embedded in a graphics stream that is obtained through the graphics decoder 222. Then, the disparity vector retrieving unit 232 supplies the retrieved disparity vectors to the stereo-image graphics producing unit 226, the stereo-image text producing unit 227, and the multi-channel speaker control unit 229.

Other than that, the bit stream processing unit 201B illustrated in FIG. 45 is configured similarly to the bit stream processing unit 201 illustrated in FIG. 42, and operates similarly thereto, although a detailed description is omitted.

[Another Example Configuration of Bit Stream Processing Unit]

Figure 46:
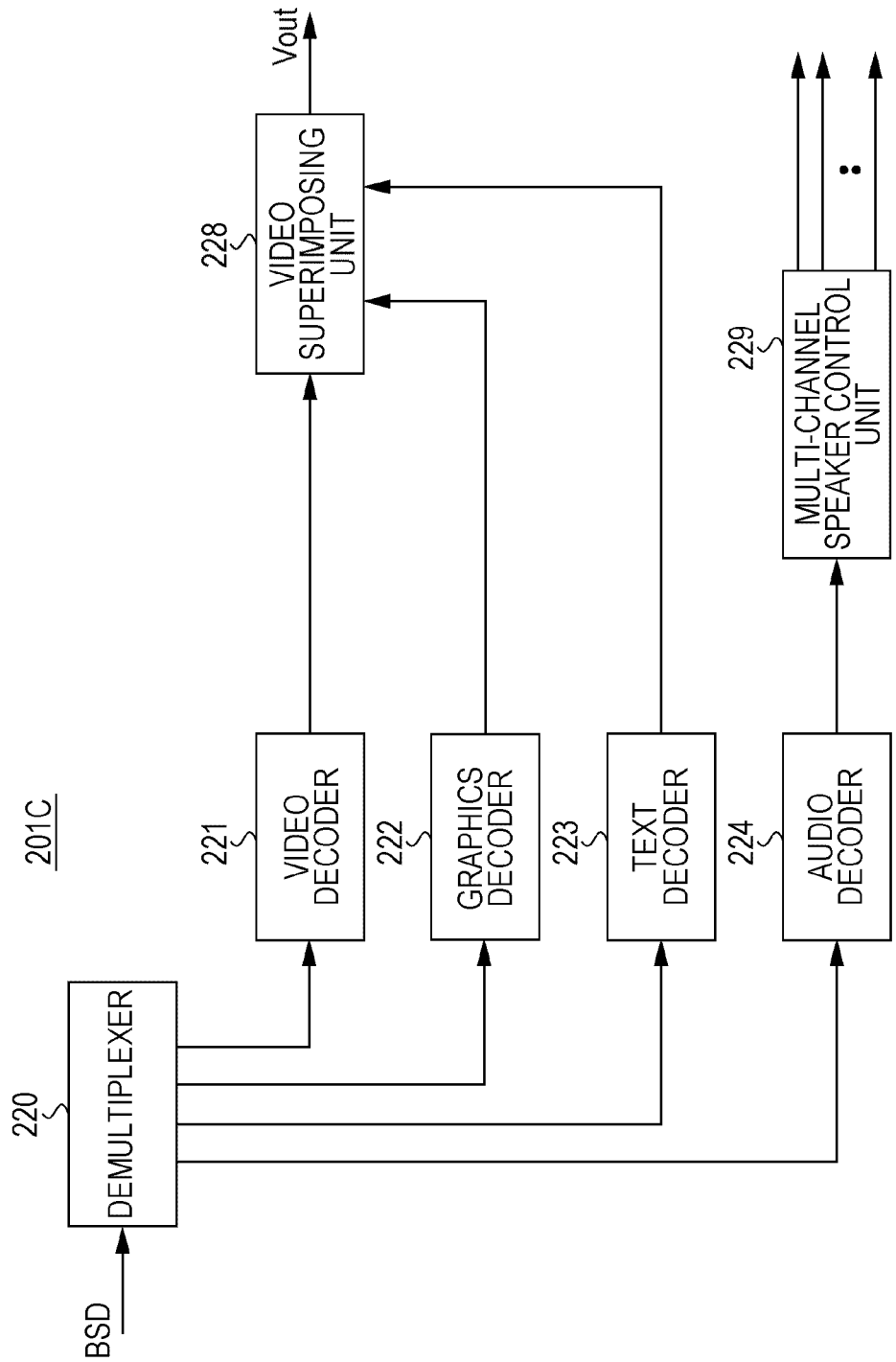
FIG. 46 is a block diagram illustrating another example configuration of the bit stream processing unit forming the set top box.

A bit stream processing unit 201C illustrated in FIG. 46 has a configuration corresponding to the above-described transmission data generating unit 110C illustrated in FIG. 21. In FIG. 46, the parts corresponding to those in FIG. 42 are denoted by the same reference numerals, and the detailed description thereof is omitted.

The bit stream processing unit 201C is obtained by removing the disparity vector decoder 225, the stereo-image graphics producing unit 226, and the stereo-image text producing unit 227 from the bit stream processing unit 201 illustrated in FIG. 42. In this case, disparity vectors are reflected in advance in the data of graphics information and text information.

The graphics data that is transmitted includes the data of left-eye graphics information that is to be superimposed on a left-eye image and the data of right-eye graphics information that is to be superimposed on a right-eye image. Likewise, the text data that is transmitted includes the data of left-eye text information that is to be superimposed on a left-eye image and the data of right-eye text information that is to be superimposed on a right-eye image, as described above. Thus, the disparity vector decoder 225, the stereo-image graphics producing unit 226, and the stereo-image text producing unit 227 are not necessary.

Note that, since the text data obtained by the text decoder 223 is code data (character code), a process of converting this into bitmap data is necessary. This process is performed in the last stage of the text decoder 223 or in the input stage of the video superimposing unit 228, for example.

[Another Example Configuration of Set Top Box]

Figure 47:
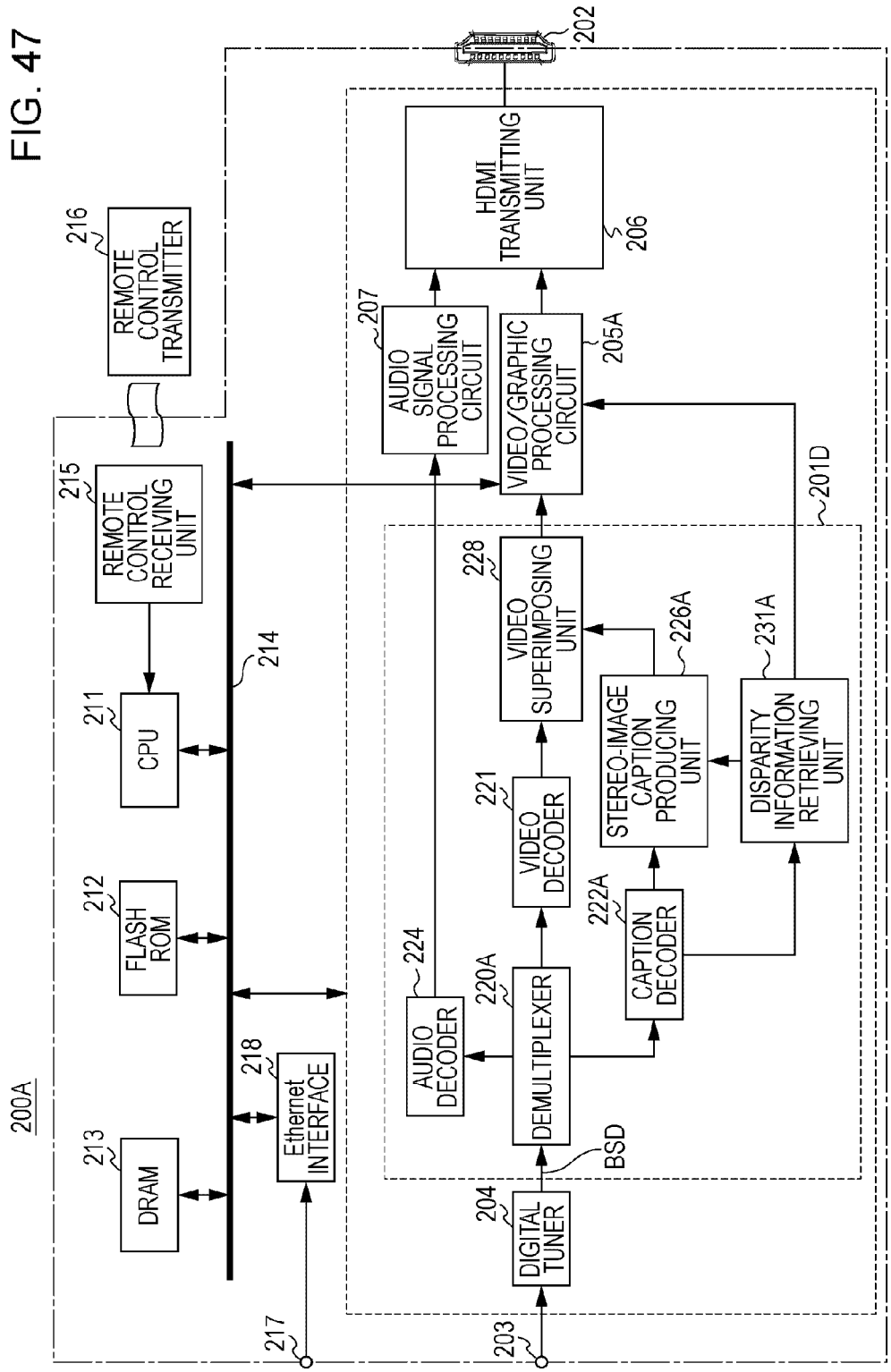
FIG. 47 is a block diagram illustrating an example configuration of a set top box including another example configuration of the bit stream processing unit.

The set top box 200A illustrated in FIG. 47 illustrates another example configuration of the set top box. In FIG. 47, the parts corresponding to those in FIG. 41 and FIG. 42 are denoted by the same reference numerals, and the detailed description thereof is appropriately omitted. The set top box 200A includes a bit stream processing unit 201D, the HDMI terminal 202, the antenna terminal 203, the digital tuner 204, a video/graphic processing circuit 205A, the HDMI transmitting unit 206, and the audio signal processing circuit 207.

Also, the set top box 200A includes the CPU 211, the flash ROM 212, the DRAM 213, the internal bus 214, the remote control receiving unit 215, the remote control transmitter 216, a network terminal 217, and an Ethernet interface 218. Note that "Ethernet" is a registered trademark.

The bit stream processing unit 201D has a configuration corresponding to the above-described transmission data generating unit 110D illustrated in FIG. 22. The bit stream processing unit 201D extracts stereo image data (left-eye image data and right-eye image data), audio data, caption data, disparity information (disparity information set), etc., from the bit stream data BSD obtained by the digital tuner 204.

The bit stream processing unit 201D includes a demultiplexer 220A, the video decoder 221, a caption decoder 222A, a stereo-image caption producing unit 226A, a disparity information retrieving unit 231A, the audio decoder 224, and the video superimposing unit 228. The demultiplexer 220A extracts packets of video, audio, and caption from the bit stream data BSD and transmits them to the respective decoders.

The video decoder 221 reconstructs a video elementary stream from the video packets extracted by the demultiplexer 220A, performs a decoding process, and obtains stereo image data including left-eye image data and right-eye image data. The caption decoder 222A performs an inverse process of the process performed by the above-described caption encoder 133 of the transmission data generating unit 110D. That is, the caption decoder 222A reconstructs a caption elementary stream (caption data stream) from the caption packets extracted by the demultiplexer 220A, performs a decoding process, and obtains caption data in the ARIB method.

The disparity information retrieving unit 231A retrieves disparity information (disparity information set) from the caption stream obtained through the caption decoder 221. Then, the disparity information retrieving unit 231A supplies the retrieved disparity information (disparity information set) to the stereo-image caption producing unit 226 and also outputs it to the outside of the bit stream processing unit 201D.

The stereo-image caption producing unit 226A generates a left-eye caption and a right-eye caption that are to be superimposed on a left-eye image and a right-eye image, respectively. This generation process is performed on the basis of the caption data obtained by the caption decoder 222A and the disparity information (disparity information set) supplied from the disparity information retrieving unit 231A. Then, the stereo-image caption producing unit 226A outputs the data (bitmap data) of a left-eye caption and a right-eye caption.

In this case, the left-eye caption and the right-eye caption (caption units) are the same information. However, the superimposed position in an image of the right-eye caption is shifted in the horizontal direction by the horizontal direction component of the disparity vector with respect to the left-eye caption, for example. Accordingly, a caption in which disparity adjustment has been performed in accordance with the perspective of individual objects in an image can be used as the same captions that are to be superimposed on the left-eye image and the right-eye image, so that the perspective consistency among the individual objects in the image can be maintained in display of the graphics information.

The disparity information used here is disparity information (disparity information set) for a caption. The disparity information (disparity information set) for a caption includes a certain number of pieces of disparity information corresponding to a certain number of captions (caption units) displayed on each screen. The individual pieces of disparity information are added with respective pieces of identification information indicating the arrangement order in the caption data stream of the corresponding caption data. Accordingly, the pieces of caption data of respective captions (caption units) are associated with the corresponding pieces of identification information.

Accordingly, in the stereo-image caption producing unit 226A, appropriate disparity can be given using the pieces of disparity information corresponding to the certain number captions (caption units) that are to be superimposed on the left-eye image and the right-eye image. Thus, the perspective consistency among individual objects in an image can be maintained in the optimum state in display of captions (caption units). Note that, in a case where disparity information (disparity information set) for general purpose is transmitted instead of disparity information (disparity information set) for a caption, the disparity information can be used.

The stereo-image caption producing unit 226A performs a shift process for giving disparity on any of a left-eye caption and a right-eye caption or both of them on the basis of shift target specification information (Select_view_shift). Also, the stereo-image caption producing unit 226A performs a disparity giving process on captions (caption units) in accordance with the disparity information retrieved by the disparity information retrieving unit 231A. That is, the stereo-image caption producing unit 226A gives disparity in the following manner depending on whether the disparity information is disparity information that is used in common in a certain number of frames in which a caption (caption unit) is displayed or disparity information that is sequentially updated in the certain number of frames.

That is, in the case of the disparity information that is used in common in individual frames, the stereo-image caption producing unit 226A gives disparity to the captions (caption units) that are to be superimposed on a left-eye image and a right-eye image on the basis of the common disparity information. On the other hand, in the case of the disparity information that is sequentially updated in individual frames, the stereo-image caption producing unit 226A gives disparity to the captions (caption units) that are to be superimposed on the left-eye image and the right-eye image on the basis of the disparity information that is updated in individual frames.

As described above, the disparity information that is sequentially updated in individual frames is constituted by the disparity information of the first frame and the offset information with respect to the disparity information of the preceding frame of the second and subsequent frames, for example. In this case, in the first frame, disparity is given to the captions (caption units) that are to be superimposed on the left-eye image and the right-eye image on the basis of the disparity information of the first frame. Then, in the second and subsequent frames, disparity is further given to the captions (caption units) that are to be superimposed on the left-eye image and the right-eye image in accordance with the offset information on the basis of the disparity given state in the preceding frame.

Figure 48:
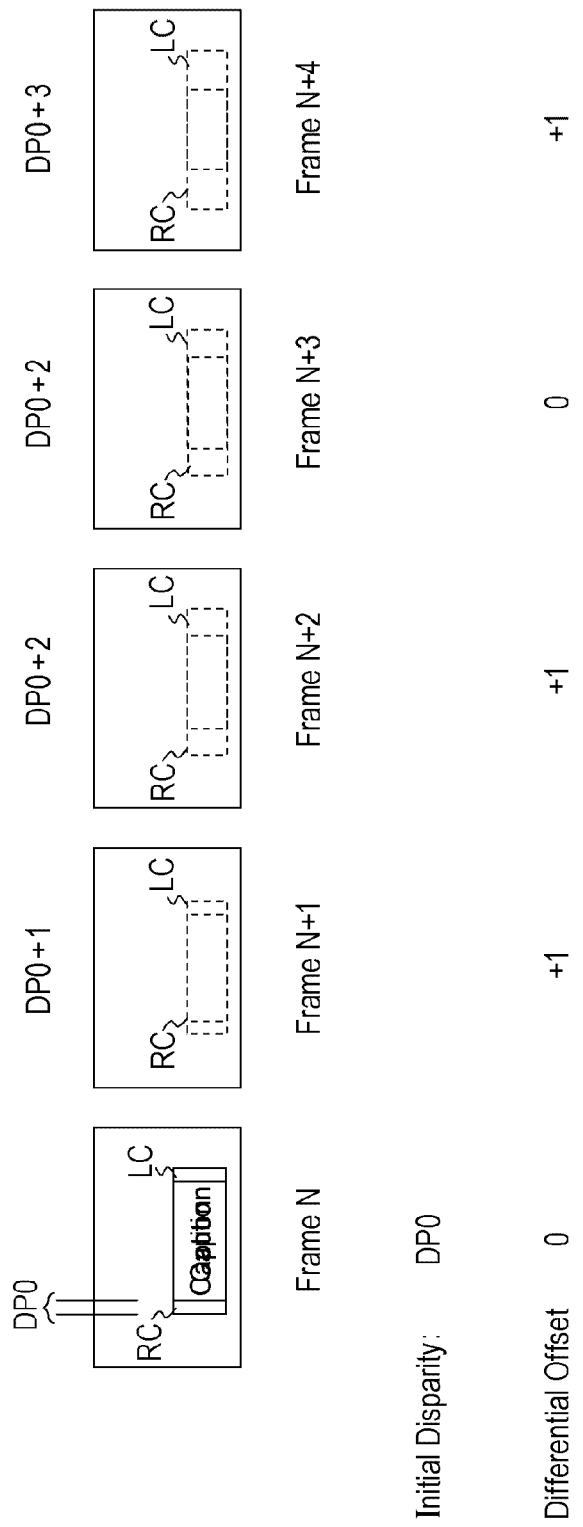
FIG. 48 is a diagram illustrating an example of a process of giving disparity to a caption (caption unit) superimposed on a left-eye image and a right-eye image on the basis of disparity information that is sequentially updated in individual frames.

FIG. 48 illustrates a process of giving disparity to the captions (caption units) that are to be superimposed on the left-eye image and the right-eye image on the basis of the disparity information that is sequentially updated in individual frames. In the first frame (Frame N), a shift process is performed on the basis of the disparity information DP0 of the first frame, so that disparity is given to a left-eye caption LC and a right-eye caption RC. In the next frame (Frame N+1), a shift process is further performed on the captions LC and RC in accordance with "+1", which is offset information (Differential), from the state of the frame (Frame N).

In the next frame (Frame N+2), a shift process is further performed on the captions LC and RC in accordance with "+1", which is offset information, from the state of the frame (Frame N+1). In the next frame (Frame N+3), since the offset information is "0", the shift state of the captions LC and RC is maintained in the same state as in the frame (Frame N+2). Also, in the next frame (Frame N+3), a shift process is further performed on the captions LC and RC in accordance with "+1", which is offset information, from the state of the frame (Frame N+3).

The video superimposing unit 228 superimposes the data (bitmap data) of left-eye and left-eye captions produced by the stereo-image caption producing unit 226A on the stereo image data (left-eye image data and right-eye image data) obtained by the video decoder 221, thereby obtaining stereo image data to be displayed. Note that the superimposition of the caption data on the stereo image data (left-eye image data and right-eye image data) is started in accordance with a time stamp of a system layer. Then, the video superimposing unit 228 outputs the stereo image data to be displayed to the outside of the bit stream processing unit 201D.

The Ethernet interface 218 is connected to a network (not illustrated), such as the Internet, via the network terminal 217. The Ethernet interface 218 is capable of obtaining various types of information, for example, information about weather forecast, stock price, etc., displayed in graphics using Widget via a network in accordance with a user operation. The Ethernet interface 218 is connected to the internal bus 214.

The video/graphic processing circuit 205A performs an image quality adjustment process as necessary on the stereo image data to be displayed output from the bit stream processing unit 201D. Also, the video/graphic processing circuit 205A superimposes the data of graphics information of Widget, for example, on the stereo image data to be displayed output from the bit stream processing unit 201D.

The video/graphic processing circuit 205A is supplied with the disparity information (disparity information set) output from the above-described bit stream processing unit 201D. The disparity information is disparity information for general purpose, for example. The video/graphic processing circuit 205A gives disparity to the same pieces of graphics information that are to be superimposed on a left-eye image and a right-eye image on the basis of the disparity information. Accordingly, graphics information in which disparity adjustment has been performed in accordance with the perspective among individual objects in an image can be used as the same pieces of graphics information that are to be superimposed on the left-eye image and the right-eye image, so that the perspective consistency among the individual objects in the image can be maintained in display of the graphics information.

The video/graphic processing circuit 205A supplies the processed stereo image data to be displayed to the HDMI transmitting unit 206. The audio signal processing circuit 207 performs an audio quality adjustment process or the like as necessary on the audio data output from the bit stream processing unit 201D, and supplies the processed audio data to the HDMI transmitting unit 206. The HDMI transmitting unit 206 transmits the data of an image (video) and audio of the baseband from the HDMI terminal 202, through the communication compatible with HDMI. In this case, the HDMI transmitting unit 206 transmits the data using a TMDS channel of HDMI, and thus packs the data of the image and audio and outputs it to the HDMI terminal 202.

Other than that, the set top box 200A illustrated in FIG. 47 is configured similarly to the set top box 200 illustrated in FIG. 41, although a detailed description is omitted.

The operation of the set top box 200A illustrated in FIG. 47 will be briefly described. A television broadcast signal input to the antenna terminal 203 is supplied to the digital tuner 204. In the digital tuner 204, the television broadcast signal is processed, and certain bit stream data BSD corresponding to a channel selected by a used is obtained. The bit stream data BSD is supplied to the bit stream processing unit 201D.

In the bit stream processing unit 201D, stereo image data (left-eye image data and right-eye image data), audio data, caption data, disparity information (disparity information set), etc., are extracted from the bit stream data. Also, in the bit stream processing unit 201D, the data (bitmap data) of a caption is combined with the stereo image data, so that stereo image data to be displayed is generated.

In this case, in the bit stream processing unit 201D, disparity is given to the same captions (caption units) that are to be superimposed on a left-eye image and a right-eye image on the basis of a disparity vector. Accordingly, a caption in which disparity adjustment has been performed in accordance with the perspective of individual objects in an image can be used as the same captions that are to be superimposed on the left-eye image and the right-eye image, so that the perspective consistency among the individual objects in the image can be maintained in display of the caption.

The stereo image data to be displayed that is generated by the bit stream processing unit 201D is subjected to an image quality adjustment process as necessary by the video/graphic processing circuit 205A. Also, in the video/graphic processing circuit 205A, the data of graphics information based on Widget is combined as necessary with the stereo image data to be displayed that is generated by the bit stream processing unit 201D.

In this case, in the video/graphic processing circuit 205A, disparity is given to the same pieces of graphics information that are to be superimposed on a left-eye image and a right-eye image on the basis of the disparity information (disparity information set) supplied from the bit stream processing unit 201D. Accordingly, graphics information in which disparity adjustment has been performed in accordance with the perspective among individual objects in an image can be used as the same pieces of graphics information that are to be superimposed on the left-eye image and the right-eye image, so that the perspective consistency among the individual objects in the image can be maintained in display of the graphics information.

The processed stereo image data to be displayed that is obtained from the video/graphic processing circuit 205A is supplied to the HDMI transmitting unit 206. Also, the audio data obtained by the bit stream processing unit 201D is subjected to an audio quality adjustment process or the like as necessary in the audio signal processing circuit 207, and is then supplied to the HDMI transmitting unit 206. The stereo image data and audio data supplied to the HDMI transmitting unit 206 are transmitted from the HDMI terminal 202 to the HDMI cable 400 using the TMDS channel of HDMI.

In the set top box 200A illustrated in FIG. 47, disparity is given to the same captions (caption units) that are to be superimposed on a left-eye image and a right-eye image in the bit stream processing unit 201D on the basis of the disparity information retrieved by the disparity information retrieving unit 231A. Also, disparity is given to the same pieces of graphics information that are to be superimposed on the left-eye image and the right-eye image on the basis of the disparity information (disparity information set) in the video/graphic processing circuit 205A. Thus, the perspective consistency among individual objects in an image can be maintained regarding not only the caption (caption unit) transmitted from the broadcast station but also the graphics information produced in the set top box 200A in display thereof.

Figure 49:
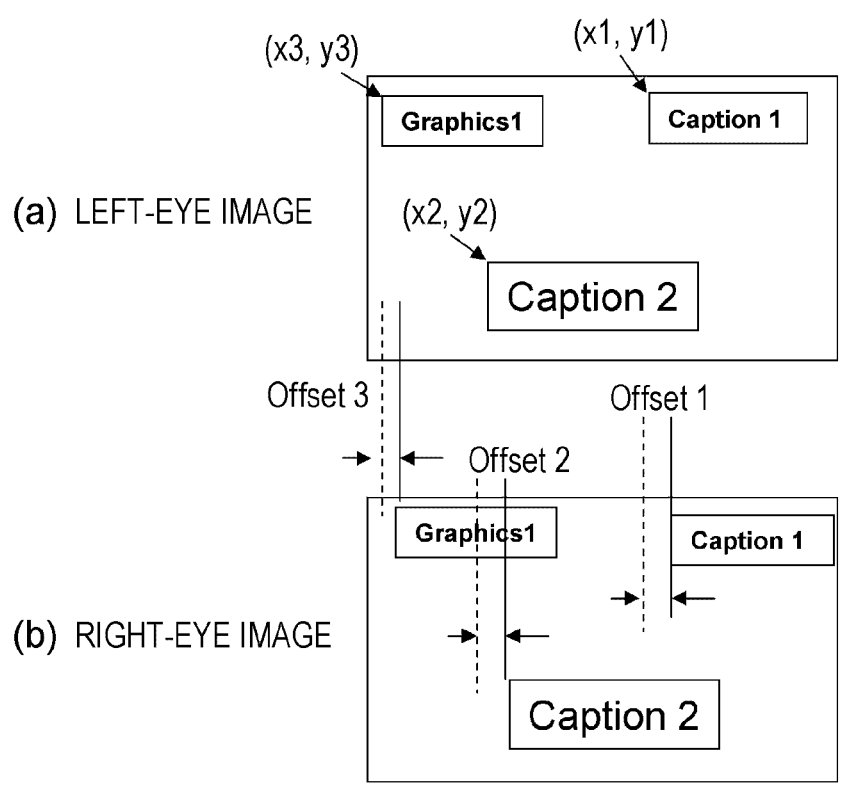
FIG. 49 includes diagrams illustrating an example of superimposing captions (caption units) and graphics information on a left-eye image and a right-eye image.

FIG. 49 illustrates an example of superimposing captions (caption units) and graphics information on a left-eye image and a right-eye image in the set top box 200A illustrated in FIG. 47. FIG. 49(a) illustrates the left-eye image. In the bit stream processing unit 201D, a caption (caption unit) "Caption 1" is superimposed at the position (x1, y1), and a caption (caption unit) "Caption 2" is superimposed at the position (x2, y2). Also, graphics information "Graphics 1" is superimposed at the position (x3, y3) in the video/graphic processing circuit 205A.

FIG. 49(b) illustrates the right-eye image. In the bit stream processing unit 201D, the caption (caption unit) "Caption 1" is superimposed at the position shifted by Offset 1 with respect to the superimposed position on the left-eye image on the basis of the corresponding disparity vector. Likewise, in the bit stream processing unit 201D, the caption (caption unit) "Caption 2" is superimposed at the position shifted by Offset 2 with respect to the superimposed position on the left-eye image on the basis of the corresponding disparity vector. Also, in the video/graphic processing circuit 205A, the graphics information "Graphics 1" is superimposed at the position shifted by Offset 3 with respect to the superimposed position on the left-eye image.

Note that, in the set top box 200A illustrated in FIG. 47, captions (caption units) are handled in the bit stream processing unit 201D, and graphic information is handled in the video/graphic processing unit 205A. However, other superimposition information can also be handled.

[Description of Television Receiver]

Referring back to FIG. 1, the television receiver 300 receives stereo image data that is transmitted from the set top box 200 via the HDMI cable 400. The television receiver 300 includes a 3D signal processing unit 301. The 3D signal processing unit 301 performs a process (decoding process) corresponding to a transmission method on the stereo image data, thereby generating left-eye image data and right-eye image data.

That is, the 3D signal processing unit 301 performs an inverse process of the process performed by the video framing unit 112 in the transmission data generating units 110, 110A, 110B, and 110C illustrated in FIG. 2, FIG. 13, FIG. 15, and FIG. 21. Then, the 3D signal processing unit 301 obtains left-eye image data and right-eye image data forming the stereo image data.

[Example Configuration of Television Receiver]

Figure 50:
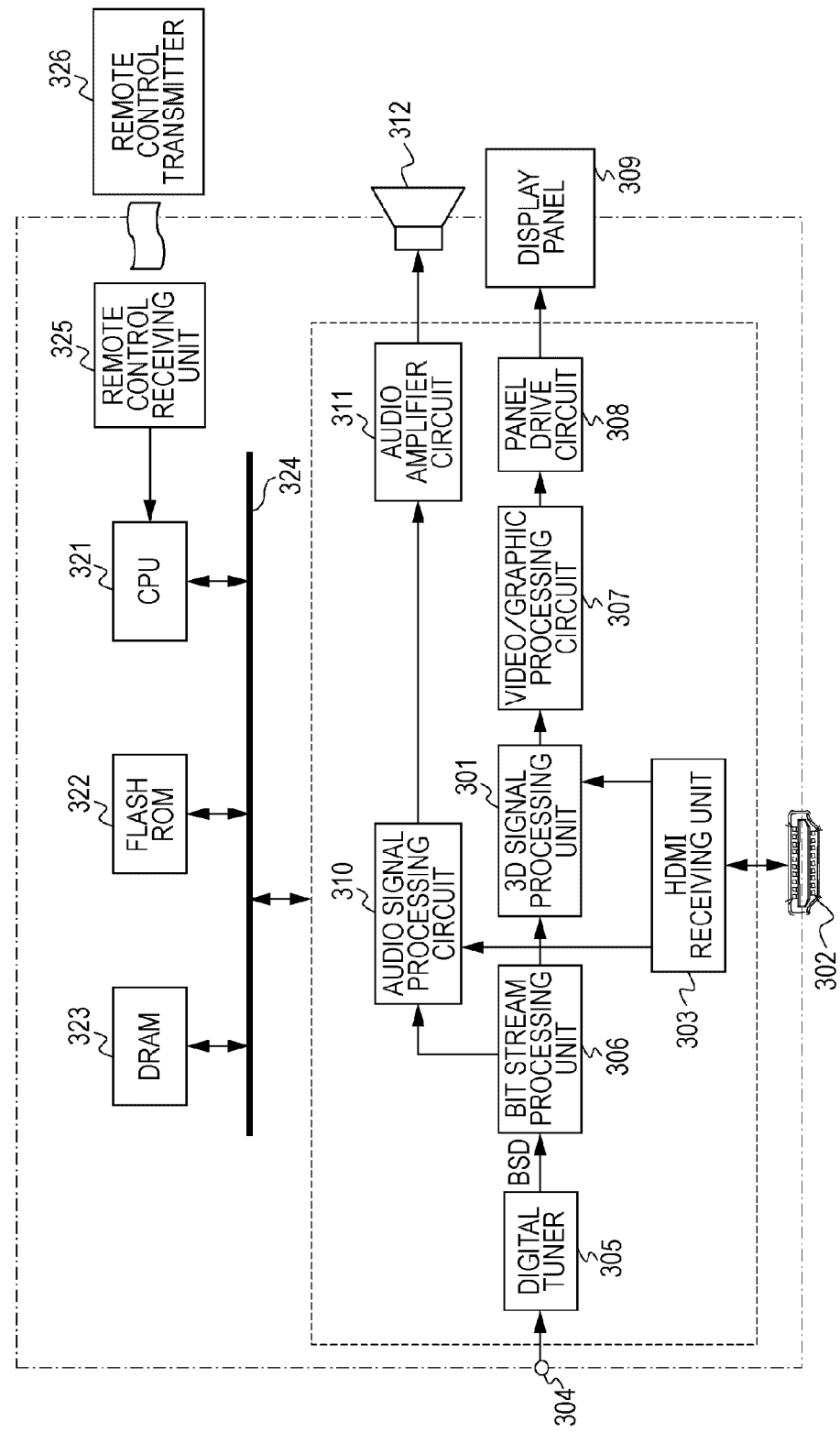
FIG. 50 is a diagram illustrating an example configuration of a television receiver forming the stereo image display system.

An example configuration of the television receiver 300 will be described. FIG. 50 illustrates an example configuration of the television receiver 300. The television receiver 300 includes a 3D signal processing unit 301, an HDMI terminal 302, an HDMI receiving unit 303, an antenna terminal 304, a digital tuner 305, and a bit stream processing unit 306.

Also, the television receiver 300 includes a video/graphic processing circuit 307, a panel drive circuit 308, a display panel 309, an audio signal processing circuit 310, an audio amplifier circuit 311, and a speaker 312. Also, the television receiver 300 includes a CPU 321, a flash ROM 322, a DRAM 323, an internal bus 324, a remote control receiving unit 325, and a remote control transmitter 326.

The antenna terminal 304 is a terminal for inputting a television broadcast signal that is received by a receiving antenna (not illustrated). The digital tuner 305 processes the television broadcast signal input to the antenna terminal 304, and outputs certain bit stream data (transport stream) BSD corresponding to a channel selected by a user.

The bit stream processing unit 306 is configured similarly to the bit stream processing units 201 and 201A to 201D in the set top box illustrated in FIG. 42, FIG. 44, FIG. 45, FIG. 46, and FIG. 47. The bit stream processing unit 306 extracts stereo image data (left-eye image data and right-eye image data), audio data, superimposition information data, disparity information (disparity vectors), etc., from the bit stream data BSD. The superimposition information data may be graphics data, text data, caption data in the ARIB method, or the like. The bit stream processing unit 306 combines superimposition information data with the stereo image data, thereby obtaining stereo image data to be displayed. Also, the bit stream processing unit 306 outputs audio data.

The HDMI receiving unit 303 receives uncompressed image data and audio data that are supplied to the HDMI terminal 302 via the HDMI cable 400 through the communication compatible with HDMI. The version of the HDMI receiving unit 303 is HDMI 1.4, for example, and is in a state of being able to handle stereo image data.

The 3D signal processing unit 301 performs a decoding process on the stereo image data that is received by the HDMI receiving unit 303 or that is obtained by the bit stream processing unit 306, thereby generating left-eye image data and right-eye image data. In this case, the 3D signal processing unit 301 performs a decoding process corresponding to the transmission method (see FIG. 4) on the stereo image data obtained by the bit stream processing unit 306. Also, the 3D signal processing unit 301 performs a decoding process corresponding to a TMDS transmission data structure on the stereo image data received by the HDMI receiving unit 303.

The video/graphic processing circuit 307 generates image data for displaying a stereo image on the basis of the left-eye image data and right-eye image data generated by the 3D signal processing unit 301. Also, the video/graphic processing circuit 307 performs an image quality adjustment process on the image data as necessary. Also, the video/graphic processing circuit 307 combines the data of superimposition information, such as a menu and a program table, with the image data as necessary. The panel drive circuit 308 drives the display panel 309 on the basis of the image data output from the video/graphic processing circuit 307. The display panel 309 is constituted by an LCD (Liquid Crystal Display), a PDP (Plasma Display Panel), or the like.

The audio signal processing circuit 310 performs a necessary process, such as D/A conversion, on the audio data that is received by the HDMI receiving unit 303 or that is obtained by the bit stream processing unit 306. The audio amplifier circuit 311 amplifies an audio signal output from the audio signal processing circuit 310 and supplies it to the speaker 312.

The CPU 321 controls the operation of the individual units of the television receiver 300. The flash ROM 322 stores control software and stores data. The DRAM 323 forms a work area of the CPU 321. The CPU 321 expands software and data read from the flash ROM 322 on the DRAM 323 and starts the software, and controls the individual units of the television receiver 300.

The remote control receiving unit 325 receives a remote control signal (remote control code) transmitted from the remote control transmitter 326, and supplies it to the CPU 321. The CPU 321 controls the individual units of the television receiver 300 on the basis of this remote control code. The CPU 321, the flash ROM 322, and the DRAM 323 are connected to the internal bus 324.

The operation of the television receiver 300 illustrated in FIG. 50 will be briefly described. The HDMI receiving unit 303 receives stereo image data and audio data that are transmitted from the set top box 200 connected to the HDMI terminal 302 via the HDMI cable 400. The stereo image data received by the HDMI receiving unit 303 is supplied to the 3D signal processing unit 301. Also, the audio data received by the HDMI receiving unit 303 is supplied to the audio signal processing circuit 310.

A television broadcast signal input to the antenna terminal 304 is supplied to the digital tuner 305. The digital tuner 305 processes the television broadcast signal, and outputs certain bit stream data (transport stream) BSD corresponding to a channel selected by a user.

The bit stream data BSD output from the digital tuner 305 is supplied to the bit stream processing unit 306. In the bit stream processing unit 306, stereo image data (left-eye image data and right-eye image data), audio data, superimposition information data, disparity vectors (disparity information), etc., are extracted from the bit stream data BSD. Also, in the bit stream processing unit 306, the data of superimposition information (closed-caption information, subtitle information, graphics information, text information, caption in the ARIB method, etc.) is combined with the stereo image data, so that stereo image data to be displayed is generated.

The stereo image data to be displayed that is generated by the bit stream processing unit 306 is supplied to the 3D signal processing unit 301. Also, the audio data obtained by the bit stream processing unit 306 is supplied to the audio signal processing circuit 310.

In the 3D signal processing unit 301, a decoding process is performed on the stereo image data that is received by the HDMI receiving unit 303 or that is obtained by the bit stream processing unit 306, so that left-eye image data and right-eye image data are generated. The left-eye image data and the right-eye image data are supplied to the video/graphic processing circuit 307. In the video/graphic processing circuit 307, image data for displaying a stereo image is generated on the basis of the left-eye image data and the right-eye image data, and an image quality adjustment process and a process of combining superimposition information data are performed as necessary.

The image data obtained by the video/graphic processing circuit 307 is supplied to the panel drive circuit 308. Accordingly, a stereo image is displayed on the display panel 309. For example, left-eye images based on the left-eye image data and right-eye images based on the right-eye image data are alternately displayed on the display panel 309 in a time division manner. A viewer can view only left-eye images with a left eye and can view only right-eye images with a right eye by wearing shutter glasses in which a left-eye shutter and a right-eye shutter alternately open in synchronization with display on the display panel 309, thereby being able to perceive a stereo image.

Also, in the audio signal processing circuit 310, a necessary process, such as D/A conversion, is performed on the audio data that is received by the HDMI receiving unit 303 or that is obtained by the bit stream processing unit 306. The audio data is amplified by the audio amplifier circuit 311 and is then supplied to the speaker 312. Accordingly, the audio corresponding to an image displayed on the display panel 309 is output from the speaker 312.

As described above, in the stereo image display system 10 illustrated in FIG. 1, a multiplexed data stream including a video data stream and a caption data stream is transmitted from the broadcast station 100 (transmission data generating unit 201D) to the set top box 200. The video data stream includes stereo image data. Also, the caption data stream includes the data of a caption (caption unit) in the ARIB method as superimposition information and disparity information (disparity information set).

Also, in the caption data stream, the pieces of data of a certain number of captions (caption units) that are to be displayed on the same screen are sequentially arranged via a separator (Unit_Separator). Also, the disparity information (disparity information set) inserted into the caption data stream includes a certain number of pieces of disparity information added with respective pieces of identification information (region_block_id) indicating the arrangement order of the pieces of data of the certain number of captions (caption units).

In this way, the certain number of pieces of disparity information are added with respective pieces of identification information indicating the arrangement order of the pieces of data of the certain number of captions (caption units) displayed on the same screen. Accordingly, the pieces of data of the certain number of captions (caption units) are associated with the certain number of pieces of disparity information. Thus, in the set top box 200, appropriate disparity can be given using the pieces of disparity information corresponding to the certain number of captions (caption units) that are to be superimposed on a left-eye image and a right-eye image. Thus, the perspective consistency among individual objects in an image can be maintained in the optimum state in display of captions (caption units).

2. Modification

Figure 51:
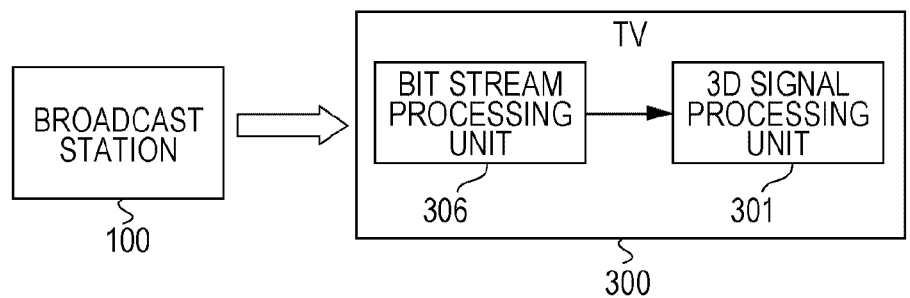
FIG. 51 is a diagram illustrating another example configuration of the stereo image display system.
Figure 52:
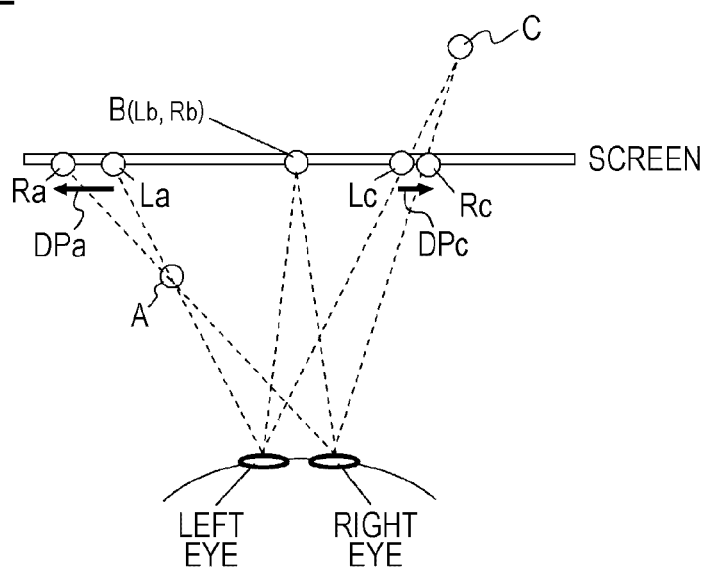
FIG. 52 is a diagram illustrating a relationship between the display positions of left and right images of an object on a screen and the reproduction position of the stereo image thereof in stereo image display using binocular disparity.

Note that, in the above-described embodiment, the stereo image display system 10 is constituted by the broadcast station 100, the set top box 200, and the television receiver 300. However, the television receiver 300 is provided with the bit stream processing unit 306 that functions equivalently to the bit stream processing unit 201 in the set top box 200, as illustrated in FIG. 50. Thus, a stereo image display system 10A constituted by the broadcast station 100 and the television receiver 300 is available, as illustrated in FIG. 51.

Also, in the above-described embodiment, an example in which a data stream (bit stream data) including stereo image data is broadcasted by the broadcast station 100 has been described. However, the present invention can of course be applied to a system having a configuration in which this data stream is distributed to a reception terminal using a network, such as the Internet.

Also, in the above-described embodiment, the set top box 200 is connected to the television receiver 300 via a digital interface of HDMI. However, the present invention can of course be applied to a case where those are connected via a digital interface (including wireless as well as wired) similar to the digital interface of HDMI.

Note that this application refers to Japanese Patent Application No. 2009-153686.

INDUSTRIAL APPLICABILITY

The present invention can be applied to a stereo image display system or the like for superimposing superimposition information, such as closed-caption information, subtitle information, graphics information, text information, and captions in the ARIB method, on an image and displaying the image.

REFERENCE SIGNS LIST 10, 10A . . . stereo image display system, 100 . . . broadcast station, 110, 110A to 110D . . . transmission data generating unit, 111L, 111R . . . camera, 112 . . . video framing unit, 113 . . . video encoder, 113a . . . stream formatter, 114 . . . disparity vector detecting unit, 115 . . . disparity vector encoder, 116 . . . microphone, 117 . . . audio encoder, 118 . . . graphics producing unit, 119 . . . graphics encoder, 119a . . . stream formatter, 120 . . . text producing unit, 121 . . . text encoder, 122 . . . multiplexer, 124 . . . graphics processing unit, 125 . . . text processing unit, 130 . . . data retrieving unit, 130a . . . data recording medium, 131 . . . disparity information set creating unit, 132 . . . caption producing unit, 133 . . . caption encoder, 200, 200A . . . set top box, 201, 201A to 201D . . . bit stream processing unit, 202 . . . HDMI terminal, 203 . . . antenna terminal, 204 . . . digital tuner, 205 . . . video signal processing circuit, 205A . . . video/graphic processing circuit, 206 . . . HDMI transmitting unit, 207 . . . audio signal processing circuit, 211 . . . CPU, 212 . . . flash ROM, 213 . . . DRAM, 214 . . . internal bus, 215 . . . remote control receiving unit, 216 . . . remote control transmitter, 217 . . . network terminal, 218 . . . Ethernet interface, 220, 220A . . . demultiplexer, 221 . . . video decoder, 222 . . . graphics decoder, 222A . . . caption decode, 223 . . . text decoder, 224 . . . audio decoder, 226 . . . stereo-image graphics producing unit, 226A . . . stereo-image caption producing unit, 227 . . . stereo-image text producing unit, 228 . . . video superimposing unit, 229 . . . multi-channel speaker control unit, 231, 232 . . . disparity information retrieving unit, 231A . . . disparity information retrieving unit, 300 . . . television receiver, 301 . . . 3D signal processing unit, 302 . . . HDMI terminal, 303 . . . HDMI receiving unit, 304 . . . antenna terminal, 305 . . . digital tuner, 306 . . . bit stream processing unit, 307 . . . video/graphic processing circuit, 308 . . . panel drive circuit, 309 . . . display panel, 310 . . . audio signal processing circuit, 311 . . . audio amplifier circuit, 312 . . . speaker, 321 . . . CPU, 322 . . . flash ROM, 323 . . . DRAM, 324 . . . internal bus, 325 . . . remote control receiving unit, 326 . . . remote control transmitter, 400 . . . HDMI cable

The invention claimed is:

1. A stereo image data transmitting apparatus comprising:
a processing device that:
outputs stereo image data including left-eye image data and right-eye image data;
outputs data of superimposition information that is to be superimposed on images based on the left-eye image data and the right-eye image data;
disparity information for giving disparity by shifting the superimposition information that is to be superimposed on the images based on the left-eye image data and the right-eye image data; and
transmits a multiplexed data stream including a first data stream and a second data stream, the first data stream including the stereo image data, the second data stream including the data of the superimposition information and the disparity information,
wherein the data of the superimposition information and the disparity information are inserted into the second data stream while being distinguished from each other with data type information,
wherein pieces of data of a certain number of pieces of the superimposition information that are to be displayed simultaneously on the same screen are sequentially arranged via a separator in the second data stream,
wherein the disparity information inserted into the second data stream includes a certain number of pieces of disparity information added with respective pieces of identification information indicating arrangement order of the pieces of data of the certain number of pieces of the superimposition information, and
wherein the disparity information is in the form of a plurality of view vectors, and the view vectors are related to a respective plurality of objects to be displayed simultaneously in a stereo image based on the left-eye image data and the right-eye image data in the stereo image data and used to give a plurality of disparities respectively to a plurality of the pieces of the superimposition information related to the respective plurality of objects and to be superimposed on the stereo image.

2. The stereo image data transmitting apparatus according to claim 1,
wherein the data of the superimposition information is caption data in an ARIB method.

3. The stereo image data transmitting apparatus according to claim 1,
wherein the disparity information is disparity information that is used in common in a period of a certain number of frames in which the superimposition information is displayed or disparity information that is sequentially updated in the period of the certain number of frames, and
wherein the disparity information is added with flag information indicating whether the disparity information is the disparity information that is used in common in the individual frames or the disparity information that is sequentially updated in the individual frames.

4. The stereo image data transmitting apparatus according to claim 3,
wherein the disparity information that is sequentially updated in the individual frames includes disparity information of a first frame in the period of the certain number of frames and offset information with respect to disparity information of a preceding frame of a second and subsequent frames.

5. The stereo image data transmitting apparatus according to claim 1,
wherein the disparity information is added with shift target information specifying superimposition information that is to be shifted on the basis of the disparity information among the superimposition information that is to be superimposed on the image based on the left-eye image data and the superimposition information that is to be superimposed on the image based on the right-eye image data.

6. A stereo image data transmitting method comprising:
an image data output step of outputting stereo image data including left-eye image data and right-eye image data;
a superimposition information data output step of outputting data of superimposition information that is to be superimposed on images based on the left-eye image data and the right-eye image data;
a disparity information output step of outputting disparity information for giving disparity by shifting the superimposition information that is to be superimposed on the images based on the left-eye image data and the right-eye image data; and
a data transmitting step of transmitting a multiplexed data stream including a first data stream and a second data stream, the first data stream including the stereo image data output in the image data output step, the second data stream including the data of the superimposition information output in the superimposition information data output step and the disparity information output in the disparity information output step,
wherein the data of the superimposition information and the disparity information are inserted into the second data stream while being distinguished from each other with data type information,
wherein pieces of data of a certain number of pieces of the superimposition information that are to be displayed simultaneously on the same screen are sequentially arranged via a separator in the second data stream,
wherein the disparity information inserted into the second data stream includes a certain number of pieces of disparity information added with respective pieces of identification information indicating arrangement order of the pieces of data of the certain number of pieces of the superimposition information, and
wherein the disparity information is in the form of a plurality of view vectors, and the view vectors are related to a respective plurality of objects to be displayed simultaneously in a stereo image based on the left-eye image data and the right-eye image data in the stereo image data and used to give a plurality of disparities respectively to a plurality of the pieces of the superimposition information related to the respective plurality of objects and to be superimposed on the stereo image.

7. A stereo image data receiving apparatus comprising:
a processing device that:
receives a multiplexed data stream including a first data stream and a second data stream,
wherein the first data stream includes stereo image data including left-eye image data and right-eye image data for displaying a stereo image,
wherein the second data stream includes data of superimposition information that is to be superimposed on images based on the left-eye image data and the right-eye image data and disparity information for giving disparity by shifting the superimposition information that is to be superimposed on the images based on the left-eye image data and the right-eye image data, wherein the data of the superimposition information and the disparity information are inserted into the second data stream while being distinguished from each other with data type information, wherein pieces of data of a certain number of pieces of the superimposition information that are to be displayed simultaneously on the same screen are sequentially arranged via a separator in the second data stream, and wherein the disparity information inserted into the second data stream includes a certain number of pieces of disparity information added with respective pieces of identification information indicating arrangement order of the pieces of data of the certain number of pieces of the superimposition information, wherein the processing device:

obtains the stereo image data from the first data stream included in the multiplexed data stream;

obtains the data of the superimposition information from the second data stream included in the multiplexed data stream;

obtains the disparity information from the second data stream included in the multiplexed data stream; and gives disparity to the same superimposition information that is to be superimposed on a left-eye image and a right-eye image using the left-eye image data and the right-eye image data included in the stereo image data, the disparity information, and the data of the superimposition information, thereby obtaining data of the left-eye image on which the superimposition information is superimposed and data of the right-eye image on which the superimposition information is superimposed, wherein the disparity information is in the form of a plurality of view vectors, and the view vectors are related to a respective plurality of objects to be displayed simultaneously in a stereo image based on the left-eye image data and the right-eye image data in the stereo image data and used to give a plurality of disparities respectively to a plurality of the pieces of the superimposition information related to the respective plurality of objects and to be superimposed on the stereo image.

8. A stereo image data receiving method comprising:

a data receiving step of receiving a multiplexed data stream including a first data stream and a second data stream, wherein the first data stream includes stereo image data including left-eye image data and right-eye image data for displaying a stereo image, wherein the second data stream includes data of superimposition information that is to be superimposed on images based on the left-eye image data and the right-eye image data and disparity information for giving disparity by shifting the superimposition information that is to be superimposed on the images based on the left-eye image data and the right-eye image data, wherein the data of the superimposition information and the disparity information are inserted into the second data stream while being distinguished from each other with data type information, wherein pieces of data of a certain number of pieces of the superimposition information that are to be displayed simultaneously on the same screen are sequentially arranged via a separator in the second data stream, and wherein the disparity information inserted into the second data stream includes a certain number of pieces of disparity information added with respective pieces of identification information indicating arrangement order of the pieces of data of the certain number of pieces of the superimposition information, the stereo image data receiving method further comprising:

an image data obtaining step of obtaining the stereo image data from the first data stream included in the multiplexed data stream received in the data receiving step;

a superimposition information data obtaining step of obtaining the data of the superimposition information from the second data stream included in the multiplexed data stream received in the data receiving step;

a disparity information obtaining step of obtaining the disparity information from the second data stream included in the multiplexed data stream received in the data receiving step; and an image data processing step of giving disparity to the same superimposition information that is to be superimposed on a left-eye image and a right-eye image using the left-eye image data and the right-eye image data included in the stereo image data obtained in the image data obtaining step, the disparity information obtained in the disparity information obtaining step, and the data of the superimposition information obtained in the superimposition information data obtaining step, thereby obtaining data of the left-eye image on which the superimposition information is superimposed and data of the right-eye image on which the superimposition information is superimposed, wherein the disparity information is in the form of a plurality of view vectors, and the view vectors are related to a respective plurality of objects to be displayed simultaneously in a stereo image based on the left-eye image data and the right-eye image data in the stereo image data and used to give a plurality of disparities respectively to a plurality of the pieces of the superimposition information related to the respective plurality of objects and to be superimposed on the stereo image.

* * * * *